(12) United States Patent
Nims et al.

(10) Patent No.: US 12,256,141 B2
(45) Date of Patent: *Mar. 18, 2025

(54) 2D DIGITAL IMAGE CAPTURE SYSTEM AND SIMULATING 3D DIGITAL IMAGE AND SEQUENCE

(71) Applicants: Jerry Nims, Sandy Springs, GA (US); William M. Karszes, Hilton Head, SC (US); Samuel Pol, Lawrenceville, GA (US)

(72) Inventors: Jerry Nims, Sandy Springs, GA (US); William M. Karszes, Hilton Head, SC (US); Samuel Pol, Lawrenceville, GA (US)

( * ) Notice: Subject to any disclaimer, the term of this patent is extended or adjusted under 35 U.S.C. 154(b) by 162 days.

This patent is subject to a terminal disclaimer.

(21) Appl. No.: 17/834,023

(22) Filed: Jun. 7, 2022

(65) Prior Publication Data
US 2022/0385807 A1 Dec. 1, 2022

Related U.S. Application Data

(63) Continuation-in-part of application No. 29/816,461, filed on Nov. 22, 2021, and a continuation-in-part of
(Continued)

(51) Int. Cl.
*G06T 7/593* (2017.01)
*G06Q 20/36* (2012.01)
(Continued)

(52) U.S. Cl.
CPC .......... *H04N 23/64* (2023.01); *G06Q 20/367* (2013.01); *H04N 13/189* (2018.05); *H04N 13/243* (2018.05); *H04N 23/611* (2023.01)

(58) Field of Classification Search
CPC ............. H04N 13/243; H04N 5/23222; H04N 13/128; H04N 13/156; H04N 13/271;
(Continued)

(56) References Cited

U.S. PATENT DOCUMENTS 3,895,867 A   7/1975   Lo et al.
3,908,112 A   9/1975   Lo et al.
(Continued)

FOREIGN PATENT DOCUMENTS

EP   2193449 B1   10/2016
EP   2824508 B1   2/2018
(Continued)

OTHER PUBLICATIONS

Future Car, Magneti Marelli Named a 2020 PACEpilot Award Honoree for its 3D Instrument Cluster Display, accessed: https://www.futurecar.com/3904/Magneti-Marelli-Named-a-2020-PACEpilot-Award-Honoree-for-its-3D-Instrument-Cluster-Display (2020), 3 pgs.
(Continued)

*Primary Examiner* — Tung T Vo
(74) *Attorney, Agent, or Firm* — Mathew L. Grell, Esq.; Grell & Watson Patent Atorneys LLC

(57) ABSTRACT

A system to capture a plurality of two dimensional digital source images of scene by user, a smart device having a memory device for storing an instruction, a processor in communication with the memory and configured to execute the instruction, a plurality of digital image capture devices in communication with the processor and each image capture device configured to capture a digital image of the scene, the plurality of digital image capture devices positioned linearly in series within approximately an interpupillary distance, wherein a first digital image capture devices is centered proximate a first end of the interpupillary distance, a second digital image capture devices is centered on a second end of the interpupillary distance, and any remaining the plurality of digital image capture devices are evenly spaced therebetween, a display in communication with the processor, display configured to display multidimensional digital image sequence and add audio file thereto.

12 Claims, 31 Drawing Sheets

Related U.S. Application Data application No. 29/816,462, filed on Nov. 22, 2021, and a continuation-in-part of application No. 17/525,246, filed on Nov. 12, 2021, now Pat. No. 12,108,015, and a continuation-in-part of application No. 17/511,490, filed on Oct. 26, 2021, now Pat. No. 12,106,501, and a continuation-in-part of application No. 17/459,067, filed on Aug. 27, 2021, now abandoned, and a continuation-in-part of application No. 17/355,906, filed on Jun. 23, 2021, now abandoned, and a continuation-in-part of application No. 17/333,721, filed on May 28, 2021, now Pat. No. 11,917,119, and a continuation-in-part of application No. 17/333,812, filed on May 28, 2021, now abandoned.

(60) Provisional application No. 63/212,025, filed on Jun. 17, 2021, provisional application No. 63/197,941, filed on Jun. 7, 2021.

(51) Int. Cl.
| | | |
|---|---|---|
| *G06T 7/00* | (2017.01) | |
| *G06T 7/521* | (2017.01) | |
| *H04N 13/189* | (2018.01) | |
| *H04N 13/243* | (2018.01) | |
| *H04N 23/60* | (2023.01) | |
| *H04N 23/611* | (2023.01) | |

(58) Field of Classification Search
CPC .. H04N 13/296; H04N 13/302; H04N 13/398; H04N 5/232941; H04N 5/2258; H04N 23/64; H04N 13/189; H04N 23/611; H04N 13/111; H04N 13/221; H04N 13/239; H04N 23/634; H04N 2013/0081; H04N 23/45; G06Q 20/367
USPC .......................................................... 348/43
See application file for complete search history.

(56) References Cited

U.S. PATENT DOCUMENTS

| | | | |
|---|---|---|---|
| 3,960,563 | A | 6/1976 | Lo et al. |
| 4,037,950 | A * | 7/1977 | Lo .......................... G03B 35/24 |
| | | | 396/327 |
| 4,063,265 | A | 12/1977 | Lo et al. |
| 4,086,585 | A | 4/1978 | Wah Lo et al. |
| 4,124,291 | A | 11/1978 | Lo et al. |
| D264,343 | S | 5/1982 | Che |
| 5,786,909 | A | 7/1998 | Miyawaki et al. |
| 6,060,003 | A | 5/2000 | Karszes |
| 6,709,080 | B2 | 3/2004 | Nims et al. |
| 7,019,865 | B2 | 3/2006 | Nims et al. |
| 7,136,185 | B2 | 11/2006 | Goggins |
| 7,639,838 | B2 | 12/2009 | Nims |
| 8,136,938 | B2 | 3/2012 | Karszes et al. |
| 9,087,405 | B2 | 7/2015 | Seitz et al. |
| 9,389,415 | B2 | 7/2016 | Fattal et al. |
| 9,992,473 | B2 | 6/2018 | Nims et al. |
| 10,015,478 | B1 | 7/2018 | Hoffberg |
| 10,033,990 | B2 | 7/2018 | Nims et al. |
| 10,178,247 | B2 | 1/2019 | Nims et al. |
| 2002/0167679 | A1 | 11/2002 | Nims et al. |
| 2003/0120298 | A1 | 6/2003 | Gildenberg |
| 2006/0023197 | A1 * | 2/2006 | Joel ........................ G03B 35/24 |
| | | | 355/22 |
| 2010/0295915 | A1 | 11/2010 | Karszes et al. |
| 2011/0001797 | A1 | 1/2011 | Cookson et al. |
| 2011/0037997 | A1 | 2/2011 | Karszes et al. |
| 2011/0098083 | A1 * | 4/2011 | Lablans ............... H04N 5/2624 |
| | | | 348/333.01 |
| 2012/0113100 | A1 * | 5/2012 | Niioka ................. H04N 13/305 |
| | | | 345/419 |
| 2012/0120331 | A1 * | 5/2012 | Oka ....................... G02B 30/28 |
| | | | 349/15 |
| 2012/0139906 | A1 | 6/2012 | Zhang et al. |
| 2012/0242794 | A1 | 9/2012 | Park et al. |
| 2013/0182078 | A1 | 7/2013 | Kitaura |
| 2013/0242235 | A1 | 9/2013 | Wei et al. |
| 2014/0125655 | A1 | 5/2014 | Kunath et al. |
| 2014/0146046 | A1 | 5/2014 | Coombe et al. |
| 2015/0066465 | A1 | 3/2015 | Deschamps et al. |
| 2015/0304629 | A1 * | 10/2015 | Zhang .................... H04N 13/20 |
| | | | 348/48 |
| 2015/0358539 | A1 | 12/2015 | Catt |
| 2016/0029008 | A1 | 1/2016 | Prechtl |
| 2016/0090825 | A1 | 3/2016 | Imhof et al. |
| 2016/0147067 | A1 | 5/2016 | Hua et al. |
| 2016/0227184 | A1 * | 8/2016 | Nims .................... H04N 13/31 |
| 2016/0227185 | A1 * | 8/2016 | Nims .................. H04N 13/128 |
| 2016/0323442 | A1 * | 11/2016 | Kats ................... H04M 3/42051 |
| 2017/0109940 | A1 | 4/2017 | Guo et al. |
| 2017/0364752 | A1 | 12/2017 | Zhou et al. |
| 2018/0040004 | A1 * | 2/2018 | Greenberger ......... H04L 67/535 |
| 2018/0048762 | A1 * | 2/2018 | Kats .................... H04M 1/2757 |
| 2018/0182174 | A1 | 6/2018 | Choi |
| 2018/0288241 | A1 | 10/2018 | Nims et al. |
| 2019/0082110 | A1 * | 3/2019 | Jin ....................... H04N 13/243 |
| 2019/0082114 | A1 * | 3/2019 | Jeon ..................... H04N 23/698 |
| 2019/0089940 | A1 | 3/2019 | Zhang et al. |
| 2019/0373246 | A1 | 12/2019 | Lo |
| 2019/0394441 | A1 | 12/2019 | Simek et al. |
| 2020/0020075 | A1 * | 1/2020 | Khwaja ................. G06T 3/4038 |
| 2020/0082597 | A1 | 3/2020 | Ackerson et al. |
| 2020/0105003 | A1 | 4/2020 | Stauber et al. |
| 2020/0195905 | A1 | 6/2020 | Luo |
| 2020/0267328 | A1 * | 8/2020 | Jeung .................... H04N 13/282 |
| 2020/0275031 | A1 * | 8/2020 | Park ........................ G06T 7/80 |
| 2020/0278602 | A1 * | 9/2020 | Rhee ....................... G03B 31/06 |
| 2020/0301036 | A1 | 9/2020 | Ramfjord et al. |
| 2021/0120172 | A1 | 4/2021 | Nishimura |
| 2021/0289190 | A1 * | 9/2021 | Nims .................... H04N 13/302 |
| 2021/0297647 | A1 * | 9/2021 | Nims .................... H04N 13/243 |
| 2021/0321077 | A1 * | 10/2021 | Nims .................... H04N 13/243 |
| 2021/0392314 | A1 * | 12/2021 | Nims .................... G06F 1/1686 |
| 2022/0078392 | A1 * | 3/2022 | Nims .................... H04N 13/296 |
| 2022/0385880 | A1 * | 12/2022 | Nims .................... H04N 13/239 |

FOREIGN PATENT DOCUMENTS

| | | |
|---|---|---|
| EP | 3694208 | 8/2020 |
| WO | WO2002052423 | 7/2002 |
| WO | WO2006115470 | 11/2006 |
| WO | WO2014058978 | 4/2014 |
| WO | WO2016/191467 | 12/2016 |
| WO | WO2017039825 | 3/2017 |
| WO | WO2020161560 | 8/2020 |

OTHER PUBLICATIONS

Leia Inc., "Lume Pad 3D Lightfield Tablet", accessed: https://www.leiainc.com/, (2021) 5 pgs.
Srinivasa et al. NPL "VR Content Capture Using Aligned Smartphones", 2018, 15th IEEE India, 6 pgs.
International Search Report dated Sep. 9, 2021 for corresponding International Application No. PCT/US2021/034832.
International Search Report dated Sep. 9, 2021 for corresponding International Application No. PCT/US2021/034853.
International Search Report dated Sep. 30, 2021 for corresponding International Application No. PCT/US2021/038677.
Ztab 10—Android Tablet, Model T10_FHD, Idea International Group (Hong Kong) Ltd., www.ideaworldhk.com (China), Apr. 2, 2018 (see attached Tablets Disclosure, #1 for image).
Flight Deck—Android Tablet, Model A6100, Commander 3D (Canada), 2016 (see attached Tablets Disclosure, #2 for image).
Stevenson et al., Designing a Horizontal Image Translation Algorithm for Use with Dynamic Stereographical Virtual Worlds, UWEC Office of Research and Sponsored Programs (2009), 12 pgs.
International Search Report dated Dec. 1, 2021 for corresponding International Application No. PCT/US2021/47907.

(56) References Cited

OTHER PUBLICATIONS

Office Action issued on Apr. 4, 2022 in corresponding U.S. Appl. No. 17/355,906.
Office Action issued on Apr. 4, 2022 in corresponding U.S. Appl. No. 17/333,721.
Office Action issued on Apr. 4, 2022 in corresponding U.S. Appl. No. 17/333,812.
International Search Report and Written Opinion dated Mar. 17, 2022, in corresponding International Application No. PCT/US2021/059165.
International Search Report and Written Opinion issued in corresponding International Application No. PCT/US2021/056721 mailed Jan. 28, 2022.
Gonzaga et al. IEEE Geoscience and remote sening magazine. A Multioutcrop Sharing and Interpretation System: Exploring 3-D Surface and Subsurface Data. Jul. 18, 2018 [retrieved on Dec. 30, 2021]. Retrieved from the Internet: <URL:https://ieeexplore.ieee.org/document/8412783> pp. 9-16.
International Search Report issued on Sep. 23, 2022 in corresponding International Application No. PCT/US202232515.
International Search Report issued on Sep. 28, 2022 in corresponding International Application No. PCT/US2022032524.
Office Action issued on Oct. 21, 2022 in corresponding U.S. Appl. No. 17/459,067.

\* cited by examiner

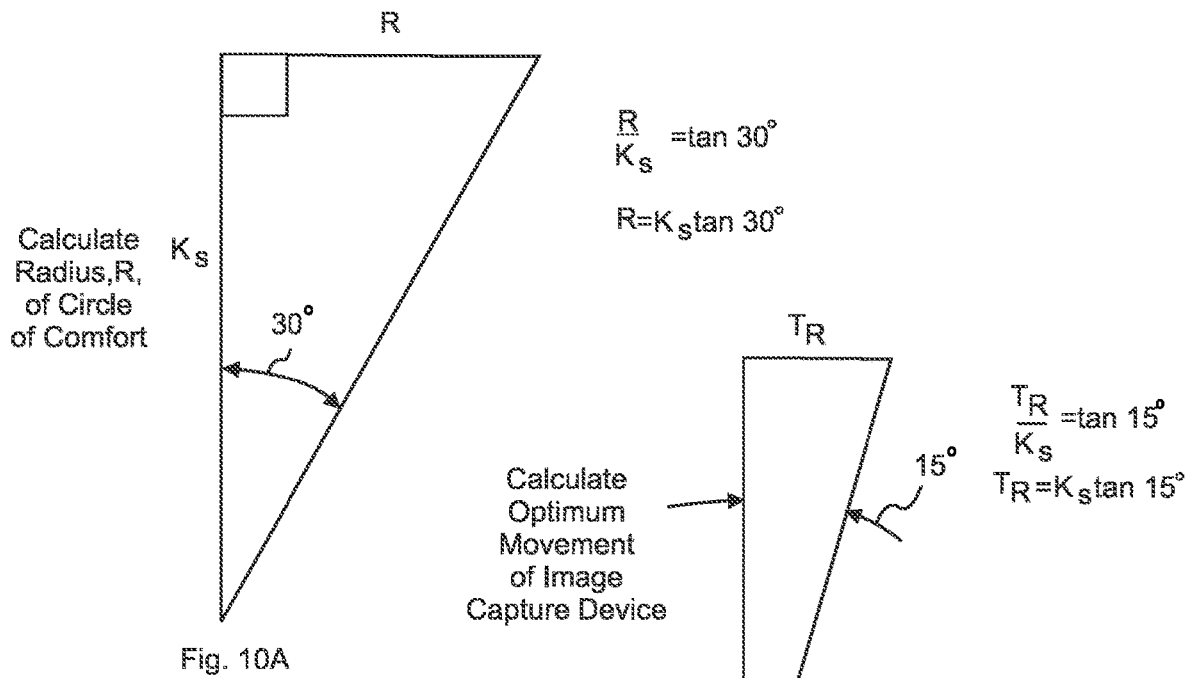
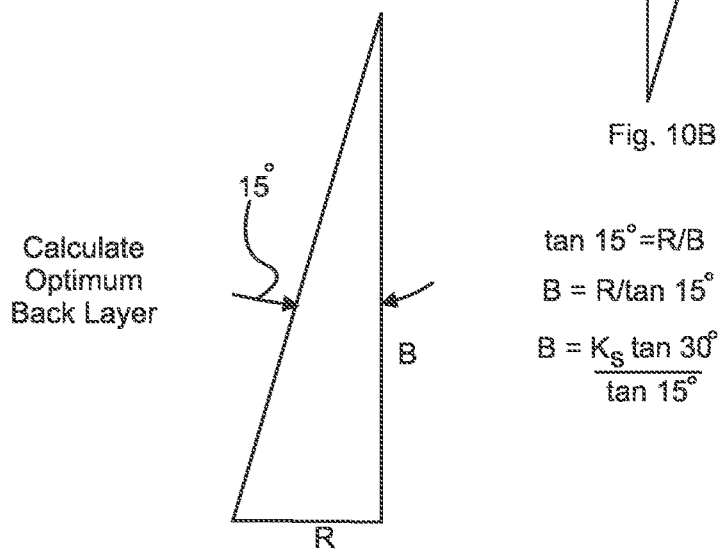
Fig. 10C

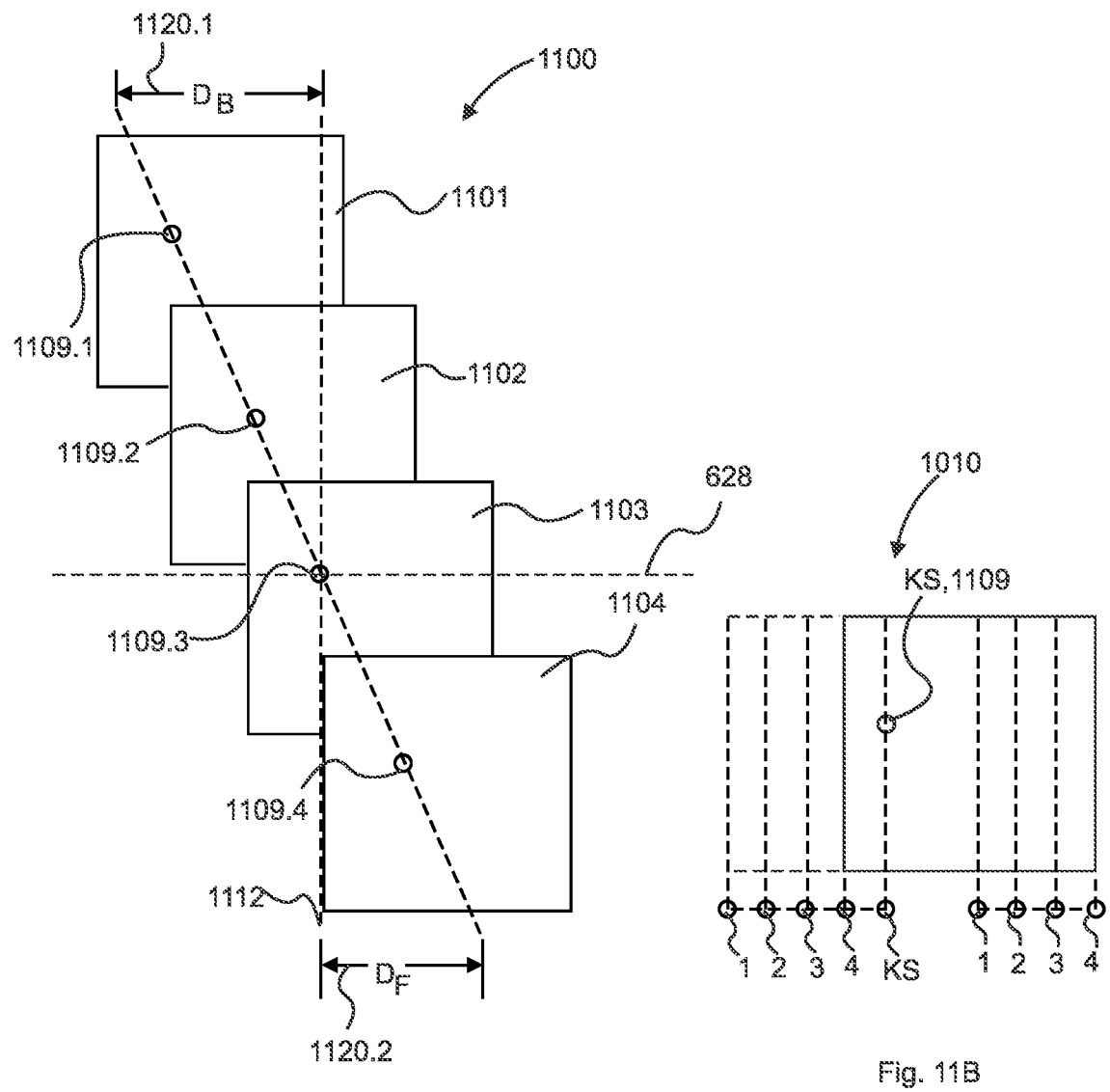

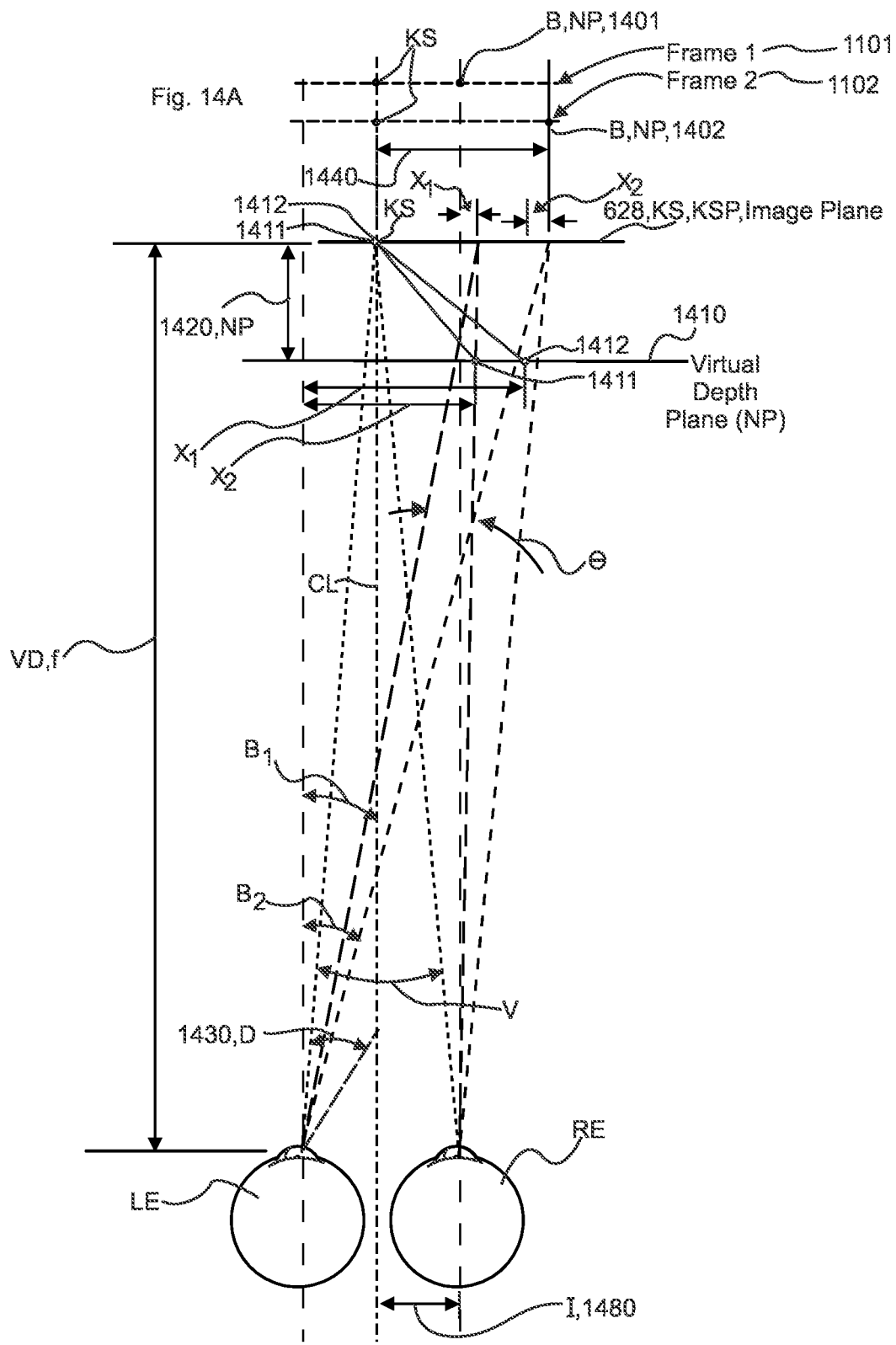

2D DIGITAL IMAGE CAPTURE SYSTEM AND SIMULATING 3D DIGITAL IMAGE AND SEQUENCE

CROSS REFERENCE To RELATED APPLICATIONS

To the full extent permitted by law, the present United States Non-Provisional Patent Application claims priority to and the full benefit of U.S. Provisional Application No. 63/197,941, filed on Jun. 7, 2021 entitled "AUDIO, DIGY SEQUENCE, NFT AND METHODS OF USE" (CPA12); and U.S. Provisional Application No. 63/212,025, filed on Jun. 17, 2021 entitled "IMAGE CAPTURE SYSTEM AND DISPLAY OF DIGITAL MULTI-DIMENSIONAL IMAGE" (CPA5B). This application is also a continuation-in-part of U.S. Non-Provisional Application No. 17/333,721, filed on May 28, 2021, entitled "2D IMAGE CAPTURE SYSTEM & DISPLAY OF 3D DIGITAL IMAGE" (RA4); U.S. Non-Provisional application Ser. No. 17/333,812, filed on May 28, 2021, entitled "2D IMAGE CAPTURE SYSTEM, TRANSMISSION & DISPLAY OF 3D DIGITAL IMAGE" (RA4CON); U.S. Non-Provisional application Ser. No. 17/355,906, filed on Jun. 23, 2021, entitled "2D IMAGE CAPTURE SYSTEM AND SIMULATING 3D IMAGE SEQUENCE" (RA5); U.S. Non-Provisional application Ser. No. 17/525,246, filed on Nov. 12, 2021, entitled "2D DIGITAL IMAGE CAPTURE SYSTEM, FRAME SPEED, AND SIMULATING 3D DIGITAL IMAGE SEQUENCE" (RASCIP); U.S. Non-Provisional application Ser. No. 17/459,067, filed on Aug. 27, 2021, entitled "VEHICLE TERRAIN CAPTURE SYSTEM AND DISPLAY OF 3D DIGITAL IMAGE AND 3D SEQUENCE" (RA9); and U.S. Non-Provisional application Ser. No. 17/511,490, filed on Oct. 26, 2021, entitled "SUBSURFACE IMAGING AND DISPLAY OF 3D DIGITAL IMAGE AND 3D IMAGE SEQUENCE" (RA10). This application is also a continuation-in-part of U.S. Design Patent Application No. 29/816,461, filed on Nov. 22, 2021 entitled "INTERPUPILLARY DISTANCE WIDTH CAMERA" (DA3CIP); and U.S. Design Patent Application No. 29/816,462, filed on Nov. 22, 2021 entitled "MOBILE DEVICE WITH AN INTERPUPILLARY DISTANCE WIDTH CAMERA ARRAY" (DASCIP). This application is related to International Application No. PCT/US2021/034832, PCT/US2021/034853, PCT/US2021/038677, PCT/U52021/059165, PCT/US2021/047907, and PCT/U52021/056721. The foregoing is incorporated herein by reference in their entirety.

FIELD OF THE DISCLOSURE

The present disclosure is directed to 2D image capture, image processing, and simulating display of a 3D or multi-dimensional image or image sequence.

BACKGROUND

The human visual system (MIS) relies on two dimensional images to interpret three dimensional fields of view. By utilizing the mechanisms with the HVS we create images/scenes that are compatible with the HVS.

Mismatches between the point at which the eyes must converge and the distance to which they must focus when viewing a 3D image have negative consequences. While 3D imagery has proven popular and useful for movies, digital advertising, many other applications may be utilized if viewers are enabled to view 3D images without wearing specialized glasses or a headset, which is a well-known problem. Misalignment in these systems results in jumping images, out of focus, or fuzzy features when viewing the digital multidimensional images. The viewing of these images can lead to headaches and nausea.

In natural viewing, images arrive at the eyes with varying binocular disparity, so that as viewers look from one point in the visual scene to another, they must adjust their eyes' vergence. The distance at which the lines of sight intersect is the vergence distance. Failure to converge at that distance results in double images. The viewer also adjusts the focal power of the lens in each eye (i.e., accommodates) appropriately for the fixated part of the scene. The distance to which the eye must be focused is the accommodative distance. Failure to accommodate to that distance results in blurred images. Vergence and accommodation responses are coupled in the brain, specifically, changes in vergence drive changes in accommodation and changes in accommodation drive changes in vergence. Such coupling is advantageous in natural viewing because vergence and accommodative distances are nearly always identical.

In 3D images, images have varying binocular disparity thereby stimulating changes in vergence as happens in natural viewing. But the accommodative distance remains fixed at the display distance from the viewer, so the natural correlation between vergence and accommodative distance is disrupted, leading to the so-called vergence-accommodation conflict. The conflict causes several problems. Firstly, differing disparity and focus information cause perceptual depth distortions. Secondly, viewers experience difficulties in simultaneously fusing and focusing on key subject within the image. Finally, attempting to adjust vergence and accommodation separately causes visual discomfort and fatigue in viewers.

Perception of depth is based on a variety of cues, with binocular disparity and motion parallax generally providing more precise depth information than pictorial cues. Binocular disparity and motion parallax provide two independent quantitative cues for depth perception. Binocular disparity refers to the difference in position between the two retinal image projections of a point in 3D space.

Conventional stereoscopic displays forces viewers to try to decouple these processes, because while they must dynamically vary vergence angle to view objects at different stereoscopic distances, they must keep accommodation at a fixed distance or else the entire display will slip out of focus. This decoupling generates eye fatigue and compromises image quality when viewing such displays.

Recently, a subset of photographers is utilizing 1980s cameras such as NIMSLO and NASHIKA 3D 35 mm analog film cameras or digital camera moved between a plurality of points to take multiple frames of a scene, develop the film of the multiple frames from the analog camera, upload images into image software, such as PHOTOSHOP, and arrange images to create a wiggle gram, moving GIF effect.

Therefore, it is readily apparent that there is a recognizable unmet need for a smart device having an integrated 2D digital image capture system, image manipulation application, & display of 3D digital images or image sequence that may be configured to address at least some aspects of the problems discussed above.

SUMMARY

Briefly described, in an example embodiment, the present disclosure may overcome the above-mentioned disadvantages and may meet the recognized need for 2D image capture system and display of 3D digital image and 3D sequence a smart device having a memory device for storing an instruction, a processor in communication with the memory and configured to execute the instruction, a plurality of digital image capture devices in communication with the processor and each image capture device configured to capture a digital image of the scene, the plurality of digital image capture devices positioned linearly in series within approximately an interpupillary distance, wherein a first digital image capture devices is centered proximate a first end of the interpupillary distance, a second digital image capture devices is centered on a second end of the interpupillary distance, and any remaining the plurality of digital image capture devices are evenly spaced therebetween, processing steps to configure datasets, and a display configured to display a simulated multidimensional digital image sequence and/or a multidimensional digital image, storage of multidimensional digital image sequence and/or a multidimensional digital image via block chain, storage of audio files for playback while viewing the image file, storage of related verification documents authenticating image or audio file, transmission of stored files, block chain storage of such files, creation of non-fungible assets of such stored files, non-fungible token (NFT).

Accordingly, a feature of the system and methods of use is its ability to capture a plurality of images of a scene with 2D capture devices positioned approximately an intraocular or interpupillary distance width IPD apart (distance between pupils of human visual system).

Accordingly, a feature of the system and methods of use is its ability to convert input 2D source images into multi-dimensional/multi-spectral image sequence. The output image follows the rule of a "key subject point" maintained within an optimum parallax to maintain a clear and sharp image.

Accordingly, a feature of the system and methods of use is its ability to utilize existing viewing devices to display simulated multidimensional digital image sequence.

Accordingly, a feature of the system and methods of use is its ability of taking, viewing, and sending over the internet multidimensional digital image sequence. This self-contained system can be integrated into a smart phone, tablet or used with external devices. A series of 4 camera lens allow us to produce a special motion parallax image, DIGY, that can be viewed without a special screen. The system can be used in a fully automated mode or in manual for operator inter-action with the scene.

Accordingly, a feature of the system and methods of use is the ability to integrate viewing devices or other viewing functionality into the display, such as barrier screen (black line), lenticular, arced, curved, trapezoid, parabolic, overlays, waveguides, black line and the like with an integrated LCD layer in an LED or OLED, LCD, OLED, and combinations thereof or other viewing devices.

Another feature of the digital multi-dimensional image platform based system and methods of use is the ability to produce digital multi-dimensional images that can be viewed on viewing screens, such as mobile and stationary phones, smart phones (including iPhone), tablets, computers, laptops, monitors and other displays and/or special output devices, directly without 3D glasses or a headset.

In an exemplary embodiment a system to simulate a 3D image sequence from a series of 2D images of a scene, the system includes a smart device having a memory device for storing an instruction, a processor in communication with said memory device configured to execute said instruction, a plurality of digital image capture devices in communication with said processor and each of said plurality image capture devices configured to capture a digital image of the scene, said plurality of digital image capture devices approximately positioned linearly in series within approximately an interpupillary distance width, wherein a first digital image capture devices is positioned proximate a first end of said interpupillary distance width, a second digital image capture devices is positioned proximate a second end of said interpupillary distance width, and any remaining said plurality of digital image capture devices are evenly spaced therebetween to capture a series of 2D images of the scene, a display in communication with said processor, said display configured to display said a multidimensional digital image sequence, and overlay an audio file on said multidimensional digital image sequence via an input on said display.

A feature of the present disclosure may include a system having a series of capture devices, such as two, three, four or more, such plurality of capture devices (digital image cameras) positioned in series linearly within an intraocular or interpupilary distance width, the distance between an average human's pupils, the system captures and stores two, three, four or more, a plurality of 2D source images of a scene, the system labels and identifies the images based on the source capture device that captured the image.

A feature of the present disclosure may include a system having a display device configured from a stack of components, such as top glass cover, capacitive touch screen glass, polarizer, diffusers, and backlight. Moreover, an image source, such as LCD, such LED, ELED, PDP, QLED, and other types of display technologies. Furthermore, display device may include a lens array preferably positioned between capacitive touch screen glass and LCD panel stack of components, and configured to bend or refract light in a manner capable of displaying both a high quality 2D image and an interlaced stereo pair of left and right images as 3D or multidimensional digital image of scene.

A feature of the present disclosure is the ability to overcome the above defects via another important parameter to determine the convergence point or key subject point, since the viewing of an image that has not been aligned to a key subject point causes confusion to the human visual system and results in blur and double images.

A feature of the present disclosure is the ability to select the convergence point or key subject point anywhere between near or close plane and far or back plane, manual mode user selection.

A feature of the present disclosure is the ability to overcome the above defects via another important parameter to determine Circle of Comfort (CoC), since the viewing of an image that has not been aligned to the Circle of Comfort (CoC) causes confusion to the human visual system and results in blur and double images.

A feature of the present disclosure is the ability to overcome the above defects via another important parameter to determine Circle of Comfort (CoC) fused with Horopter arc or points and Panum area, since the viewing of an image that has not been aligned to the Circle of Comfort (CoC) fused with Horopter arc or points and Panum area causes confusion to the human visual system and results in blur and double images.

A feature of the present disclosure is the ability to overcome the above defects via another important parameter to determine gray scale depth map, the system interpolates intermediate points based on the assigned points (closest point, key subject point, and furthest point) in a scene, the system assigns values to those intermediate points and renders the sum to a gray scale depth map. The gray scale map to generate volumetric parallax using values assigned to the different points (closest point, key subject point, and furthest point) in a scene. This modality also allows volumetric parallax or rounding to be assigned to singular objects within a scene.

A feature of the present disclosure is its ability to measure depth or z-axis of objects or elements of objects and/or make comparisons based on known sizes of objects in a scene.

A feature of the present disclosure is its ability to utilize a key subject algorithm to manually or automatically select the key subject in a plurality of images of a scene displayed on a display and produce multidimensional digital image sequence for viewing on a display.

A feature of the present disclosure is its ability to utilize an image alignment, horizontal image translation, or edit algorithm to manually or automatically align the plurality of images of a scene about a key subject for display.

A feature of the feature of the present disclosure is its ability to utilize an image translation algorithm to align the key subject point of two images of a scene for display.

A feature of the feature of the present disclosure is its ability to generate DIFYS (Differential Image Format) is a specific technique for obtaining multi-view of a scene and creating a series of image that creates depth without glasses or any other viewing aides. The system utilizes horizontal image translation along with a form of motion parallax to create 3D viewing. DIFYS are created by having different view of a single scene flipped by the observer's eyes. The views are captured by motion of the image capture system or by multiple cameras taking a scene with each of the cameras within the array viewing at a different position.

In accordance with a first aspect of the present disclosure of simulating a 3D image sequence from a sequence of 2D image frames, may be utilized to capture(ing) a plurality of 2D image frames (images) of a scene from a plurality of different observation points, wherein a first proximal plane and a second distal plane is identified within each image frame in the sequence, and wherein each observation point maintains substantially the same first proximal image plane for each image frame; determining a depth estimate for the first proximal and second distal plane within each image frame in the sequence, aligning the first proximal plane of each image frame in the sequence and shifting the second distal plane of each subsequent image frame in the sequence based on the depth estimate of the second distal plane for each image frame, to produce a modified image frame corresponding to each 2D image frame and displaying the modified image frames sequentially.

The present disclosure varies the focus of objects at different planes in a displayed scene to match vergence and stereoscopic retinal disparity demands to better simulate natural viewing conditions. By adjusting the focus of key objects in a scene to match their stereoscopic retinal disparity, the cues to ocular accommodation and vergence are brought into agreement. As in natural vision, the viewer brings different objects into focus by shifting accommodation. As the mismatch between accommodation and vergence is decreased, natural viewing conditions are better simulated, and eye fatigue is decreased.

The present disclosure may be utilized to determine three or more planes for each image frame in the sequence.

Furthermore, it is preferred that the planes have different depth estimates.

In addition, it is preferred that each respective plane is shifted based on the difference between the depth estimate of the respective plane and the first proximal plane.

Preferably, the first, proximal plane of each modified image frame is aligned such that the first proximal plane is positioned at the same pixel space.

It is also preferred that the first plane comprises a key subject point.

Preferably, the planes comprise at least one foreground plane.

In addition, it is preferred that the planes comprise at least one background plane.

Preferably, the sequential observation points lie on a straight line.

In accordance with a second aspect of the present invention there is a non-transitory computer readable storage medium storing instructions, the instructions when executed by a processor causing the processor to perform the method according to the second aspect of the present invention.

These and other features of the smart device having 2D digital image capture system, image manipulation application, & display of 3D digital image or image sequence will become more apparent to one skilled in the art from the prior Summary and following Brief Description of the Drawings, Detailed Description of exemplary embodiments thereof, and claims when read in light of the accompanying Drawings or Figures.

BRIEF DESCRIPTION OF THE DRAWINGS

The present disclosure will be better understood by reading the Detailed Description of the Preferred and Selected Alternate Embodiments with reference to the accompanying drawing Figures, in which like reference numerals denote similar structure and refer to like elements throughout, and in which:

FIG. 10A is a top view illustration of an exemplary embodiment identifying right triangles to calculate the radius of the Circle of Comfort of FIG. 10;

FIG. 10B is a top view illustration of an exemplary embodiment identifying right triangles to calculate linear positioning of capture devices on lens plane of FIG. 10;

FIG. 10C is a top view illustration of an exemplary embodiment identifying right triangles to calculate the optimum distance of backplane of FIG. 10;

FIG. 11A is a front top view illustration of an exemplary embodiment of four images of a scene captured utilizing capture devices shown in FIGS. 8A-8F and aligned about a key subject point;

FIG. 11B is a front view illustration of an exemplary embodiment of four images of a scene captured utilizing capture devices shown in FIGS. 8A-8F and aligned about a key subject point;

FIG. 14A is a top view illustration identifying two frames captured utilizing capture devices shown in FIGS. 8A-8F showing key subject aligned as shown in FIG. 11B and near plane object offset between two frames;

FIG. 14B is a top view illustration of an exemplary embodiment of left and right eye virtual depth via object offset between two frames of FIG. 14A;

FIG. 15B is a cross-section diagram of an exemplary embodiment of an arced or curved shaped lens according to select embodiments of the instant disclosure, tracing RGB light there through;

FIG. 15C is a cross-section diagram of a prototype embodiment of a trapezoid shaped lens according to select embodiments of the instant disclosure, tracing RGB light there through;

FIG. 15D is a cross-section diagram of an exemplary embodiment of a dome shaped lens according to select embodiments of the instant disclosure, tracing RGB light there through;

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in figures specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples and are merely examples among other possible examples.

Figure 1A:
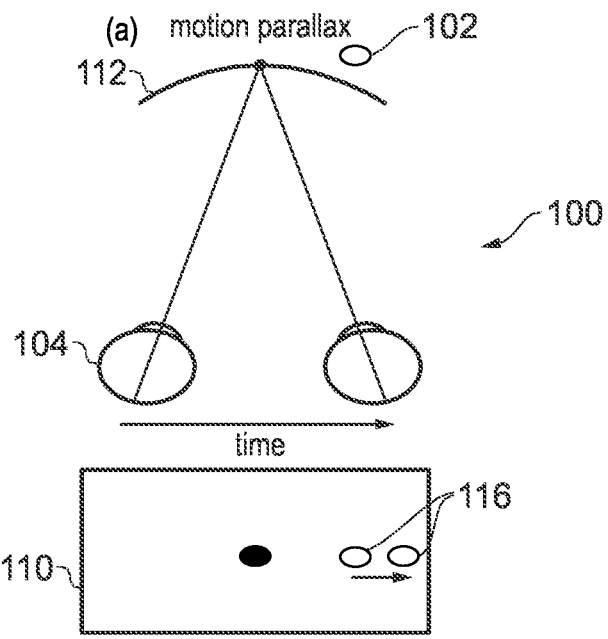
FIG. 1A illustrates a 2D rendering of an image based upon a change in orientation of an observer relative to a display.
Figure 1B:
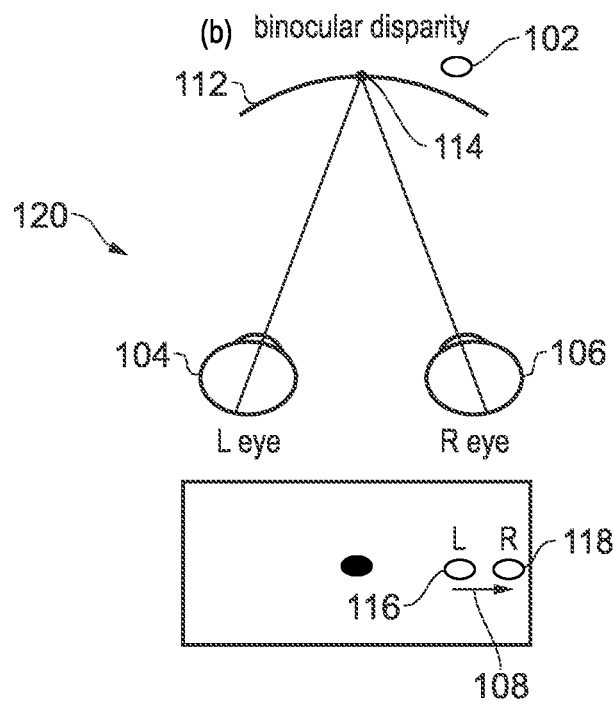
FIG. 1B illustrates a 2D rendering of an image with binocular disparity as a result of the horizontal separation parallax of the left and right eyes.

Perception of depth is based on a variety of cues, with binocular disparity and motion parallax generally providing more precise depth information than pictorial cues. Binocular disparity and motion parallax provide two independent quantitative cues for depth perception. Binocular disparity refers to the difference in position between the two retinal image projections of a point in 3D space. As illustrated in FIGS. 1A and 1B, the robust precepts of depth that are obtained when viewing an object 102 in an image scene 110 demonstrates that the brain can compute depth from binocular disparity cues alone. In binocular vision, the Horopter 112 is the locus of points in space that have the same disparity as the fixation point 114. Objects lying on a horizontal line passing through the fixation point 114 results in a single image, while objects a reasonable distance from this line result in two images 116, 118.

Classical motion parallax is dependent upon two eye functions. One is the tracking of the eye to the motion (eyeball moves to fix motion on a single spot) and the second is smooth motion difference leading to parallax or binocular disparity. Classical motion parallax is when the observer is stationary and the scene around the observer is translating or the opposite where the scene is stationary, and the observer translates across the scene.

By using two images 116, 118 of the same object 102 obtained from slightly different angles, it is possible to triangulate the distance to the object 102 with a high degree of accuracy. Each eye views a slightly different angle of the object 102 seen by the left eye 104 and right eye 106. This happens because of the horizontal separation parallax of the eyes. If an object is far away, the disparity 108 of that image 110 falling on both retinas will be small. If the object is close or near, the disparity 108 of that image 110 falling on both retinas will be large.

Motion parallax 120 refers to the relative image motion (between objects at different depths) that results from translation of the observer 104. Isolated from binocular and pictorial depth cues, motion parallax 120 can also provide precise depth perception, provided that it is accompanied by ancillary signals that specify the change in eye orientation relative to the visual scene 110. As illustrated, as eye orientation 104 changes, the apparent relative motion of the object 102 against a background gives hints about its relative distance. If the object 102 is far away, the object 102 appears stationary. If the object 102 is close or near, the object 102 appears to move more quickly.

In order to see the object 102 in close proximity and fuse the image on both retinas into one object, the optical axes of both eyes 104, 106 converge on the object 102. The muscular action changing the focal length of the eye lens so as to place a focused image on the fovea of the retina is called accommodation. Both the muscular action and the lack of focus of adjacent depths provide additional information to the brain that can be used to sense depth. Image sharpness is an ambiguous depth cue. However, by changing the focused plane (looking closer and/ or further than the object 102), the ambiguities are resolved.

Figure 2A:
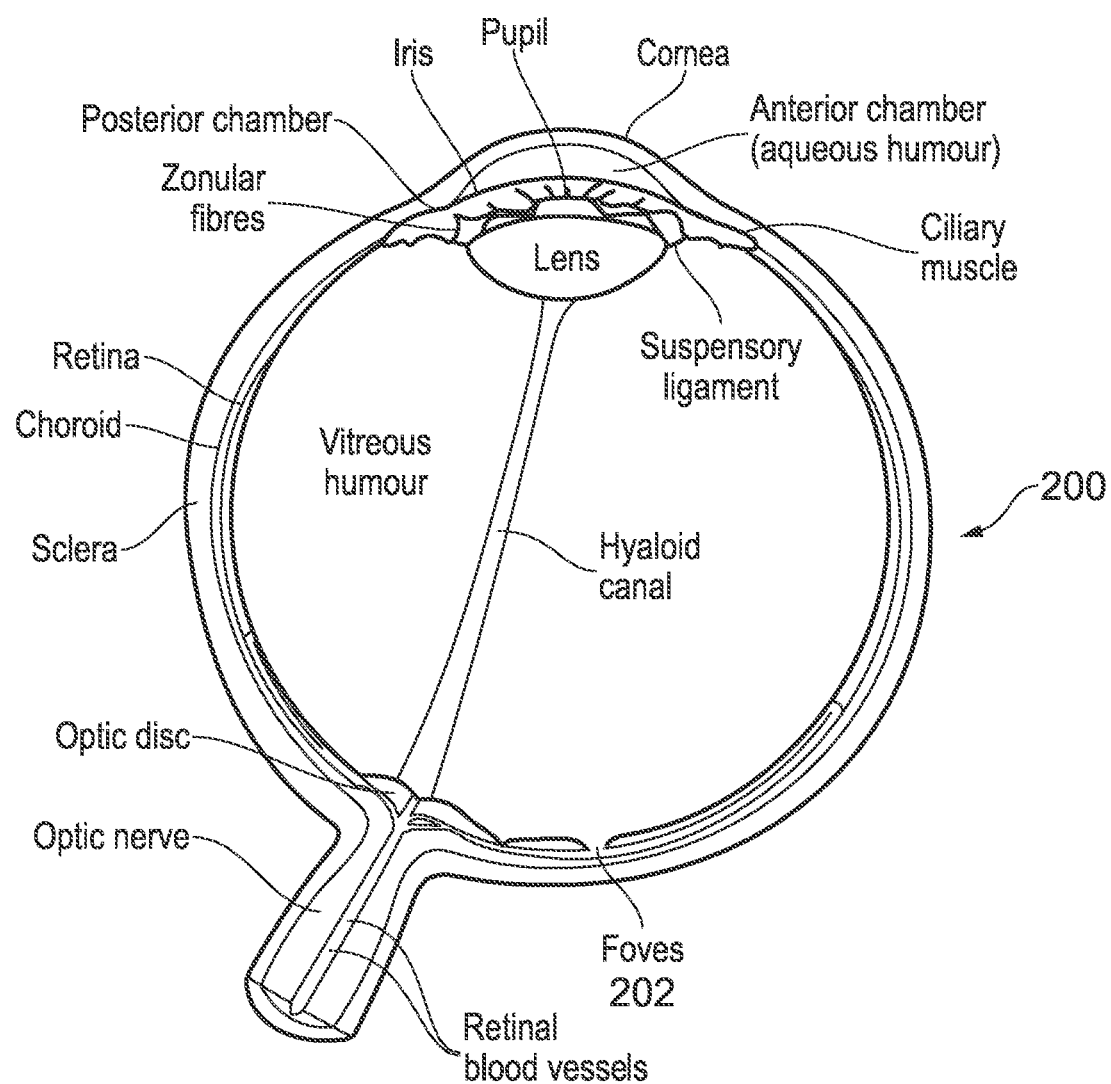
FIG. 2A is an illustration of a cross-section view of the structure of the human eyeball.
Figure 2B:
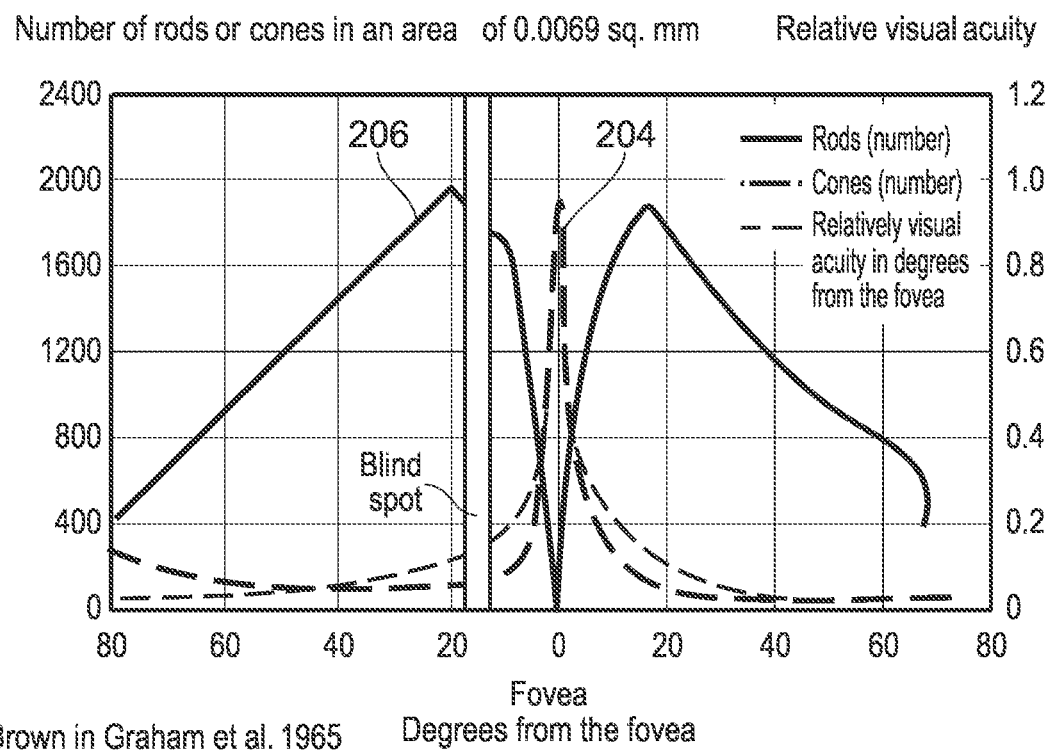
FIG. 2B is a graph relating density of rods and cones to the position of the fovea.

FIGS. 2A and 2B show the anatomy of the eye 200 and a graphical representation of the distribution of rods and cones, respectively. The fovea 202 is responsible for sharp central vision (also referred to as foveal vision), which is necessary where visual detail is of primary importance. The fovea 202 is the depression in the inner retinal surface 205, about 1.5 mm wide and is made up entirely of cones 204 specialized for maximum visual acuity. Rods 206 are low intensity receptors that receive information in grey scale and are important to peripheral vision, while cones 204 are high intensity receptors that receive information in color vision. The importance of the fovea 202 will be understood more clearly with reference to FIG. 2B, which shows the distribution of cones 204 and rods 206 in the eye 200. As shown, a large proportion of cones 204, providing the highest visual acuity, lie within a 1.5° angle around the center of the fovea 202.

The importance of the fovea 202 will be understood more clearly with reference to FIG. 2B, which shows the distribution of cones 204 and rods 206 in the eye 200. As shown, a large proportion of cones 204, providing the highest visual acuity, lie within a 1.5° angle around the center of the fovea 202.

Figure 3:
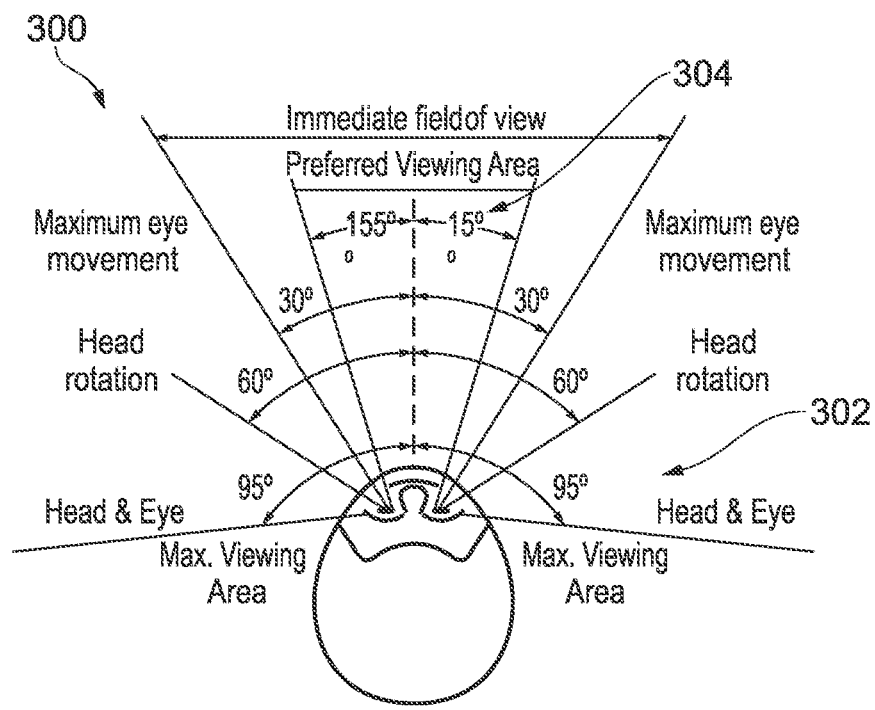
FIG. 3 is a top view illustration of an observer's field of view.

FIG. 3 illustrates a typical field of view 300 of the human visual system (HVS). As shown, the fovea 202 sees only the central 1.5° (degrees) of the visual field 302, with the preferred field of view 304 lying within ±15° (degrees) of the center of the fovea 202. Focusing an object on the fovea, therefore, depends on the linear size of the object 102, the viewing angle and the viewing distance. A large object 102 viewed in close proximity will have a large viewing angle falling outside the foveal vision, while a small object 102 viewed at a distance will have a small viewing angle falling within the foveal vision. An object 102 that falls within the foveal vision will be produced in the mind's eye with high visual acuity. However, under natural viewing conditions, viewers do not just passively perceive. Instead, they dynamically scan the visual scene 110 by shifting their eye fixation and focus between objects at different viewing distances. In doing so, the oculomotor processes of accommodation and vergence (the angle between lines of sight of the left eye 104 and right eye 106) must be shifted synchronously to place new objects in sharp focus in the center of each retina. Accordingly, nature has reflexively linked accommodation and vergence, such that a change in one process automatically drives a matching change in the other.

Figure 4A:
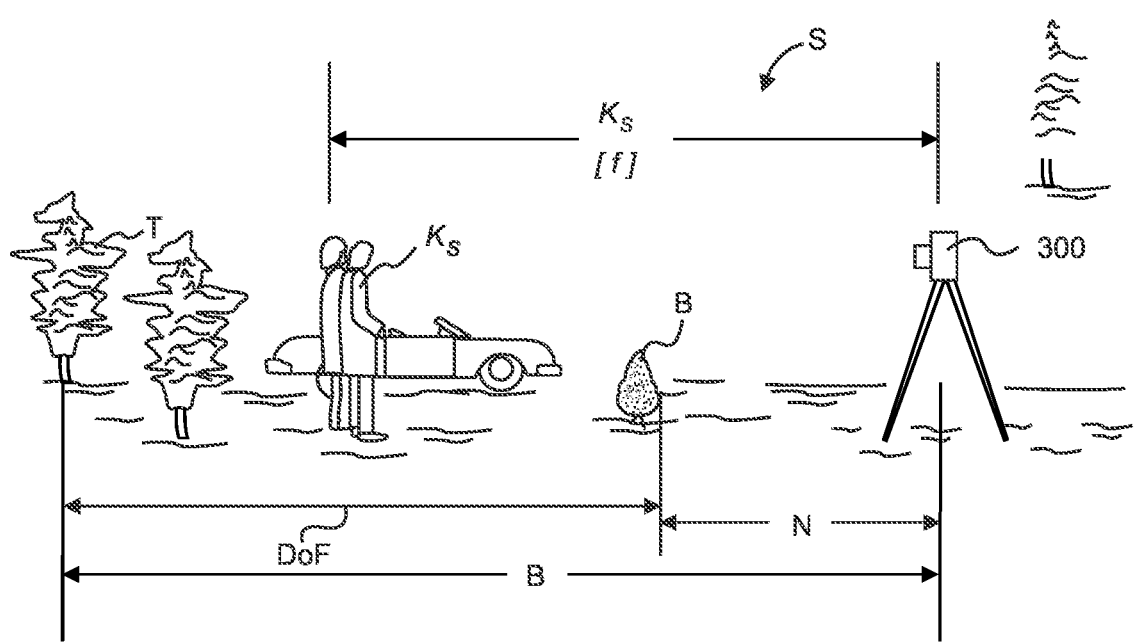
FIG. 4A is a side view illustration identifying planes of a scene captured using a camera or other capture device.

FIG. 4A illustrates a typical view of a scene S to be captured by a camera or digital image capture device, such as image capture module 830. Scene S may include four planes defined as: (1) Lens frame is defined as the plane passing through the lens or sensor (image capture module 830) in the recording device or camera, (2) Key Subject plane KSP may be the plane passing through the focal point of the sensor in the scene (here couple in the scene, the Key Subject KS of the scene S), (3) Near Plane NP may be the plane passing through the closest point in focus to the lens plane (the bush B in the foreground), and (4) Far Plane FP which is the plane passing through the furthest point in focus (tree T in the background). The relative distances from image capture module 830 are denoted by N, Ks, B. Depth of field of the scene S is defined by the distance between Near Plane NP and Far Plane FP.

As described above, the sense of depth of a stereoscopic image varies depending on the distance between the camera and the key subject, known as the image capturing distance or KS. The sense of depth is also controlled by the vergence angle and the intraocular distance between the capture of each successive image by the camera which effects binocular disparity.

In photography the Circle of Confusion defines the area of a scene S that is captured in focus. Thus, the near plane NP, key subject plane KSP and the far plane FP are in focus. Areas outside this circle are blurred.

Figure 4B:
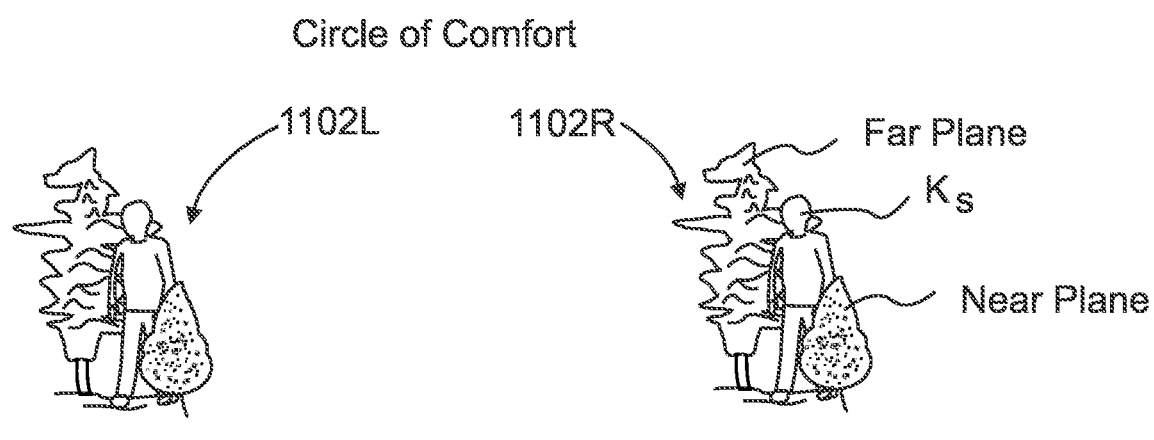
FIG. 4B A is a front view illustration of an exemplary embodiment of two images of a scene in FIG. 4A captured utilizing capture devices shown in FIGS. 8G.
Figure 8A:
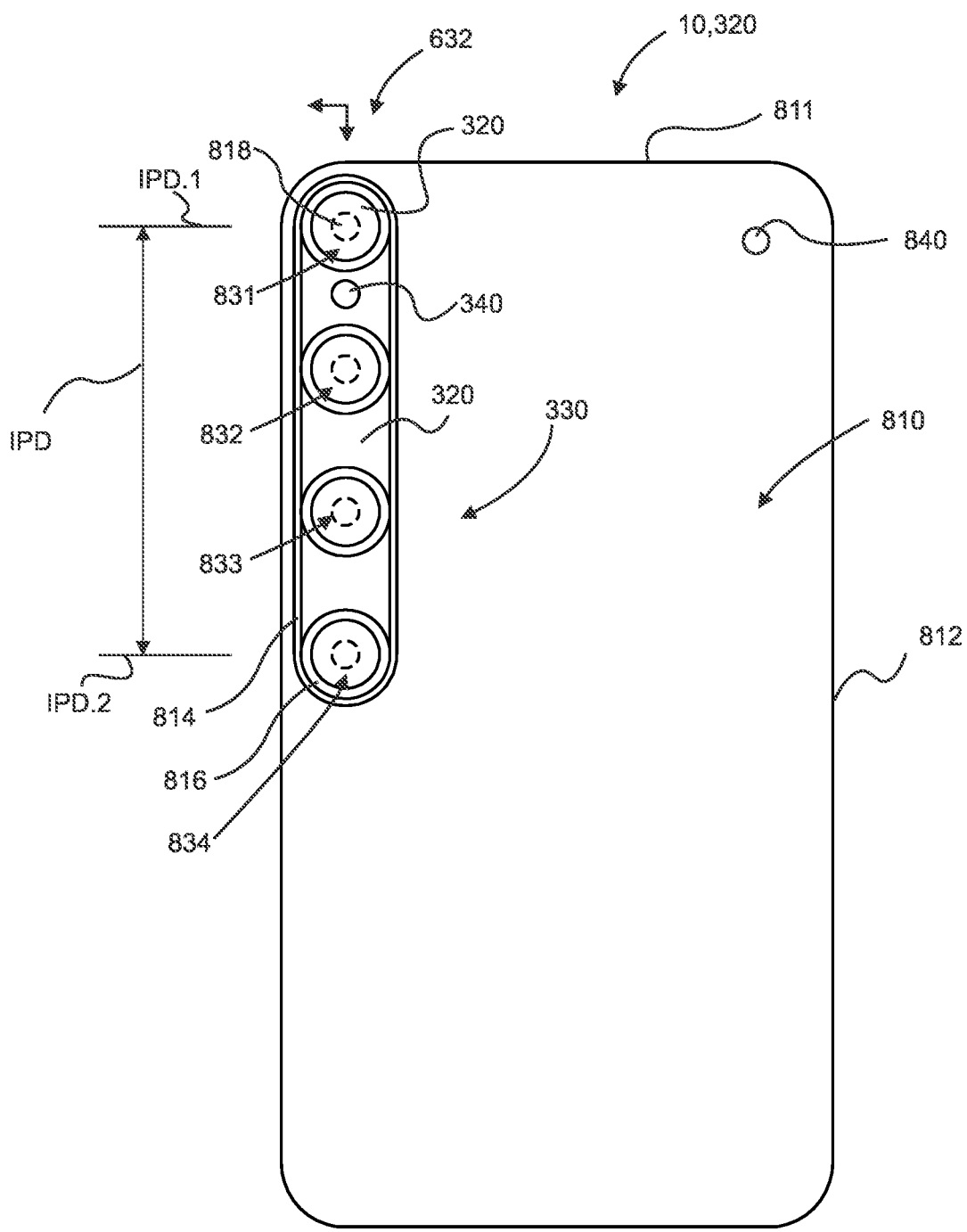
FIG. 8A is a diagram of an exemplary embodiment of a computing device with four image capture devices positioned vertically in series linearly within an intraocular or interpupillary distance width, the distance between an average human's pupils.
Figure 8B:
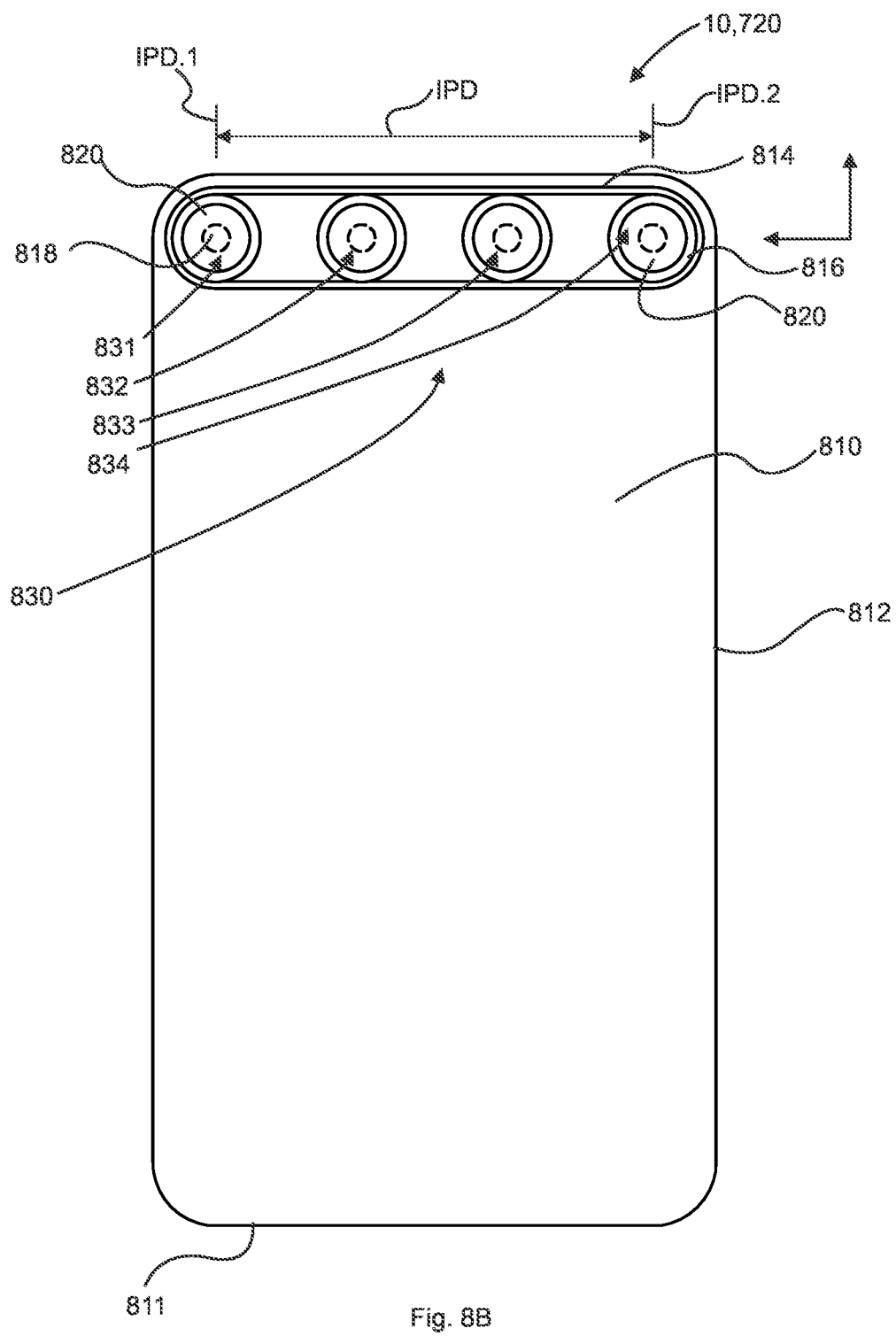
FIG. 8B is a diagram of an exemplary embodiment of a computing device with four image capture devices positioned horizontally in series linearly within an intraocular or interpupillary distance width, the distance between an average human's pupils.
Figure 8C:
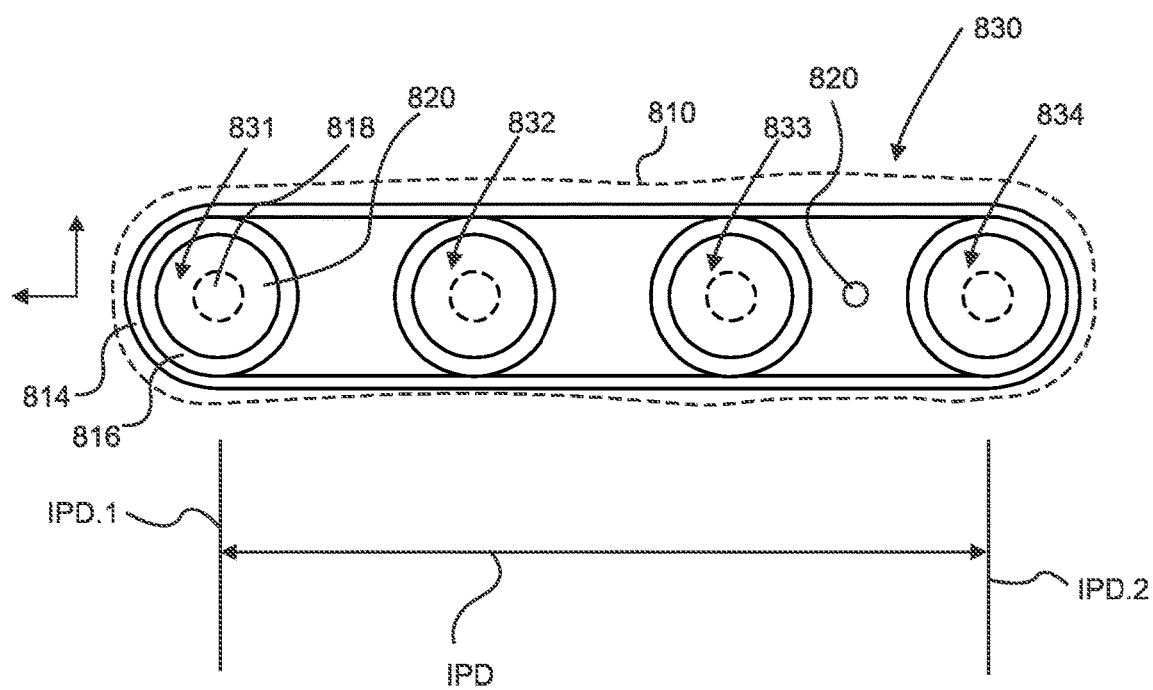
FIG. 8C is an exploded diagram of an exemplary embodiment of the four image capture devices in series linearly of FIGS. 8A and 8B.
Figure 8D:
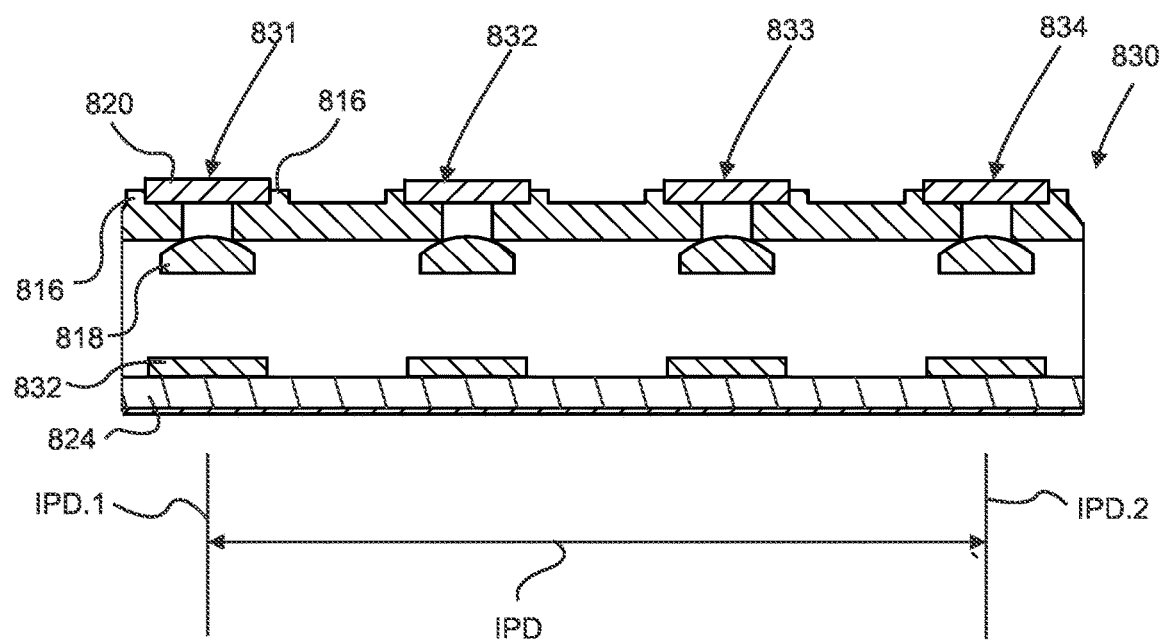
FIG. 8D is a cross-sectional diagram of an exemplary embodiment of the four image capture devices in series linearly of FIGS. 8A and 8B.
Figure 8E:
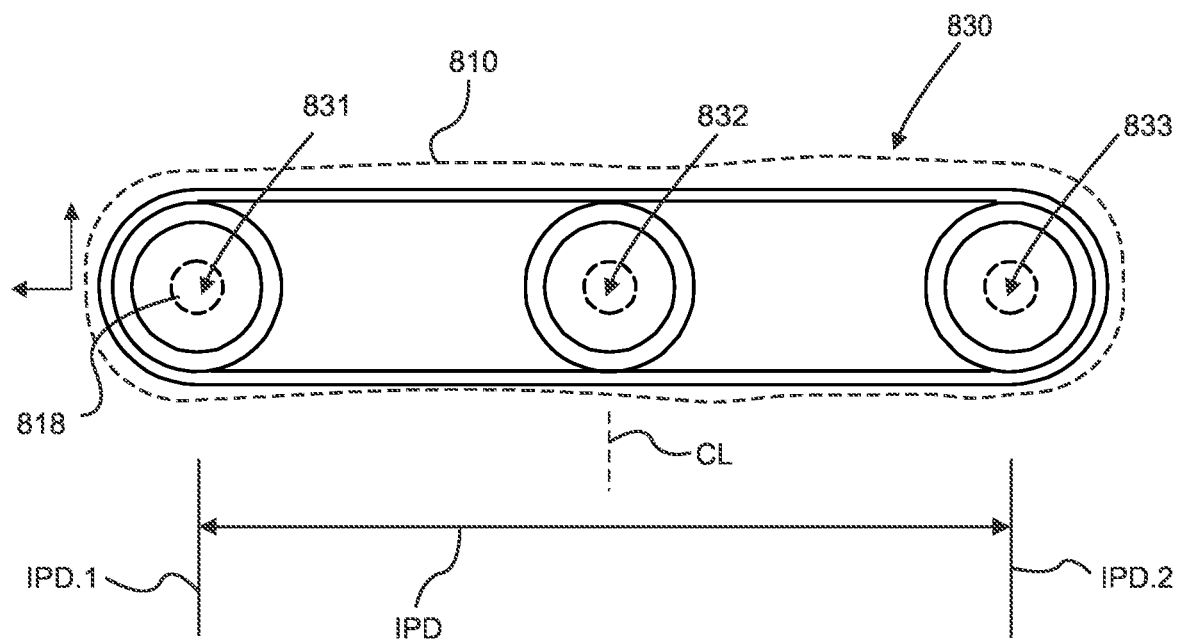
FIG. 8E is an exploded diagram of an exemplary embodiment of the three image capture devices in series linearly within an intraocular or interpupillary distance width, the distance between an average human's pupils.
Figure 8F:
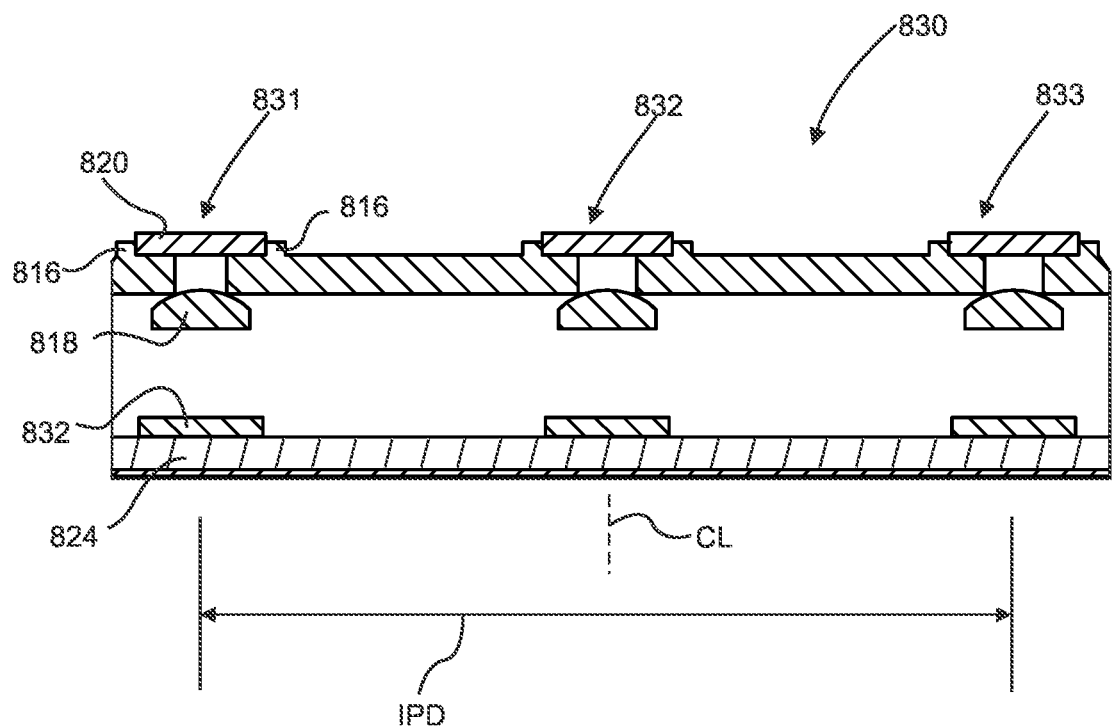
FIG. 8F is a cross-sectional diagram of an exemplary embodiment of the three image capture devices in series linearly of FIG. 8E.
Figure 8G:
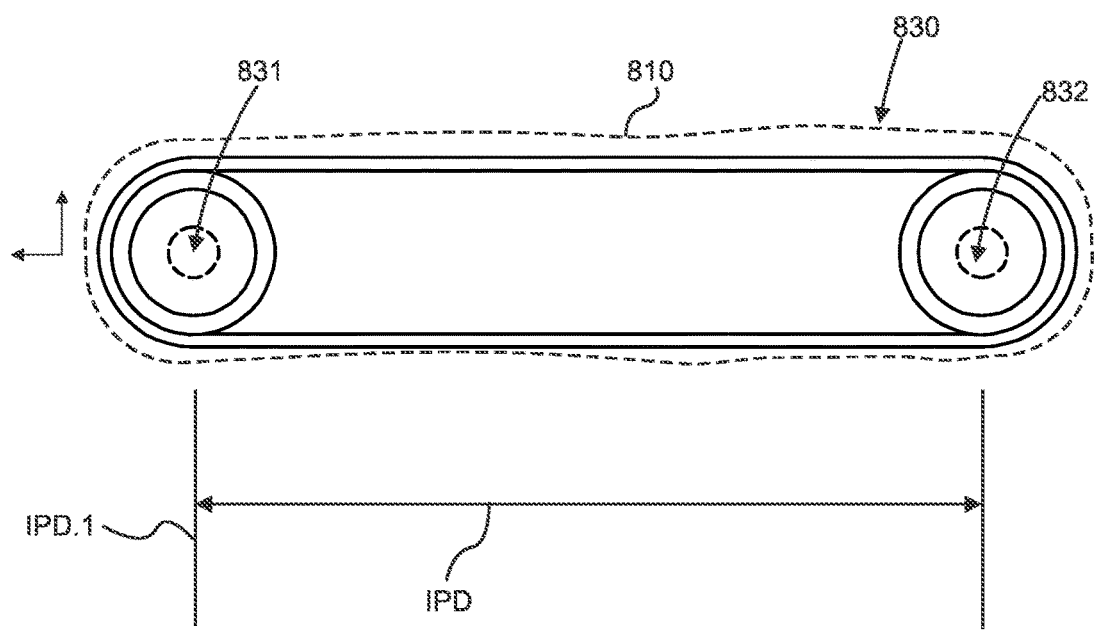
FIG. 8G is an exploded diagram of an exemplary embodiment of the two image capture devices in series linearly within an intraocular or interpupillary distance width, the distance between an average human's pupils.

FIG. 4B illustrates a typical view of a scene S to be captured by a camera or digital image capture device, such as image capture module 830, more specifically image capture module 830 shown in FIG. 8G. Two image capture devices 831 and 832, or any other selected pair 831, 832, 833, 834 may be utilized to capture plurality of digital images of scene S as left image 810L and right image 810R of scene S, shown in FIG. 8A (plurality of digital images). Alternatively, computer system 10 via image manipulation application and display 208 may be configured to enable user U to select or identify two image capture devices of image capture devices 831 (1), 832 (2), 833 (3), or 834 (4) to capture two digital images of scene S as left image 810L and right image 810R of scene S. User U may tap or other identification interaction with selection box 812 to select or identify key subject KS in the source images, left image 810L and right image 810R of scene S, as shown in FIG. 4B

Figure 5:
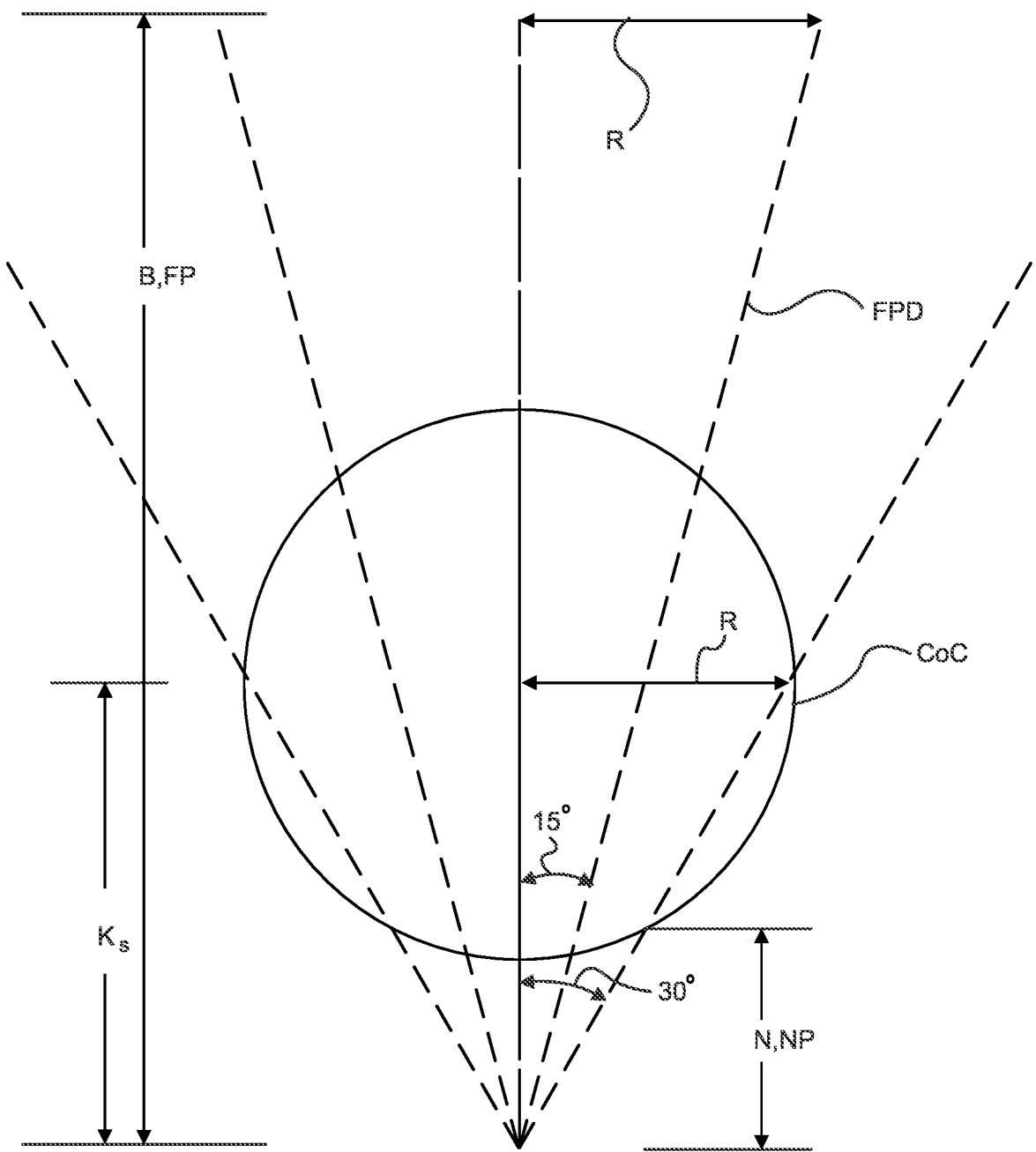
FIG. 5 is a top view illustration identifying planes of a scene and a circle of comfort in scale with FIG. 4.

FIG. 5 illustrates a Circle of Comfort (CoC) in scale with FIGS. 4.1 and 3.1. Defining the Circle of Comfort (CoC) as the circle formed by passing the diameter of the circle along the perpendicular to Key Subject plane KSP (in scale with FIG. 4) with a width determined by the 30 degree radials of FIG. 3) from the center point on the lens plane, image capture module 830. (R is the radius of Circle of Comfort (CoC).)

Conventional stereoscopic displays forces viewers to try to decouple these processes, because while they must dynamically vary vergence angle to view objects at different stereoscopic distances, they must keep accommodation at a fixed distance or else the entire display will slip out of focus. This decoupling generates eye fatigue and compromises image quality when viewing such displays.

In order to understand the present disclosure certain variables, need to be defined. The object field is the entire image being composed. The "key subject point" is defined as the point where the scene converges, i.e., the point in the depth of field that always remains in focus and has no parallax differential in the key subject point. The foreground and background points are the closest point and furthest point from the viewer, respectively. The depth of field is the depth or distance created within the object field (depicted distance from foreground to background). The principal axis is the line perpendicular to the scene passing through the key subject point. The parallax or binocular disparity is the difference in the position of any point in the first and last image after the key subject alignment. In digital composition, the key subject point displacement from the principal axis between frames is always maintained as a whole integer number of pixels from the principal axis. The total parallax is the summation of the absolute value of the displacement of the key subject point from the principal axis in the closest frame and the absolute value of the displacement of the key subject point from the principal axis in the furthest frame.

When capturing images herein, applicant refers refer to depth of field or circle of confusion and circle of comfort is referred to when viewing image on the viewing device.

U.S. Pat. Nos. 9,992,473, 10,033,990, and 10,178,247 are incorporated herein by reference in their entirety.

Creating depth perception using motion parallax is known. However, in order to maximize depth while maintaining a pleasing viewing experience, a systematic approach is introduced. The system combines factors of the human visual system with image capture procedures to produce a realistic depth experience on any 2D viewing device.

The technique introduces the Circle of Comfort (CoC) that prescribe the location of the image capture system relative to the scene S. The Circle of Comfort (CoC) relative to the Key Subject KS (point of convergence, focal point) sets the optimum near plane NP and far plane FP, i.e., controls the parallax of the scene S.

The system was developed so any capture device such as iPhone, camera or video camera can be used to capture the scene. Similarly, the captured images can be combined and viewed on any digital output device such as smart phone, tablet, monitor, TV, laptop, or computer screen.

As will be appreciated by one of skill in the art, the present disclosure may be embodied as a method, data processing system, or computer program product. Accordingly, the present disclosure may take the form of an entirely hardware embodiment, entirely software embodiment or an embodiment combining software and hardware aspects. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These computer program instructions or operations may be loaded onto a general purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps.

Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, and the like. However, it is understood that other source or object oriented programming languages, and other conventional programming language may be utilized without departing from the spirit and intent of the present disclosure.

Figure 6:
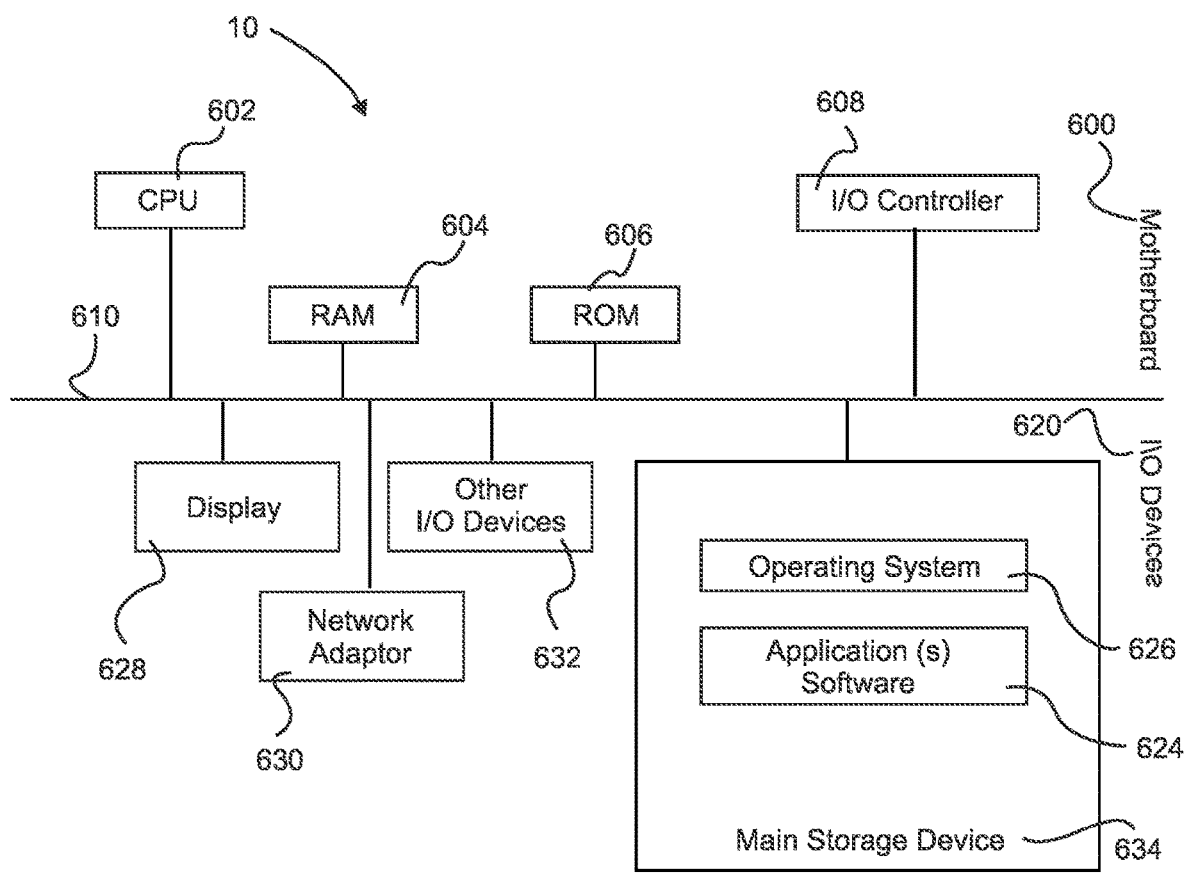
FIG. 6 is a block diagram of a computer system of the present disclosure.

Referring now to FIG. 6, there is illustrated a block diagram of a computer system 10 that provides a suitable environment for implementing embodiments of the present disclosure. The computer architecture shown in FIG. 6 is divided into two parts—motherboard 600 and the input/output (I/O) devices 620. Motherboard 600 preferably includes subsystems or processor to execute instructions such as central processing unit (CPU) 602, a memory device, such as random access memory (RAM) 604, input/ output (I/O) controller 608, and a memory device such as read-only memory (ROM) 606, also known as firmware, which are interconnected by bus 10. A basic input output system (BIOS) containing the basic routines that help to transfer information between elements within the subsystems of the computer is preferably stored in ROM 606, or operably disposed in RAM 604. Computer system 10 further preferably includes I/O devices 620, such as main storage device 634 for storing operating system 626 and executes an instruction via application program(s) 624, and display 628 for visual output, and other I/O devices 632 as appropriate. Main storage device 634 preferably is connected to CPU 602 through a main storage controller (represented as 608) connected to bus 610. Network adapter 630 allows the computer system to send and receive data through communication devices or any other network adapter capable of transmitting and receiving data over a communications link that is either a wired, optical, or wireless data pathway. It is recognized herein that central processing unit (CPU) 602 performs instructions, operations or commands stored in ROM 606 or RAM 604.

It is contemplated herein that computer system 10 may include smart devices, such as smart phone, iPhone, android phone (Google, Samsung, or other manufactures), tablets, desktops, laptops, digital image capture devices, and other computing devices with two or more digital image capture devices and/or 3D display 608 (smart device).

It is further contemplated herein that display 608 may be configured as a foldable display or multi-foldable display capable of unfolding into a larger display surface area.

Many other devices or subsystems or other I/O devices 632 may be connected in a similar manner, including but not limited to, devices such as microphone, speakers, flash drive, CD-ROM player, DVD player, printer, main storage device 634, such as hard drive, and/or modem each connected via an I/O adapter. Also, although preferred, it is not necessary for all of the devices shown in FIG. 6 to be present to practice the present disclosure, as discussed below. Furthermore, the devices and subsystems may be interconnected in different configurations from that shown in FIG. 6, or may be based on optical or gate arrays, or some combination of these elements that is capable of responding to and executing instructions or operations. The operation of a computer system such as that shown in FIG. 6 is readily known in the art and is not discussed in further detail in this application, so as not to overcomplicate the present discussion.

Figure 7:
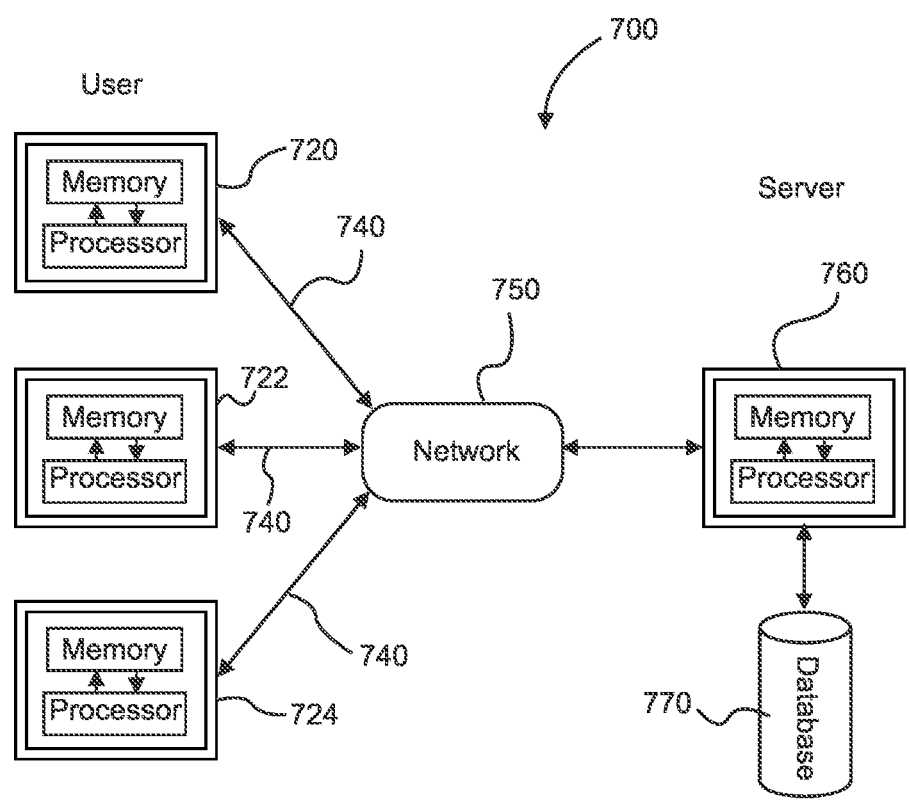
FIG. 7 is a block diagram of a communications system implemented by the computer system in FIG. 1.

Referring now to FIG. 7, there is illustrated a diagram depicting an exemplary communication system 700 in which concepts consistent with the present disclosure may be implemented. Examples of each element within the communication system 700 of FIG. 7 are broadly described above with respect to FIG. 6. In particular, the server system 760 and user system 720 have attributes similar to computer system 10 of FIG. 6 and illustrate one possible implementation of computer system 10. Communication system 700 preferably includes one or more user systems 720, 722, 724 (It is contemplated herein that computer system 10 may include smart devices, such as smart phone, iPhone, android phone (Google, Samsung, or other manufactures), tablets, desktops, laptops, cameras, and other computing devices with display 628 (smart device)), one or more server system 760, and network 750, which could be, for example, the Internet, public network, private network or cloud. User systems 720-724 each preferably includes a computer-readable medium, such as random access memory 604, 606, coupled to a processor. The processor, CPU 702, executes program instructions or operations (application software 624) stored in memory 604, 606. Communication system 700 typically includes one or more user system 720. For example, user system 720 may include one or more general-purpose computers (e.g., personal computers), one or more special purpose computers (e.g., devices specifically programmed to communicate with each other and/or the server system 760), a workstation, a server, a device, a digital assistant or a "smart" cellular telephone or pager, a digital camera, a component, other equipment, or some combination of these elements that is capable of responding to and executing instructions or operations.

Similar to user system 720, server system 760 preferably includes a computer-readable medium, such as random access memory 604, 606, coupled to a processor. The processor executes program instructions stored in memory 604, 606. Server system 760 may also include a number of additional external or internal devices, such as, without limitation, a mouse, a CD-ROM, a keyboard, a display, a storage device and other attributes similar to computer system 10 of FIG. 6. Server system 760 may additionally include a secondary storage element, such as database 770 for storage of data and information. Server system 760, although depicted as a single computer system, may be implemented as a network of computer processors. Memory 604, 606 in server system 760 contains one or more executable steps, program(s), algorithm(s), or application(s) 624 (shown in FIG. 6). For example, the server system 760 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

Communications system 700 is capable of delivering and exchanging data (including three-dimensional 3D image files) between user systems 720 and a server system 760 through communications link 740 and/or network 750. Through user system 720, users can preferably communicate data over network 750 with each other user system 720, 722, 724, and with other systems and devices, such as server system 760, to electronically transmit, store, print and/or view multidimensional digital master image(s). Communications link 740 typically includes network 750 making a direct or indirect communication between the user system 720 and the server system 760, irrespective of physical separation. Examples of a network 750 include the Internet, cloud, analog or digital wired and wireless networks, radio, television, cable, satellite, and/or any other delivery mechanism for carrying and/or transmitting data or other information, such as to electronically transmit, store, print and/or view multidimensional digital master image(s). The communications link 740 may include, for example, a wired, wireless, cable, optical or satellite communication system or other pathway.

Referring again to FIG. 2A, 5, 8A-8F, and 14B for best results and simplified math, the intraocular distance between the capture of successive images or frames of the scene S is fixed to match the average separation of the human left and right eyes in order to maintain constant binocular disparity. In addition, the distance to key subject KS is chosen such that the captured image of the key subject is sized to fall within the foveal vision of the observer in order to produce high visual acuity of the key subject and to maintain a vergence angle equal to or less than the preferred viewing angle of fifteen degrees (15).

FIGS. 8A-8F disclose an image or frame capture system for capturing a stereoscopic image (e.g., a 2D frame of a 3D sequence) of scene S, such as FIG. 4. Here the image capture distance, the distance from the image capture system and points or planes in the scene S, such as key subject KS and focal length of camera (i.e., zooming in and out) may be ideally held constant while capturing a stereoscopic image (e.g., a 2D frame of a 3D sequence) of scene S; however, the vergence angle will vary accordingly if the spacing between the capture devices of each successive stereoscopic image is kept constant.

Referring now to FIG. 8A, by way of example, and not limitation, there is illustrated a computer system 10, such as smart device or portable smart device having back side 810, a first edge, such as short edge 811 and a second edge, such as long edge 812. Back side 810 may include I/O devices 632, such as an exemplary embodiment of image capture module 830 and may include one or more sensors 840 to measure distance between computer system 10 and selected depths in an image or scene S (depth). Image capture module 830 may include a plurality or four digital image capture devices 831, 832, 833, 834 with four digital image capture devices (positioned vertically, in series linearly within an intraocular or interpupillary distance width IPD (distance between pupils of human visual system within a Circle of Comfort relationship to optimize digital multi-dimensional images for the human visual system) as to back side 810 or proximate and parallel thereto long edge 812. Interpupillary distance width IPD is preferably the distance between an average human's pupils may have a distance between approximately two and a half inches, 2.5 inches (6.35 cm), more preferably between approximately 40-80 mm, the vast majority of adults have IPDs in the range 50-75 mm, the wider range of 45-80 mm is likely to include (almost) all adults, and the minimum IPD for children (down to five years old) is around 40 mm). It is contemplated herein that plurality of image capture modules 830 and may include one or more sensors 840 may be configured as combinations of image capture device 830 and sensor 840 configured as an integrated unit or module where sensor 840 controls or sets the depth of image capture device 830, whether different depths in scene S, such as foreground, and person P or object, background, such as closest point CP, key subject point KS, and a furthest point FP, shown in FIG. 4. For reference herein plurality of image capture devices, may include first digital image capture device 831 centered proximate first end IPD IPD.1 of interpupillary distance width IPD, fourth digital image capture device 834 centered proximate second end IPD.2 of interpupillary distance width IPD, and remaining digital image capture devices second digital image capture device 832 and third digital image capture device 833 evenly spaced therebetween first end IPD IPD.1 and second end IPD.2 of interpupillary distance width IPD, respectively.

It is contemplated herein that smart device or portable smart device with a display may be configured as rectangular or square or other like configurations providing a surface area having first edge 811 and second edge 812.

It is contemplated herein that digital image capture devices 831-834 or image capture module 830 may be surrounded by recessed, stepped, or beveled edge 814, each image capture devices 831-34 may be encircled by recessed, stepped, or beveled ring 816, and digital image capture devices 831-34 or image capture module 830 may be covered by lens cover 820 with a lens thereunder lens 818.

It is contemplated herein that digital image capture devices 831-34 may be individual capture devices and not part of image capture module.

It is further contemplated herein that digital image capture devices 831-34 may be positioned anywhere on back side 810 and generally parallel thereto long edge 812.

It is contemplated herein that image capture devices may include additional capture devices positioned within an intraocular or interpupillary distance width IPD.

It is further contemplated herein that digital image capture devices 831-34 may be utilized to capture a series of 2D images of the scene S.

Referring now to FIG. 8B, by way of example, and not limitation, there is illustrated a computer system 10 or other smart device or portable smart device having back side 810, short edge 811 and a long edge 812. Back side 810 may include I/O devices 632, such as an exemplary embodiment of image capture module 830 and may include one or more sensors 840 to measure distance between computer system 10 and selected depths in an image or scene S (depth). Image capture module 830 may include a plurality or four digital image capture devices 831, 832, 833, 834 with four digital image capture devices (positioned vertically, in series linearly within an intraocular or interpupillary distance width IPD (distance between pupils of human visual system within a Circle of Comfort relationship to optimize digital multi-dimensional images for the human visual system) as to back side 810 or proximate and parallel thereto short edge 812. It is contemplated herein that plurality of image capture modules 830 and may include one or more sensors 840 may be configured as combinations of image capture device 830 and sensor 840 configured as an integrated unit or module where sensor 840 controls or sets the depth of image capture device 830, such as different depths in scene S, such as foreground, background, and person P or object, such as closest point CP, key subject point KS, and furthest point FP, shown in FIG. 4. For reference herein plurality of image capture devices, may include first digital image capture device 831 centered proximate first end IPD IPD.1 of interpupillary distance width IPD, fourth digital image capture device 834 centered proximate second end IPD.2 of interpupillary distance width IPD, and remaining image capture devices second digital image capture device 832 and third digital image capture device 833 evenly spaced therebetween first end IPD IPD.1 and second end IPD.2 of interpupillary distance width IPD.

It is contemplated herein that digital image capture devices 831-34 or image capture module 830 may be surrounded by recessed, stepped, or beveled edge 814, each image capture devices 831-34 may be encircled by recessed, stepped, or beveled ring 816, and image capture devices 831-34 or image capture module 830 may be covered by lens cover 820 with a lens thereunder lens 818.

It is contemplated herein that digital image capture devices 831-34 may be individual capture devices and not part of image capture module.

It is further contemplated herein that digital image capture devices 831-34 may be positioned anywhere on back side 810 and generally parallel thereto long edge 812.

It is further contemplated herein that digital image capture devices 831-34 may be utilized to capture a series of 2D images of the scene S.

With respect to computer system 10 and image capture devices 830, it is to be realized that the optimum dimensional relationships, to include variations in size, materials, shape, form, position, connection, function and manner of operation, assembly and use, are intended to be encompassed by the present disclosure.

Figure 9:
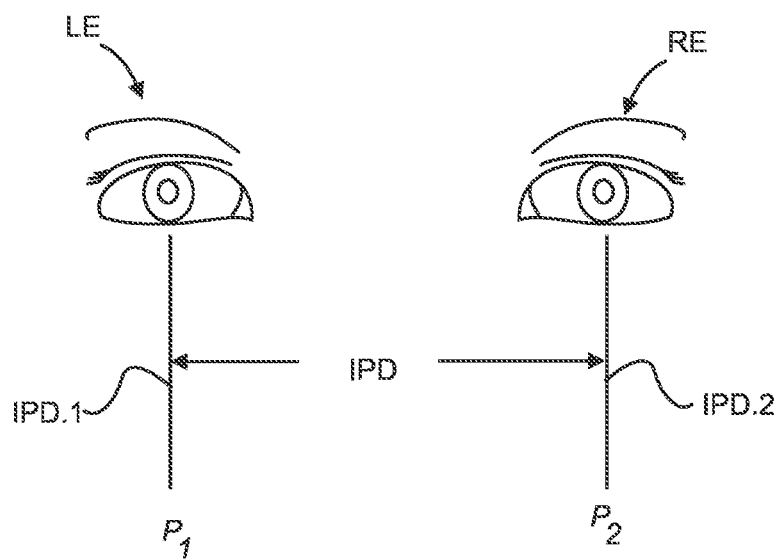
FIG. 9 is a diagram of an exemplary embodiment of human eye spacing the intraocular or interpupillary distance width, the distance between an average human's pupils.

In this disclosure interpupillary distance width IPD may have a measurement of width to position digital image capture devices 831-334 center-to-center within between approximately maximum width of 115 millimeter to a minimum width of 50 millimeter; more preferably approximately maximum width of 72.5 millimeter to a minimum width of 53.5 millimeter; and most preferably between approximately maximum mean width of 64 millimeter to a minimum mean width of 61.7 millimeter, and an average width of 63 millimeter (2.48 inches) center-to-center width of the human visual system shown in FIG. 9.

Referring again to FIGS. 1A, 1B, 2A, 5, 9, 14B binocular disparity is a stereognostic perception factor that occurs as a result of the average separation of the left and right eyes by approximately 64 mm. When binocular disparity is comparatively large, the observer has the sense that the distance to the key subject is relatively close. When the binocular disparity is comparatively small, the observer has the sense that the distance to the key subject KS is relatively far or large. The vergence angle V refers to the angle between the left and right eyes having the key subject as a vertex when the eyes are focused on the key subject KS. As the vergence angle increases (as both eyes rotate inward), the distance of the key subject KS is perceived by the observer as being relatively small. As the vergence angle decreases (as both eyes rotate outward), the distance of the key subject KS is perceived by the observer as being relatively large.

Referring now to FIG. 8C, by way of example, and not limitation, there is illustrated an exploded diagram of an exemplary embodiment of image capture module 830. Image capture module 830 may include digital image capture devices 831-834 with four image capture devices in series linearly within an intraocular or interpupillary distance width IPD, the distance between an average human's pupil. Digital image capture devices 831-834 may include first digital image capture device 831, second digital image capture device 832, third digital image capture device 833, fourth digital image capture device 834. First digital image capture device 831 may be centered proximate first end IPD IPD.1 of interpupillary distance width IPD, fourth digital image capture device 834 may be centered proximate second end IPD.2 of interpupillary distance width IPD, and remaining digital image capture devices, such as second digital image capture device 832 and third digital image capture device 833 may be positioned or evenly spaced therebetween first end IPD IPD.1 and second end IPD.2 of interpupillary distance width IPD. In one embodiment each digital image capture devices 831-834 or lens 818 may surrounded by beveled edge 814, encircled by ring 816, and/or covered by lens cover 820 with a lens thereunder lens 818.

It is further contemplated herein that digital image capture devices 831-34 may be utilized to capture a series of 2D images of the scene S.

Referring now to FIG. 8D, by way of example, and not limitation, there is illustrated a cross-sectional diagram of an exemplary embodiment of image capture module 830, of FIG. 8C. Image capture module 830 may include digital image capture devices 831-834 with four image capture devices in series linearly within an intraocular or interpupillary distance width IPD, the distance between an average human's pupil. Digital image capture devices 831-834 may include first digital image capture device 831, second digital image capture device 832, third digital image capture device 833, fourth digital image capture device 834. Each digital image capture devices 831-834 or lens 818 may be surrounded by beveled edge 814, encircled by ring 816, and/or covered by lens cover 820 with a lens thereunder lens 818. It is contemplated herein that digital image capture devices 831-834 may include optical module, such as lens 818 configured to focus light from scene S on sensor module, such as image capture sensor 822 configured to generate image signals of captured image of scene S, and data processing module 824 configured to generate image data for the captured image on the basis of the generated image signals from image capture sensor 822.

It is contemplated herein that other sensor components 822 to generate image signals for the captured image of scene S and other data processing module 824 to process or manipulate the image data may be utilized herein.

It is contemplated herein that when sensor 840 is not utilized to calculate different depths in scene S (distance from digital image capture devices 831-834 to foreground, background, and person P or object, such as closest point CP, key subject point KS, and furthest point FP, shown in FIG. 4) then a user may be prompted to capture the scene S images a set distance from digital image capture devices 831-834 to key subject point KS in a scene S, including but not limited to six feet (6 ft.) distance from closest point CP or key subject KS point of a scene S.

It is further contemplated herein that digital image capture devices 831-34 may be utilized to capture a series of 2D images of the scene S.

Referring now to FIG. 8E, by way of example, and not limitation, there is illustrated an exploded diagram of an exemplary embodiment of image capture module 830. Image capture module 830 may include digital image capture devices 831-833 with a plurality or three image capture devices in series linearly within an intraocular or interpupillary distance width IPD, the distance between an average human's pupil. Digital image capture devices 831-833 may include first digital image capture device 831, second digital image capture device 832, and third digital image capture device 833. First digital image capture device 831 may be centered proximate first end IPD IPD.1 of interpupillary distance width IPD, third digital image capture device 833 may be centered proximate second end IPD.2 of interpupillary distance width IPD, and remaining image capture devices, such as second digital image capture device 832 may be centered on center line CL therebetween first end IPD IPD.1 and second end IPD.2 of interpupillary distance width IPDE. In one embodiment each digital image capture devices 831-834 or lens 818 may surrounded by beveled edge 814, encircled by ring 816, and/or covered by lens cover 820 with a lens thereunder lens 818.

It is further contemplated herein that digital image capture devices 831-833 may be utilized to capture a series of 2D images of the scene S.

Referring now to FIG. 8F, by way of example, and not limitation, there is illustrated a cross-sectional diagram of an exemplary embodiment of image capture module 830, of FIG. 8E. Image capture module 830 may include digital image capture devices 831-833 with three image capture devices in series linearly within an intraocular or interpupillary distance width IPD, the distance between an average human's pupil. Digital image capture devices 831-833 may include first digital image capture device 831, second digital image capture device 832, and third digital image capture device 833. Each digital image capture devices 831-833 or lens 818 may be surrounded by beveled edge 814, encircled by ring 816, and/or covered by lens cover 820 with a lens thereunder lens 818. It is contemplated herein that digital image capture devices 831-833 may include optical module, such as lens 818 configured to focus an image of scene S on sensor module, such as image capture sensor 822 configured to generate image signals for the captured image of scene S, and data processing module 824 configured to generate image data for the captured image on the basis of the generated image signals from image capture sensor 822.

Referring now to FIG. 8G, by way of example, and not limitation, there is illustrated an exploded diagram of an exemplary embodiment of image capture module 830. Image capture module 830 may include a plurality or two digital image capture devices 831-832 with two image capture devices in series linearly within an intraocular or interpupillary distance width IPD, the distance between an average human's pupil. Image capture devices 831-832 may include first image capture device 831 and second image capture device 832. First image capture device 831 may be centered proximate first end IPD IPD.1 of interpupillary distance width IPD and second image capture device 832 may be centered proximate second end IPD.2 of interpupillary distance width IPD. In one embodiment each image capture devices 831-832 or lens 818 may surrounded by beveled edge 814, encircled by ring 816, and/or covered by lens cover 820 with a lens thereunder lens 818.

Figure 8H:
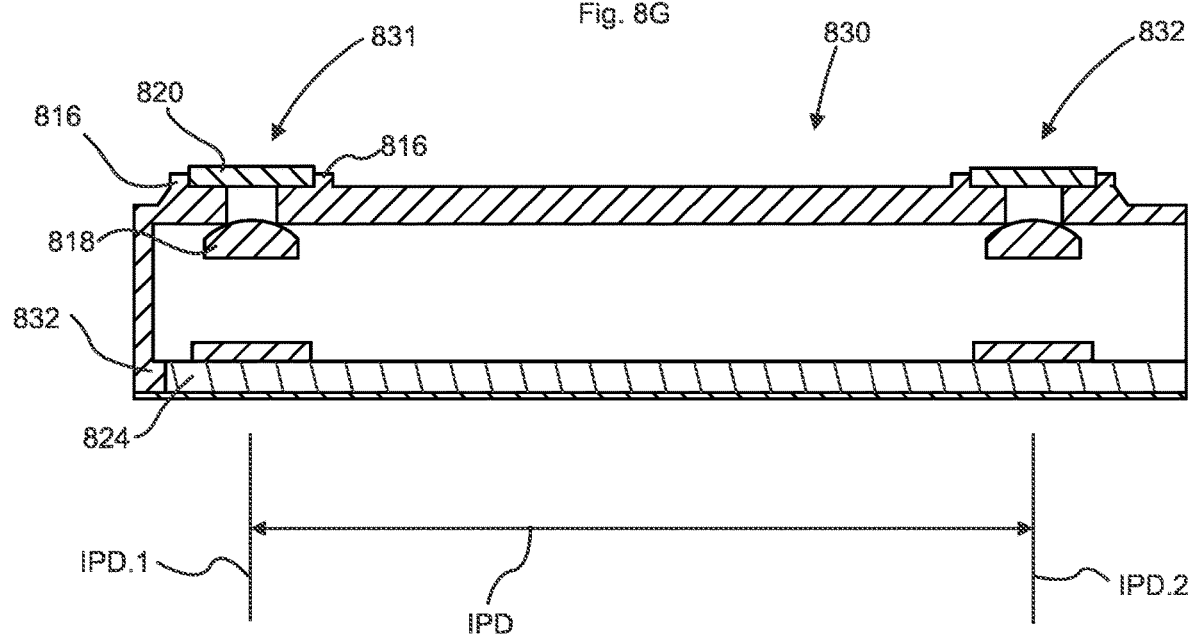
FIG. 8H is a cross-sectional diagram of an exemplary embodiment of the two image capture devices in series linearly of FIG. 8G.

Referring now to FIG. 8H, by way of example, and not limitation, there is illustrated an cross-sectional diagram of an exemplary embodiment of image capture module 830, of FIG. 8G. Image capture module 830 may include digital or image capture devices 831-832 with two image capture devices in series linearly within an intraocular or interpupillary distance width IPD, the distance between an average human's pupil. Image capture devices 831-832 may include first image capture device 831 and second image capture device 832. Each image capture devices 831-832 or lens 818 may be surrounded by beveled edge 814, encircled by ring 816, and/or covered by lens cover 820 with a lens thereunder lens 818. It is contemplated herein that image capture devices 831-832 may include optical module, such as lens 818 configured to focus an image of scene S on sensor module, such as image capture sensor 822 configured to generate image signals for the captured image of scene S, and data processing module 824 configured to generate image data for the captured image on the basis of the generated image signals from image capture sensor 822.

It is contemplated herein that other sensor components to generate image signals for the captured image of scene S and other data processing module 824 to process or manipulate the image data may be utilized herein.

It is contemplated herein that image capture module 830 and/or digital image capture devices 831-834 are used to obtain offset 2D digital image views of scene S. Moreover, it is further contemplated herein that image capture module 830 may include a plurality of image capture devices other than the number set forth herein, provided plurality of image capture devices is positioned approximately within intraocular or interpupillary distance width IPD, the distance between an average human's pupil. Furthermore, it is further contemplated herein that image capture module 830 may include a plurality of image capture devices positioned within a linear distance approximately equal to interpupillary distance width IPD. Still furthermore, it is further contemplated herein that image capture module 830 may include a plurality of image capture devices positioned vertically (computer system 10 or other smart device or portable smart device having short edge 811), horizontally (computer system 10 or other smart device or portable smart device having long edge 812) or otherwise positioned spaced apart in series linearly and within approximately within a linear distance approximately equal to interpupillary distance width IPD.

It is further contemplated herein that image capture module 830 and digital image capture devices 831-34 positioned linearly within the intraocular or interpupillary distance width IPD enables accurate scene S reproduction therein display 628 to produce a multidimensional digital image on display 628.

Referring now to FIG. 9, by way of example, and not limitation, there is illustrated a front facial view of a human with left eye LE and right eye RE and each having a midpoint of a pupil P1, P2 to illustrate the human eye spacing or the intraocular or interpupillary distance IPD width, the distance between an average human's visual system pupils. Interpupillary distance (IPD) is the distance measured in millimeters/inches between the centers of the pupils of the eyes. This measurement is different from person to person and also depends on whether they are looking at near objects or far away. Plmay be represented by first end IPD.1 of interpupillary distance width IPD and PS may be represented by second end IPD.2 of interpupillary distance width IPD. Interpupillary distance width IPD is preferably the distance between an average human's pupils may have a distance between approximately two and a half inches, 2.5 inches (6.35 cm), more preferably between approximately 40-80 mm, the vast majority of adults have IPDs in the range 50-75 mm, the wider range of 45-80 mm is likely to include (almost) all adults, and the minimum IPD for children (down to five years old) is around 40 mm).

It is contemplated herein that left and right images may be produce as set forth in FIGS. 6.1-6.3 from U.S. Pat. No. 9,992,473, 10,033,990, and 10,178,247 and electrically communicated to left pixel 550L and right pixel 550R. Moreover, 2D image may be electrically communicated to center pixel 550C.

Figure 10:
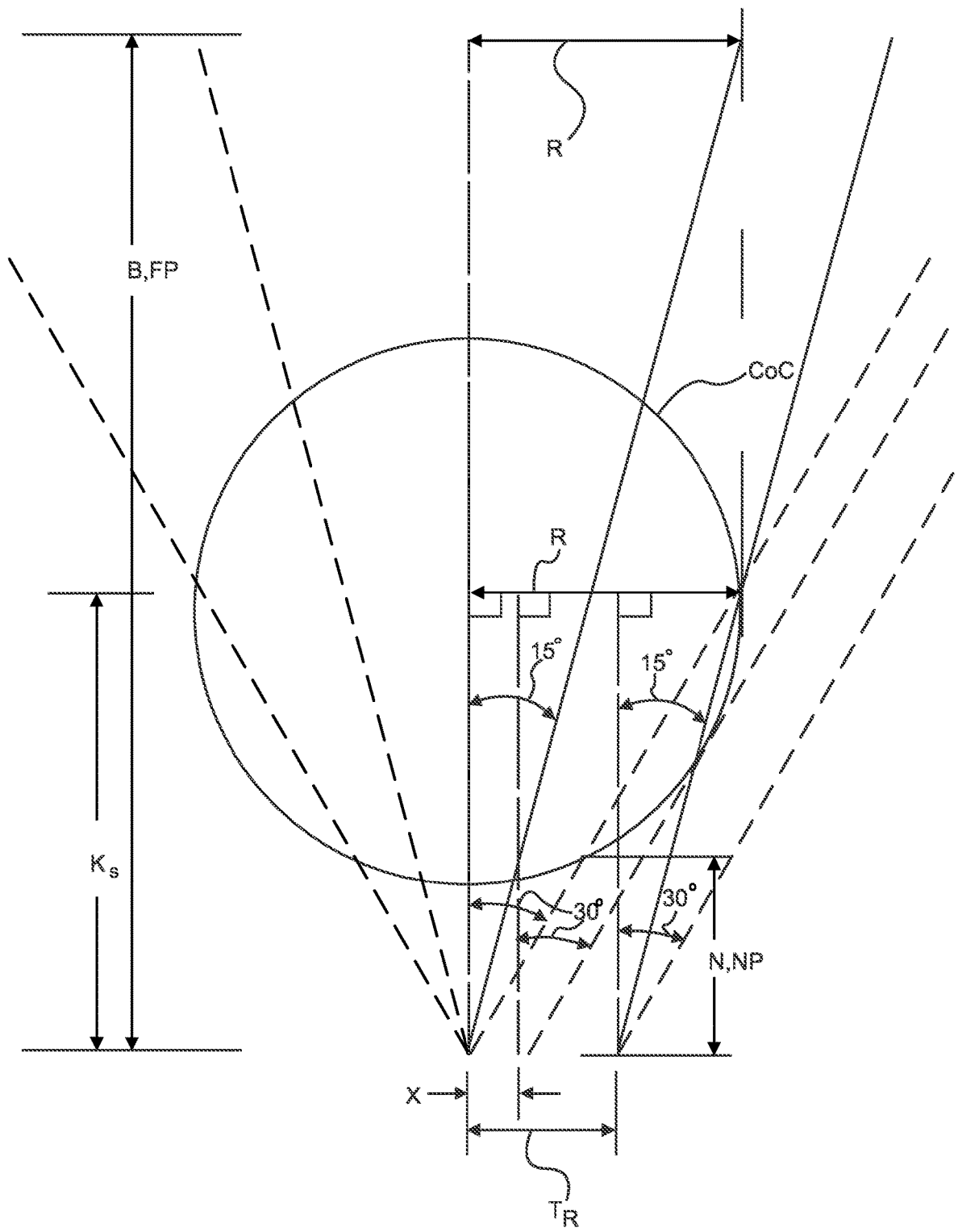
FIG. 10 is a top view illustration identifying planes of a scene and a circle of comfort in scale with right triangles defining positioning of capture devices on lens plane.

Referring now to FIG. 10, there is illustrated by way of example, and not limitation a representative illustration of Circle of Comfort (CoC) in scale with FIGS. 4 and 3. For the defined plane, the image captured on the lens plane will be comfortable and compatible with human visual system of user U viewing the final image displayed on display 628 if a substantial portion of the image(s) are captured within the Circle of Comfort (CoC). Any object, such as near plane N, key subject plane KSP, and far plane FP captured by two image capture devices, such as image capture devices 831-833 or image capture devices 831-834 (interpupillary distance IPD) within the Circle of Comfort (CoC) will be in focus to the viewer when reproduced as digital multidimensional image sequence viewable on display 628. The back-object plane or far plane FP may be defined as the distance to the intersection of the 15 degree radial line to the perpendicular in the field of view to the 30 degree line or R the radius of the Circle of Comfort (CoC). Moreover, defining the Circle of Comfort (CoC) as the circle formed by passing the diameter of the circle along the perpendicular to Key Subject KS plane (KSP) with a width determined by the 30 degree radials from the center point on the lens plane, image capture module 830.

Linear positioning or spacing of image capture devices, such as digital image capture devices 831-833, or digital image capture devices 831-834 (interpupillary distance IPD) on lens plane within the 30 degree line just tangent to the Circle of Comfort (CoC) may be utilized to create motion parallax between the plurality of images when viewing digital multi-dimensional image sequence viewable on display 628, will be comfortable and compatible with human visual system of user U.

Referring now to FIG. 10A, 10B, 10C, and 11, there is illustrated by way of example, and not limitation right triangles derived from FIG. 10. All the definitions are based on holding right triangles within the relationship of the scene to image capture. Thus, knowing the key subject KS distance (convergence point) we can calculate the following parameters.

FIG. 6A to calculate the radius R of Comfort (CoC).

$R/KS$=tan 30 degree $R=KS*$tan 30 degree

FIG. 6B to calculate the optimum distance between image capture devices, such as image capture devices 831-833, or image capture devices 831-834 (interpupillary distance IPD).

$TR/KS$=tan 15 degree $TR=KS*$tan 15 degree; and IPD is 2*TR

FIG. 6C calculate the optimum far plane FP

Tan 15 degree=$R/B$ $B=(KS*$tan 30 degree$)/$tan 15 degree

Ratio of near plane NP to far plane FP=((KS/(KS 8 tan 30 degree))*tan 15 degree

In order to understand the meaning of TR, point on the linear image capture line of the lens plane that the 15 degree line hits/touches the Comfort (CoC). The images are arranged so the key subject KS point is the same in all images captured via plurality of images from image capture devices, such as digital image capture devices 831-833, or digital image capture devices 831-834.

A user of image capture devices, such as digital image capture devices 831-833, or digital image capture devices 831-834 composes the scene S and moves the digital image capture devices 830 in our case so the circle of confusion conveys the scene S. Since digital image capture devices 830 are using multi cameras linearly spaced there is a binocular disparity between the plurality of images or frames captured by linear offset of digital image capture devices 830, such as digital image capture devices 831-833, or digital image capture devices 831-834. This disparity can be change by changing digital image capture devices 830 settings or moving the key subject KS back or away from digital image capture devices to lessen the disparity or moving the key subject KS closer to digital image capture devices to increase the disparity. Our system is a fixed digital image capture devices system and as a guideline, experimentally developed, the near plane NP should be no closer than approximately six feet from digital image capture devices 830.

Figure 12:
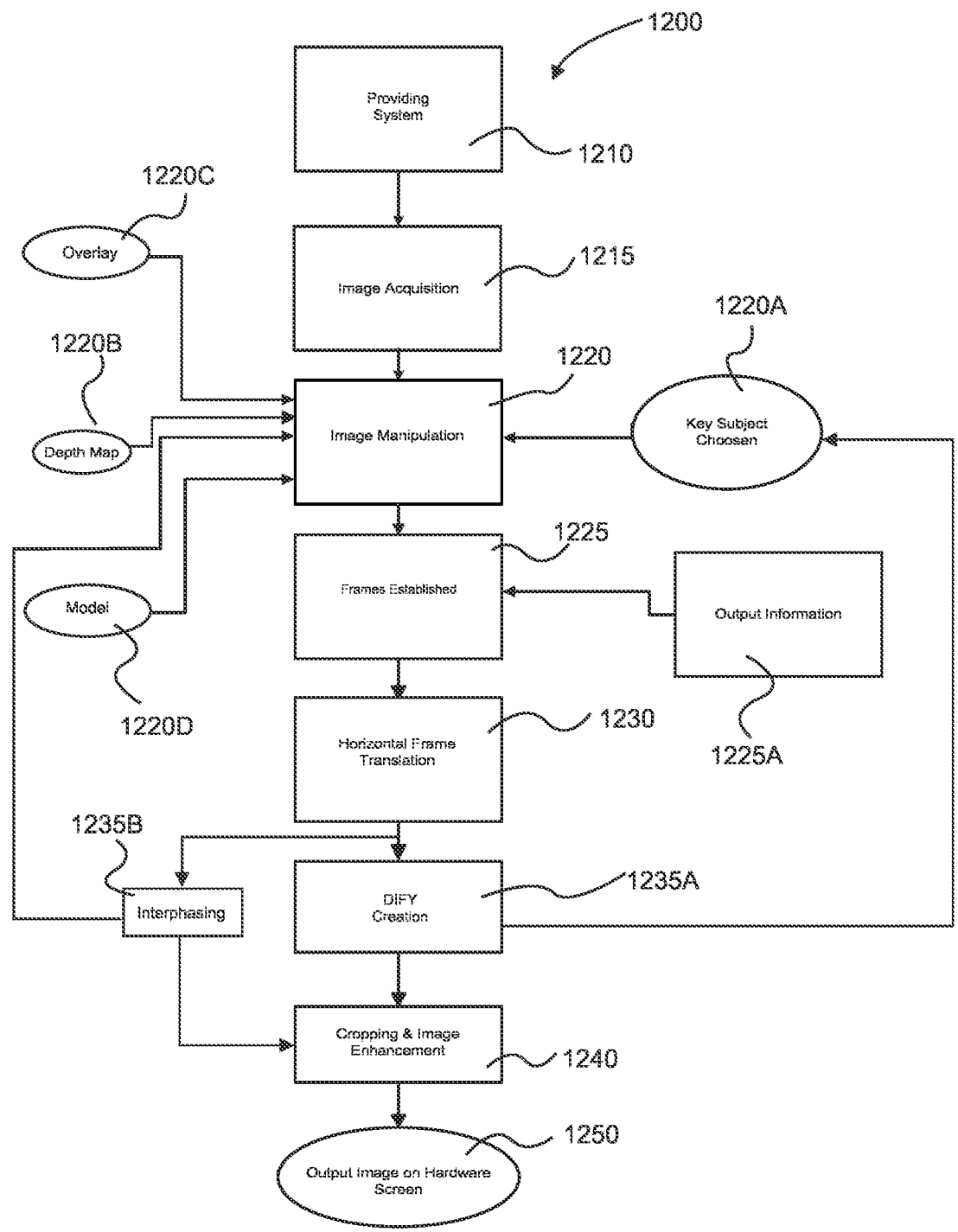
FIG. 12 is an exemplary embodiment of a flow diagram of a method of generating a multidimensional image(s)/sequence captured utilizing capture devices shown in FIGS. 8A-8H.

Referring now to FIG. 12, there is illustrated process steps as a flow diagram 1200 of a method of capturing plurality of 2D image(s) of scene S, generating frames 1101-1104, manipulating, reconfiguring, processing, displaying, storing a digital multi-dimensional image sequence as performed by a computer system 10, and viewable on display 628. Note in FIG. 12 some steps designate a manual mode of operation may be performed by a user U, whereby the user is making selections and providing input to computer system 10 in the step whereas otherwise operation of computer system 10 is based on the steps performed by application program(s) 624 in an automatic mode.

In block or step 1210, providing computer system 10 having digital image capture devices 830, display 628, and applications 624 as described above in FIGS. 1-11, to enable capture of a plurality of 2-dimensional (2D) images with a disparity due to spacing of digital image capture devices 831-834, digital image capture devices 831-834, or the like within approximately an intraocular or interpupillary distance width IPD, the distance between an average human's pupil, and displaying 3-dimensional (3D) image sequence on display 628. Moreover, the sequential display of digital image(s) on display 628 (DIFY or stereo 3D) where images (n) of the plurality of 2D image(s) of scene S captured by capture devices 831-834 (n devices) are displayed in a sequential order on display 628 as a digital multi-dimensional image sequence (DIFY or stereo 3D).

In block or step 1215, computer system 10 via image capture application 624 (method of capture) is configured to capture a plurality digital images of scene S via image capture module 830 having a plurality of image capture devices, such as digital image capture devices 831-834, 830 (n devices)., or the like positioned in series linearly within an intraocular or interpupillary distance width IPD (distance between pupils of human visual system within a Circle of Comfort relationship to optimize digital multi-dimensional images for the human visual system) capture a plurality of 2D digital source images. Computer system 10 integrating I/O devices 632 with computer system 10, I/O devices 632 may include one or more sensors 840 in communication with computer system 10 to measure distance between computer system 10 (image capture devices, such as digital image capture devices 831-834, 830 (n devices)) and selected depths in scene S (depth) such as Key Subject KS and set the focal point of one or more digital image capture devices 831-834, 830 (n devices).

Figure 16A:
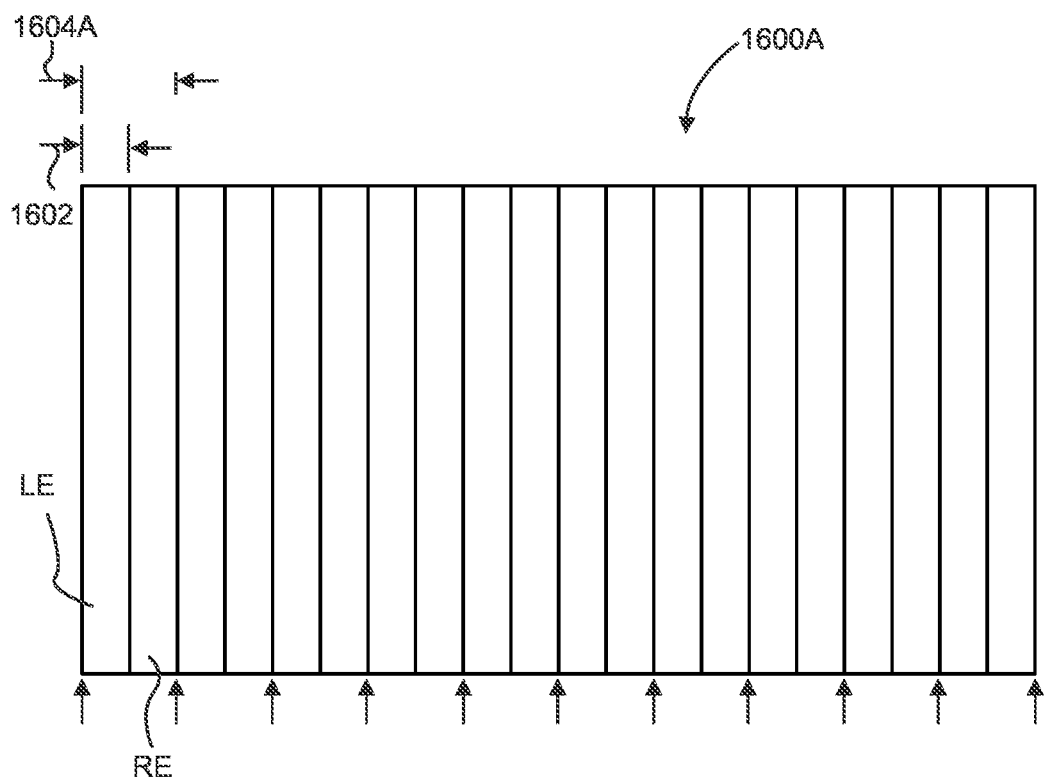
FIG. 16A is a diagram illustration of an exemplary embodiment of a pixel interphase processing of images (frames), such as in FIG. 8A according to select embodiments of the instant disclosure.
Figure 16B:
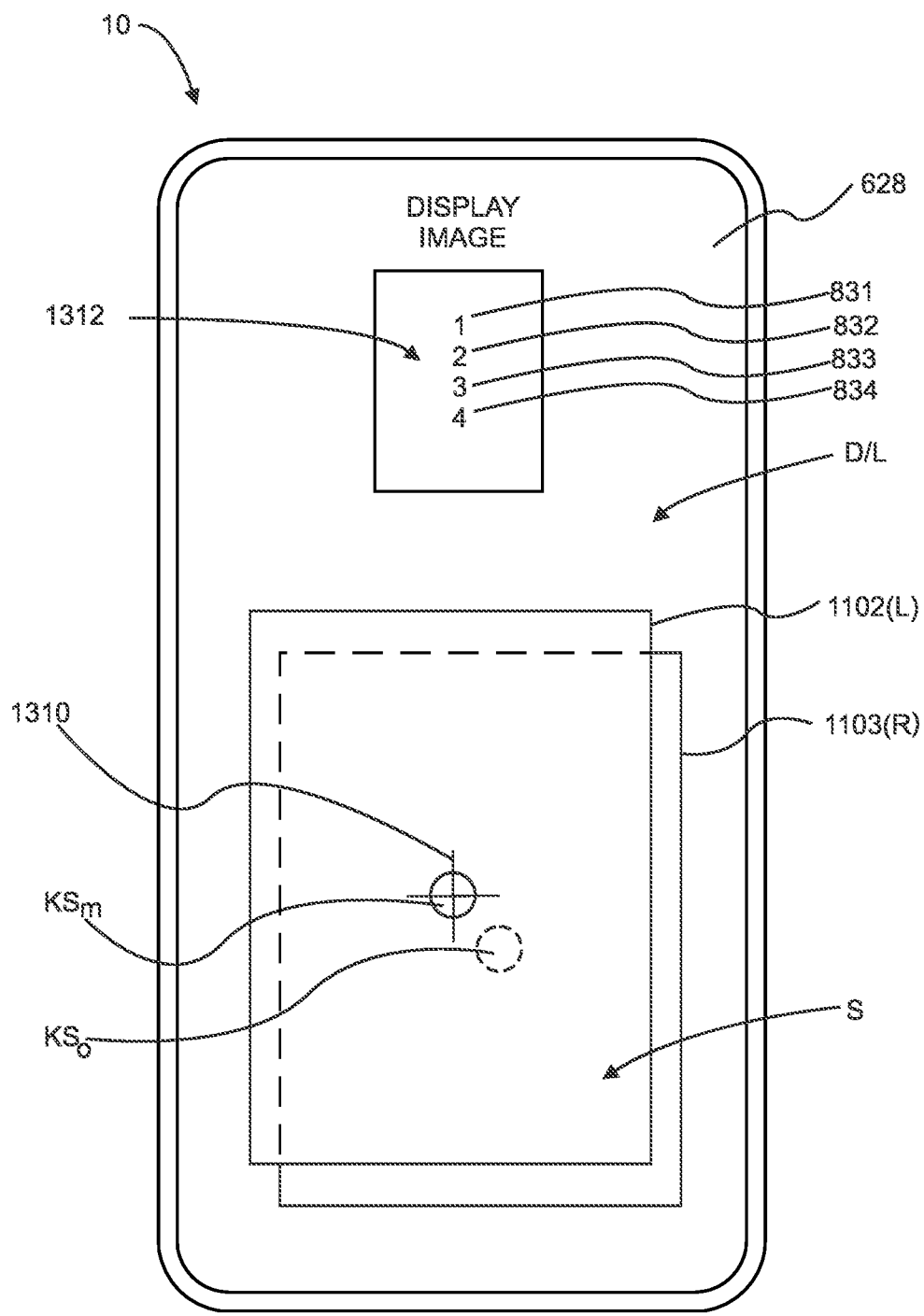
FIG. 16B is a top view illustration of an exemplary embodiment of a display of computer system running an application.

3D Stereo, user U may tap or other identification interaction with selection box 812 to select or identify key subject KS in the source images, left image 1102 and right image 1103 of scene S, as shown in FIG. 16. Additionally, in block or step 1215, utilizing computer system 10, display 628, and application program(s) 206 (via image capture application) settings to align(ing) or position(ing) an icon, such as cross hair 814, of FIG. 16B, on key subject KS of a scene S displayed thereon display 628, for example by touching or dragging image of scene S or pointing computer system 10 in a different direction to align cross hair 814, of FIG. 16, on key subject KS of a scene S. In block or step 1215, using, obtaining or capturing images(n) of scene S) focused on selected depths in an image or scene (depth) of scene S.

Alternatively, computer system 10 via image manipulation application 624 and display 628 may be configured to operate in auto mode wherein one or more sensors 840 may measure the distance between computer system 10 (image capture devices, such as, digital image capture devices 831-834, 830 (n devices)) and selected depths in scene S (depth) such as Key Subject KS. Alternatively, in manual mode, a user may determine the correct distance between computer system 10 and selected depths in scene S (depth) such as Key Subject KS.

It is recognized herein that user U may be instructed on best practices for capturing images(n) of scene S via computer system 10 via image capture application 624 and display 628, such as frame the scene S to include the key subject KS in scene S, selection of the prominent foreground feature of scene S, and furthest point FP in scene S, may include identifying key subject(s) KS in scene S, selection of closest point CP in scene S, the prominent background feature of scene S and the like. Moreover, position key subject(s) KS in scene S a specified distance from digital image capture devices 831-834 (n devices), 830 (n devices). Furthermore, position closest point CP in scene S a specified distance from digital image capture devices 831-834 (n devices).

Figure 13:
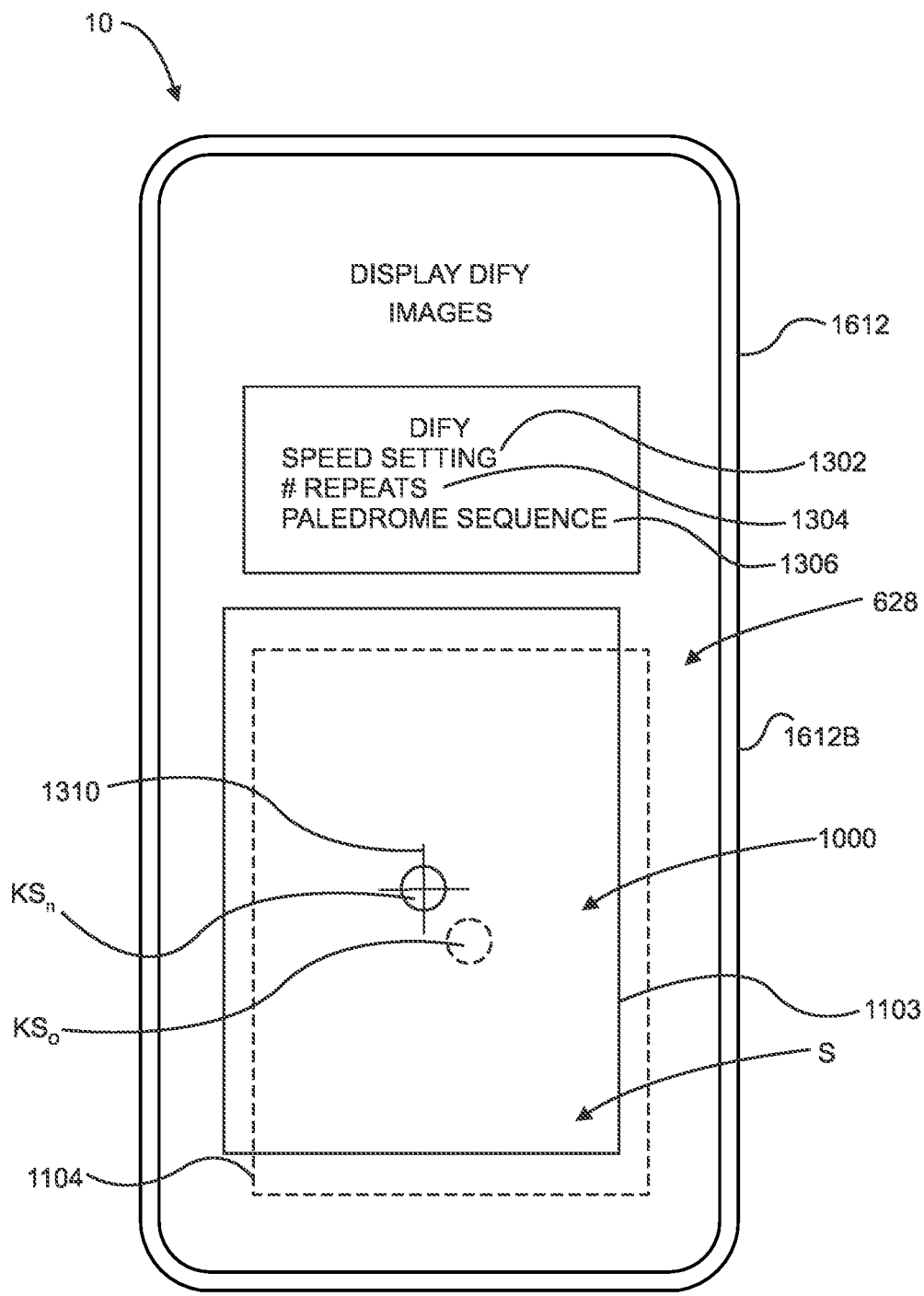
FIG. 13 is a top view illustration of an exemplary embodiment of a display with user interactive content to select photography options of computer system.

Referring now to FIG. 13, there is illustrated by way of example, and not limitation, touch screen display 628 enabling user U to select photography options of computer system 10. A first exemplary option may be DIFY capture wherein user U may specify or select digital image(s) speed setting 1302 where user U may increase or decrease play back speed or frames (images) per second of the sequential display of digital image(s) on display 628 captured by capture devices 831-834 (n devices). Furthermore, user U may specify or select digital image(s) number of loops or repeats 1304 to set the number of loops of images(n) of the plurality of 2D image(s) 1000 of scene S captured by capture devices 831-834 (n devices), 830 (n devices) where images (n) of the plurality of 2D image(s) 1000 of scene S captured by capture devices 831-834 (n devices) are displayed in a sequential order on display 628, similar to FIG. 11. Still furthermore, user U may specify or select order of playback of digital image(s) for playback or palindrome sequence 1306 to set the order of display of images(n) of the plurality of 2D image(s) 1000 of scene S captured by capture devices 831-834 (n devices), 830 (n devices). The timed sequence showing of the images produces the appropriate binocular disparity through the motion pursuit ratio effect. It is contemplated herein that computer system 10 and application program(s) 624 may utilize default or automatic setting herein.

Referring now to FIG. 16B, there is illustrated by way of example, and not limitation, touch screen display 628 enabling user U to select photography options of computer system 10 (3D Stereo). In block or step 1215, utilizing computer system 10, display 628, and application program(s) 624 (via image capture application) settings to align(ing) or position(ing) an icon, such as cross hair 1310 on key subject KS of a scene S displayed thereon display 628, for example by touching or dragging image of scene S or pointing computer system 10 in a different direction to align cross hair 1310, on key subject KS of a scene S. In block or step 1215, obtaining or capturing images(n) of scene S from image capture devices 831-834 (n devices) focused on selected depths in an image or scene (depth) of scene S. User U may tap or other identification interaction with selection box 1312 to select or identify key subject KS in the source images, left image 1102L and right image 1103R of scene S, selected from images(n) 1101, 1102, 1103, 1104 (set of frames 1100) of scene S from image capture devices 831-834 (n devices), or any combination of two images from images(n) 1101, 1102, 1103, 1104 (set of frames 1100) . Moreover, computer system 10 via image manipulation application and display 624 may be configured to enable user U to select or identify images of scene S as left image 1102 and right image 1103 of scene S. User U may tap or other identification interaction with selection box 812 to select or identify key subject KS in the source images, left image 1102 and right image 1103 of scene S, as shown in FIG. 16B.

Alternatively, in block or step 1215, user U may utilize computer system 10, display 628, and application program(s) 624 to input plurality of images, files, and dataset (Dataset) of scene S, such as via AirDrop, DROP BOX, or other application.

It is recognized herein that step 1215, computer system 10 via image capture application 624, image manipulation application 624, image display application 624 may be performed utilizing distinct and separately located computer systems 10, such as one or more user systems 720 first smart device, 722 second smart device, 724 smart device (smart devices) and application program(s) 624. For example, using a camera system remote from image manipulation system, and remote from image viewing system, step 1215 may be performed proximate scene S via computer system 10 (first processor) and application program(s) 624 communicating between user systems 720, 722, 724 and application program(s) 624. Here, camera system may be positioned or stationed to capture segments of different viewpoints of an event or entertainment, such as scene S. Next, via communications link 740 and/or network 750, or 5G computer systems 10 and application program(s) 624 via more user systems 720, 722, 724 may capture and transmit a plurality of digital images of scene S as digital multi-dimensional image sequence (DIFY) of scene S sets of images(n) of scene S from capture devices 831-834 (n devices) relative to key subject KS point.

Images captured at or near interpupillary distance IPD matches the human visual system, which simplifies the math, minimizes cross talk between the two images, reduces fuzziness and image movement to produce digital multi-dimensional image sequence (DIFY) viewable on display 628.

Additionally, in block or step 1215, utilizing computer system 10, display 628, and application program(s) 624 (via dataset capture application) settings to align(ing) or position(ing) an icon, such as cross hair 1310, of FIG. 13 or 16B, on key subject KS of a scene S displayed thereon display 628, for example by touching or dragging dataset of scene S, or touching and dragging key subject KS, or pointing computer system 10 in a different direction to align cross hair 1310, of FIG. 13, or 16B, on key subject KS of a scene S. In block or step 1215, obtaining or capturing plurality images, files, and dataset (Dataset) of scene S from plurality of capture device(s) 830 (n devices) focused on selected depths in an image or scene (depth) of scene S.

Moreover, in block or step 1215, integrating I/O devices 632 with computer system 10, I/O devices 632 may include one or more sensors 852 in communication with computer system 10 to measure distance between computer system 10/capture device(s) 830 (n devices) and selected depths in scene S (depth) such as Key Subject KS and set the focal point of an arc or trajectory of vehicle 400 and capture device(s) 830. It is contemplated herein that computer system 10, display 628, and application program(s) 624, may operate in auto mode wherein one or more sensors 840 may measure the distance between capture device(s) 830 and selected depths in scene S (depth) such as Key Subject KS. Alternatively, in manual mode, a user may determine the correct distance between user U and selected depths in scene S (depth) such as Key Subject KS. Or computer system 10, display 628 may utilize one or more sensors 852 to measure distance between capture device(s) 830 (n devices) and selected depths in scene S (depth) such as Key Subject KS and provide on screen instructions or message (distance preference) to instruct user U to move capture device(s) 830 (n devices) closer or father away from Key Subject KS or near plane NP to optimize capture device(s) 830 (n devices) and images, files, and dataset (Dataset) of scene S.

In block or step 1220, computer system 10 via image manipulation application 624 is configured to receive a plurality of images of scene S captured by digital image capture devices 831-834 (n devices), 830 (n devices) through an image acquisition application. The image acquisition application converts each image to a digital source image, such as a JPEG, GIF, TIF format. Ideally, each digital source image includes a number of visible objects, subjects or points therein, such as foreground or closest point associated with near plane NP, far plane FP or furthest point associated with a far plane FP, and key subject KS. The near plane NP, far plane FP point are the closest point and furthest point from the viewer (plurality of capture devices 831 and 832, 833, or 834, 830 (n devices)), respectively. The depth of field is the depth or distance created within the object field (depicted distance between foreground to background). The principal axis is the line perpendicular to the scene passing through the key subject KS point, while the parallax is the displacement of the key subject KS point from the principal axis, see FIG. 11. In digital composition the displacement is always maintained as a whole integer number of pixels from the principal axis.

It is recognized herein that step 1220, computer system 10 via image capture application 624, image manipulation application 624, image display application 624 may be performed utilizing distinct and separately located computer systems 10, such as one or more user systems 720, 722, 724 and application program(s) 624. For example, using an image manipulation system remote from image capture system, and remote from image viewing system, step 1220 may be performed remote from scene S via computer system 10 (third processor) and application program(s) 624 communicating between user systems 720, 222, 224 and application program(s) 624. Next, via communications link 740 and/or network 750, or 5G computer systems 10 (third processor) and application program(s) 624 via more user systems 720, 722, 724 may receive sets of plurality of images(n) of scene S from capture devices 831-834 (n devices) relative to key subject KS point and transmit a manipulated plurality of digital multi-dimensional image sequence (DIFY or 3D stereo) of scene to computer system 10 (first processor) and application program(s) 624, step 1220A.

In block or step 1220A, computer system 10 via automatic key subject selection algorithm or key subject application program(s) 624 is configured to identify a key subject KS in each source image, plurality of images of scene S captured by digital image capture devices 831-834 (n devices). Moreover, computer system 10 via key subject, application program(s) 624 is configured to identify (ing) at least in part a pixel, set of pixels (finger point selection on display 628) in one or more plurality of images(n) of scene S from digital image capture devices 831-834 (n devices) as key subject KS, respectively. Moreover, computer system 10 via key subject application program(s) 624 is configured to align source image, plurality of images of scene S captured by digital image capture devices 831-834 (n devices) horizontally about key subject KS; (horizontal image translation (HIT) as shown in 11A and 11B with a distance key Subject KS within a Circle of Comfort relationship to optimize digital multi-dimensional image sequence 1010 for the human visual system.

Moreover, a key subject point is identified in the series of 2D images of the scene S, and each of the series of 2D images of the scene is aligned to key subject KS point, and all other points in the series of 2D images of the scene shift based on a spacing of the plurality of digital image capture devices to generate a modified sequence of 2D images.

Key subject KS may be identified in each plurality of images of scene S captured by digital image capture devices 831-834 (n devices) corresponds to the same key subject KS of scene S as shown in FIG. 11A, 11B, and 4. It is contemplated herein that a computer system 10, display 628, and application program(s) 624 may perform an algorithm or set of steps to automatically identify subject KS therein the plurality of images of scene S captured by digital image capture devices 831-834 (n devices). Alternatively, in block or step 1220A, utilizing computer system 10, (in manual mode—manual key subject selection algorithm), display 628, and application program(s) 624 settings to at least in part enable a user U to align(ing) or edit alignment of a pixel, set of pixels (finger point selection), key subject KS point of at least two images(n) of plurality of images of scene S captured by digital image capture devices 831-834 (n devices).

Source images, plurality of images of scene S captured by digital image capture devices 831-834 (n devices) of scene S are all obtained with digital image capture devices 831-834 (n devices) with the same image capture distance and same focal length. Computer system 10 via key subject application 624 creates a point of certainty, key subject KS point by performing a horizontal image shift of source images, plurality of images of scene S captured by digital image capture devices 831-834 (n devices), whereby source images, plurality of images of scene S captured by digital image capture devices 831-834 (n devices) overlap at this one point, as shown in FIG. 13. This image shift does two things, first it sets the depth of the image. All points in front of key subject KS point are closer to the observer and all points behind key subject KS point are further from the observer.

Moreover, in an auto mode computer system 10 via image manipulation application may identify the key subject KS based on a depth map of the source images, plurality of images of scene S captured by digital image capture devices 831-834 (n devices).

Computer system 10 via image manipulation application may identify a foreground, closest point and background, furthest point using a depth map of the source images, plurality of images of scene S captured by digital image capture devices 831-834 (n devices). Alternatively in manual mode, computer system 10 via image manipulation application and display 628 may be configured to enable user U to select or identify key subject KS in the source images, plurality of images of scene S captured by digital image capture devices 831-834 (n devices) of scene S. User U may tap, move a cursor or box or other identification to select or identify key subject KS in the source images, plurality of images of scene S captured by digital image capture devices 831-834 (n devices) of scene S, as shown in FIG. 13.

Horizontal image translation (HIT) sets the key subject plane KSP as the plane of the screen from which the scene emanates (first or proximal plane). This step also sets the motion of objects, such as bush B in near plane NP (third or near plane) and tree T in far plane FP (second or distal plane) relative to one another. Objects in front of key subject KS or key subject plane KSP move in one direction (left to right or right to left) while objects behind key subject KS or key subject plane KSP move in the opposite direction from objects in the front. Objects behind the key subject plane KSP will have less parallax for a given motion.

Figure 11:
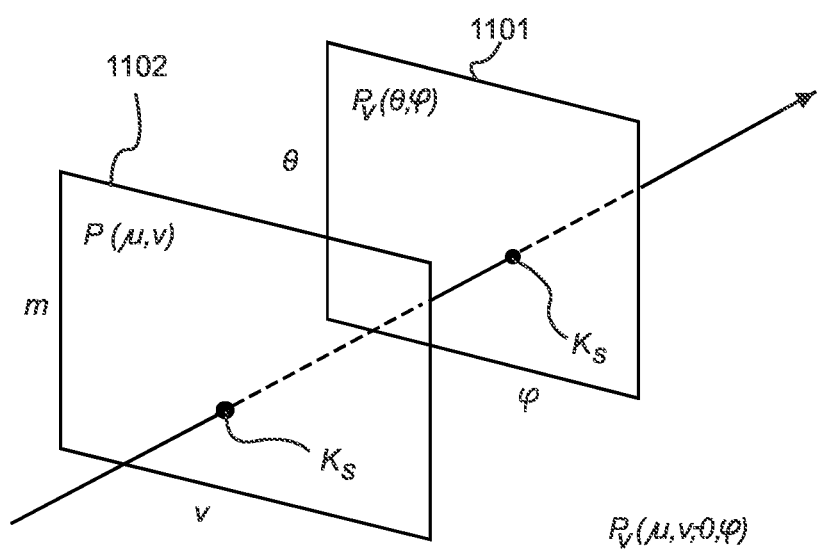
FIG. 11 is a diagram illustration of an exemplary embodiment of a geometrical shift of a point between two images (frames), such as in FIG. 11A according to select embodiments of the instant disclosure.

In the example of FIGS. 11, 11A and 11B, each layer 1100 includes the primary image element of input file images of scene S, such as image or frame 1101, 1102, 1103 and 1104 from digital image capture devices 831-834 (n devices), respectively. Image acquisition application 624, performs a process to translate image or frame 1101, 1102, 1103 and 1104 image or frame 1101, 1102, 1103 and 1104 is overlapping and offset from the principal axis 1112 by a calculated parallax value, (horizontal image translation (HIT). Parallax line 1107 represents the linear displacement of key subject KS points 1109.1-1109.4 from the principal axis 1112. Preferably delta 1120 between the parallax line 1107 represents a linear amount of the parallax 1120, such as front parallax 1120.2 and back parallax 1120.1.

Calculate parallax, minimum parallax and maximum parallax as a function of number of pixel, pixel density and number of frames, and closest and furthest points, and other parameters as set U.S. Pat. Nos. 9,992,473, 10,033,990, and 10,178,247, incorporated herein by reference in their entirety.

In block or step 1220B, computer system 10 via depth map application program(s) 624 is configured to create(ing) depth map of source images, plurality of images of scene S captured by digital image capture devices 831-834 (n devices) and makes a grey scale image through an algorithm. A depth map is an image or image channel that contains information relating to the distance of objects, surfaces, or points in scene S from a viewpoint, such as digital image capture devices 831-834 (n devices). For example, this provides more information as volume, texture and lighting are more fully defined. Once a depth map 1220B is generated then the parallax can be tightly controlled. For this computer system 10 may limit the number of output frames to four without going to a depth map. If we use four from a depth map or two from a depth map, we are not limited by the intermediate camera positions. Note the outer digital image capture devices 831 and 834 are locked into the interpupillary distance (IPD) of the observer or user U viewing display 628.

Moreover, computer system 10 via key subject, application program(s) 624 may identify key subject KS based on the depth map of the source images. Similarly, computer system 10 via depth map application program(s) 624 may identify Near Plane NP may be the plane passing through the closest point in focus to the lens plane (the bush B in the foreground), Far Plane FP which is the plane passing through the furthest point in focus (tree T in the background) a foreground, closest point and background, furthest point using a depth map of the source image.

Computer system 10 via depth map application program(s) 624 may define two or more planes for each of series of 2D images of the scene and one or more planes may have different depth estimate. Computer system 10 via depth map application program(s) 624 may identify a first proximal plane, such as key subject plane KSP and a second distal plane within the series of 2D images of the scene, such as Near Plane NP or Far Plane FP.

In block or step 1220C, computer system 10 via interlay(ing) application program(s) 624 is configured overlay 2D RGB high resolution digital camera thereon model or mesh of images(n) 1101, 1102, 1103, 1104 (set of frames 1100) of scene S with RGB high resolution color (DIFY or 3D stereo).

In block or step 1220D, computer system 10 via dataset manipulation application 624 may be utilized to generate a model or mesh of scene S from images(n) 1101, 1102, 1103, 1104 (set of frames 1100) of scene S.

In block or step 1225, computer system 10 via frame establishment program(s) 624 is configured to create or generate frames, recording of images of images(n) 1101, 1102, 1103, 1104 (set of frames 1100) of scene S from a virtual camera shifting, rotation, or arcing position, such as 0.5 to 1 degree of separation or movement between frames, such as −5, −4, −3, −2, −1, 0, 1, 2, 3, 4, 5; for DIFY represented 1101, 1102, 1103, 1104 (set of frames 1100) of 3D color mesh Dataset of scene S to generate parallax; for 3D Stereo as left and right; for example 1102, 1103 images of 3D color mesh Dataset and 1101, 1102, 1103, 1104 for (DIFY). Computer system 10 via key subject, application program(s) 624 may establish increments, of shift for example one (1) degree of total shift between the views (typically 10-70 pixel shift on display 628). This simply means a complete sensor (capture device) rotation of 360 degrees around key subject KS would have 360 views so we are only using/need view 1 and view 2, for 3D Stereo as left and right; 1102, 1103 images Dataset. This gives us 1 degree of separation/disparity for each view assuming rotational parallax orbiting around a key subject (zero parallax point). This will likely establish a minimum disparity/parallax that can be adjusted up as the sensor (image capture module 830) moves farther away from key subject KS.

In block or step 1225A, computer system 10 via frame establishment program(s) 624 is configured to input or upload source images captured external from computer system 10.

In block or step 1230, utilizing computer system 10 via horizontal and vertical frame DIF translation application 624 may be configured to horizontally and vertically align or transform each source image, plurality of images of scene S captured by digital image capture devices 831-834 (n devices) requires a dimensional image format (DIF) transform. The DIF transform is a geometric shift that does not change the information acquired at each point in the source image, plurality of images of scene S captured by digital image capture devices 831-834 (n devices) but can be viewed as a shift of all other points in the source image, plurality of images of scene S captured by digital image capture devices 831-834 (n devices), in Cartesian space (illustrated in FIG. 11). As a plenoptic function, the DIF transform is represented by the equation:

$$P'(u,v) \times P'(\theta,\varphi) = [P_{u,v} + \Delta_{u,v}] \times [P_{\theta,\varphi} + \Delta_{\theta,\varphi}]$$

Where $\Delta u, v = \Delta \theta, \varphi$

In the case of a digital image source, the geometric shift corresponds to a geometric shift of pixels which contain the plenoptic information, the DIF transform then becomes:

$$(\text{Pixel})_{x,y} = (\text{Pixel})_{x,y} + \Delta_{x,y}$$

Moreover, computer system 10 via horizontal and vertical frame DIF translation application 624 may also apply a geometric shift to the background and or foreground using the DIF transform. The background and foreground may be geometrically shifted according to the depth of each relative to the depth of the key subject KS identified by the depth map 1220B of the source image, plurality of images of scene S captured by digital image capture devices 831-834 (n devices). Controlling the geometrical shift of the background and foreground relative to the key subject KS controls the motion parallax of the key subject KS. As described, the apparent relative motion of the key subject KS against the background or foreground provides the observer with hints about its relative distance. In this way, motion parallax is controlled to focus objects at different depths in a displayed scene to match vergence and stereoscopic retinal disparity demands to better simulate natural viewing conditions. By adjusting the focus of key subjects KS in a scene to match their stereoscopic retinal disparity (an intraocular or interpupillary distance width IPD (distance between pupils of human visual system), the cues to ocular accommodation and vergence are brought into agreement.

Referring again to FIG. 4, viewing a DIFY, multidimensional image sequence 1010 on display 628 requires two different eye actions of user U. The first is the eyes will track the closest item, point, or object (near plane NP) in multidimensional image sequence 1010 on display 628, which will have linear translation back and forth to the stationary key subject plane KSP due to image or frame 1101, 1102, 1103 and 1104 is overlapping and offset from the principal axis 1112 by a calculated parallax value, (horizontal image translation (HIT)). This tracking occurs through the eyeball moving to follow the motion. Second, the eyes will perceive depth due to the smooth motion change of any point or object relative to the key subject plane KSP and more specifically to the key subject KS point. Thus, DIFYs are composed of one mechanical step and two eye functions.

A mechanical step of translating of the frames so the Key Subject KS point overlaps on all frames. Linear translation back and forth to the stationary key subject plane KSP due to image or frame 1101, 1102, 1103 and 1104 may be overlapping and offset from the principal axis 1112 by a calculated parallax value, (horizontal image translation (HIT). Eye following motion of near plane NP object which exhibits greatest movement relative to the key subject KS (Eye Rotation). Difference in frame position along the key subject plane KSP (Smooth Eye Motion) which introduces binocular disparity. Comparison of any two points other than key subject KS also produces depth (binocular disparity). Points behind key subject plane KSP move in opposite direction than those points in front of key subject KS. Comparison of two points in front or back or across key subject KS plane shows depth.

In block or step 1235A, computer system 10 via palindrome application 626 is configured to create, generate, or produce multidimensional digital image sequence 1010 aligning sequentially each image of images(n) of scene S from digital image capture devices 831-834 (n devices) in a seamless palindrome loop (align sequentially), such as display in sequence a loop of first digital image, image or frame 1101 from first digital image capture device 831 (1), second digital image, image or frame 1102 from second digital image capture device 832 (2), capture device 832, third digital image, image or frame 1103 from third digital image capture device 833 (3), fourth digital image, image or frame 1104 from fourth digital image capture device 834 (4). Moreover, an alternate sequence a loop of first digital image, image or frame 1101 from first digital image capture device 831 (1), second digital image, image or frame 1102 from second digital image capture device 832 (2), capture device 832, third digital image, image or frame 1103 from third digital image capture device 833 (3), fourth digital image, image or frame 1104 from fourth digital image capture device 834 (4), fourth digital image, image or frame 1104 from fourth digital image capture device 834 (4), third digital image, image or frame 1103 from third digital image capture device 833 (3), second digital image, image or frame 1102 from second digital image capture device 832 (2), of first digital image, image or frame 1101 from first digital image capture device 831 (1) −1, 2, 3, 4, 4, 3, 2, 1 (align sequentially). Preferred sequence is to follow the same sequence or order in which images were captured source image, plurality of images of scene S captured by digital image capture devices 831-834 (n devices) and an inverted or reverse sequence is added to create a seamless palindrome loop.

It is contemplated herein that other sequences may be configured herein, including but not limited to 1, 2, 3, 4, 3, 2, 1 (align sequentially) and the like.

It is contemplated herein that horizontally and vertically align(ing) of first proximal plane, such as key subject plane KSP of each image of images(n) of scene S from digital image capture devices 831-834 (n devices) and shifting second distal plane, such as such as foreground plane, Near Plane NP, or background plane, Far Plane FP of each subsequent image frame in the sequence based on the depth estimate of the second distal plane for series of 2D images of the scene to produce second modified sequence of 2D images.

In block or step 1235B, computer system 10 via interphasing application 626 may be configured to interphase columns of pixels of each set of frames 1100, specifically as left image 1102 and right image 1103 to generate a multidimensional digital image aligned to the key subject KS point and within a calculated parallax range. As shown in FIG. 16A, interphasing application 626 may be configured to takes sections, strips, rows, or columns of pixels from left image 1102 and right image 1103, such as column 1602A of the source images, left image 1102, and right image 1103 of terrain T of scene S and layer them alternating between column 1602A of left image 1102-LE, and column 1602A of right image 1103-RE and reconfigures or lays them out in series side-by-side interlaced, such as in repeating series 160A two columns wide, and repeats this configuration for all layers of the source images, left image 1102 and right image 1103 of terrain T of scene S to generate multidimensional image 1010 with column 1602A dimensioned to be one pixel 1550 wide.

It is contemplated herein that source images, plurality of images of scene S captured by capture device(s) 830 match size and configuration of display 628 aligned to the key subject KS point and within a calculated parallax range.

Now given the multidimensional image sequence 1010, we move to observe the viewing side of the device.

It is contemplated herein that source images, plurality of images of scene S captured by digital image capture devices 831-834 (n devices) match size and configuration of display 628 aligned to the key subject KS point and within a calculated parallax range.

In block or step 1240, computer system 10 via image editing application 624 is configured to crop, zoom, align, enhance, or perform edits thereto each image(n) of scene S from capture devices 831-834 (n devices) or edit multidimensional digital image sequence 1010.

Moreover, computer system 10 and editing application program(s) 624 may enable user U to perform frame enhancement, layer enrichment, animation, feathering (smooth), (Photoshop or Acorn photo or image tools), to smooth or fill in the images (n) together, or other software techniques for producing 3D effects on display 628. It is contemplated herein that a computer system 10 (auto mode), display 628, and application program(s) 624 may perform an algorithm or set of steps to automatically or enable automatic performance of align(ing) or edit(ing) alignment of a pixel, set of pixels of key subject KS point, crop, zoom, align, enhance, or perform edits of the plurality of images of scene S captured by digital image capture devices 831-834 (n devices) or edit multidimensional digital image sequence 1010.

Alternatively, in block or step 1240, utilizing computer system 10, (in manual mode), display 628, and application program(s) 624 settings to at least in part enable a user U to align(ing) or edit(ing) alignment of a pixel, set of pixels of key subject KS point, crop, zoom, align, enhance, or perform edits of the plurality of images of scene S captured by digital image capture devices 831-834 (n devices) or edit multidimensional digital image sequence 1010.

Furthermore, user U via display 628 and editing application program(s) 624 may set or chose the speed (time of view) for each frame and the number of view cycles or cycle forever as shown in FIG. 13. Time interval may be assigned to each frame in multidimensional digital image sequence 1010. Additionally, the time interval between frames may be adjusted at step 1240 to provide smooth motion and optimal 3D viewing of multidimensional digital image sequence 1010.

It is contemplated herein that a computer system 10, display 628, and application program(s) 624 may perform an algorithm or set of steps to automatically or manually edit or apply effects to set of frames 1100. Moreover, computer system 10 and editing application program(s) 206 may include edits, such as frame enhancement, layer enrichment, feathering, (Photoshop or Acorn photo or image tools), to smooth or fill in the images (n) together, and other software techniques for producing 3D effects to display 3-D multidimensional image of terrain T of scene S thereon display 628.

In block or step 1250, computer system 10 via image display application 624 is configured to enable images(n) of scene S to display, via sequential palindrome loop, multidimensional digital image sequence 1010 of scene S on display 628 for different dimensions of displays 628. Again, multidimensional digital image sequence 1010 of scene S, resultant 3D image sequence, may be output as a DIF sequence to display 628. It is contemplated herein that computer system 10, display 628, and application program(s) 624 may be responsive in that computer system 10 may execute an instruction to size each image (n) of scene S to fit the dimensions of a given display 628.

Moreover, user U may elect to return to block or step 1220 to choose a new key subject KS in each source image, plurality of images of scene S captured by digital image capture devices 831-834 (n devices) and progress through steps 1220-1250 to view on display 628, via creation of a new or second sequential loop, multidimensional digital image sequence 1010 of scene S for new key subject KS.

Now given the multidimensional image sequence 1010, we move to observe the viewing side of the device. Moreover, in block or step 735, computer system 10 via output application 730 (206) may be configured to display multidimensional image(s) 1010 on display 628 for one more user systems 220, 222, 224 via communications link 240 and/or network 250, or 5G computer systems 10 and application program(s) 206.

Figure 15A:
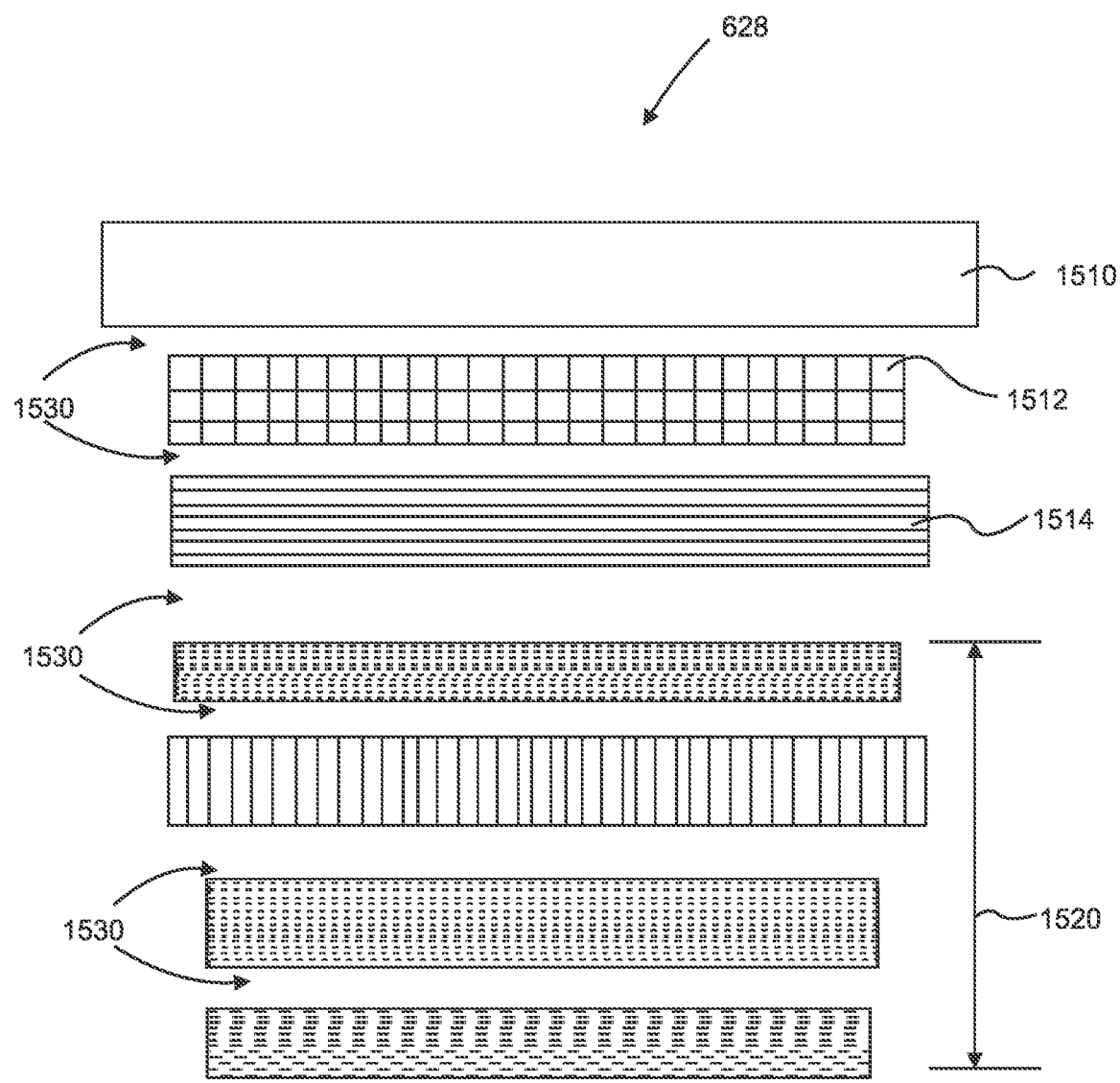
FIG. 15A is a cross-section diagram of an exemplary embodiment of a display stack according to select embodiments of the instant disclosure.

For 3D Stereo, referring now to FIG. 15A, there is illustrated by way of example, and not limitation a cross-sectional view of an exemplary stack up of components of display 628. Display 628 may include an array of or plurality of pixels emitting light, such as LCD panel stack of components 1520 having electrodes, such as front electrodes and back electrodes, polarizers, such as horizontal polarizer and vertical polarizer, diffusers, such as gray diffuser, white diffuser, and backlight to emit red R, green G, and blue B light. Moreover, display 628 may include other standard LCD user U interaction components, such as top glass cover 1510 with capacitive touch screen glass 1512 positioned between top glass cover 1510 and LCD panel stack components 1520. It is contemplated herein that other forms of display 628 may be included herein other than LCD, such LED, ELED, PDP, QLED, and other types of display technologies. Furthermore, display 628 may include a lens array, such as lenticular lens 1514 preferably positioned between capacitive touch screen glass 1512 and LCD panel stack of components 1520, and configured to bend or refract light in a manner capable of displaying an interlaced stereo pair of left and right images as a 3D or multidimensional digital image(s) 1010 on display 628 and, thereby displaying a multidimensional digital image of scene S on display 628. Transparent adhesives 1530 may be utilized to bond elements in the stack, whether used as a horizontal adhesive or a vertical adhesive to hold multiple elements in the stack. For example, to produce a 3D view or produce a multidimensional digital image on display 628, a 1920×1200 pixel image via a plurality of pixels needs to be divided in half, 960×1200, and either half of the plurality of pixels may be utilized for a left image and right image.

It is contemplated herein that lens array may include other techniques to bend or refract light, such as barrier screen (black line), lenticular, parabolic, overlays, waveguides, black line and the like capable of separate into a left and right image.

It is further contemplated herein that lenticular lens 514 may be orientated in vertical columns when display 628 is held in a landscape view to produce a multidimensional digital image on display 628. However, when display 628 is held in a portrait view the 3D effect is unnoticeable enabling 2D and 3D viewing with the same display 628.

It is still further contemplated herein that smoothing, or other image noise reduction techniques, and foreground subject focus may be used to soften and enhance the 3D view or multidimensional digital image on display 628.

Figure 15B:
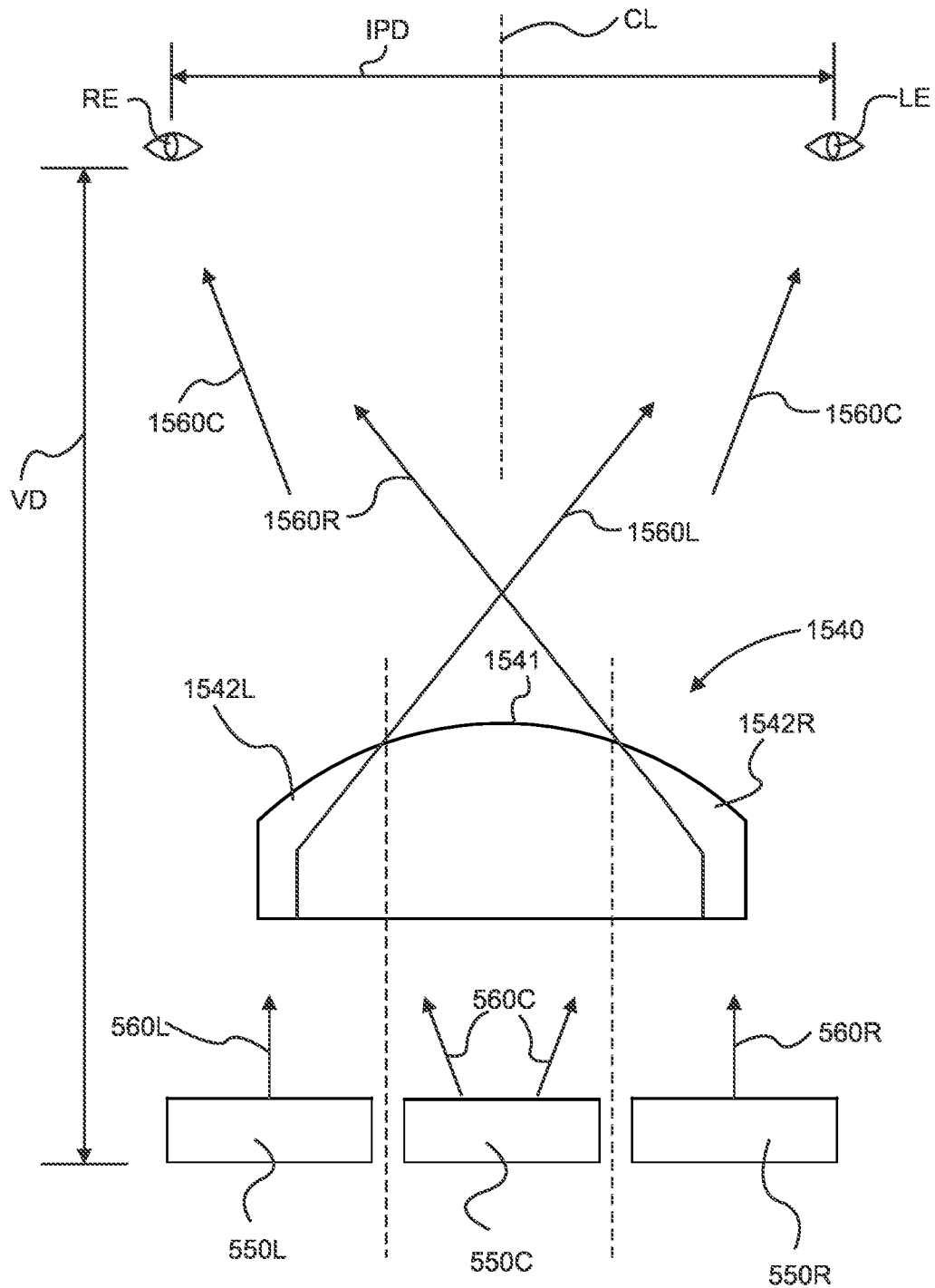

Referring now to FIG. 15B, there is illustrated by way of example, and not limitation a representative segment or section of one embodiment of exemplary refractive element, such as lenticular lens 1514 of display 628. Each sub-element of lenticular lens 1514 being arced or curved or arched segment or section 1540 (shaped as an arc) of lenticular lens 1514 may be configured having a repeating series of trapezoidal lens segments or plurality of sub-elements or refractive elements. For example, each arced or curved or arched segment 1540 may be configured having lens peak 1541 of lenticular lens 1540 and dimensioned to be one pixel 1550 (emitting red R, green G, and blue B light) wide such as having assigned center pixel 1550C thereto lens peak 1541. It is contemplated herein that center pixel 1550C light passes through lenticular lens 1540 as center light 1560C to provide 2D viewing of image on display 628 to left eye LE and right eye RE a viewing distance VD from pixel 1550 or trapezoidal segment or section 1540 of lenticular lens 1514. Moreover, each arced or curved segment 1540 may be configured having angled sections, such as lens angle A1 of lens refractive element, such as lens sub-element 1542 (plurality of sub-elements) of lenticular lens 1540 and dimensioned to be one pixel wide, such as having left pixel 1550L and right pixel 1550R assigned thereto left lens, left lens sub-element 1542L having angle A1, and right lens sub-element 1542R having angle A1, for example an incline angle and a decline angle respectively to refract light across center line CL. It is contemplated herein that pixel 1550L/R light passes through lenticular lens 1540 and bends or refracts to provide left and right images to enable 3D viewing of image on display 628; via left pixel 1550L light passes through left lens angle 1542L and bends or refracts, such as light entering left lens angle 1542L bends or refracts to cross center line CL to the right R side, left image light 1560L toward left eye LE and right pixel 1550R light passes through right lens angle 1542R and bends or refracts, such as light entering right lens angle 1542R bends or refracts to cross center line CL to the left side L, right image light 1560R toward right eye RE, to produce a multidimensional digital image on display 628.

It is contemplated herein that left and right images may be produce as set forth in FIGS. 6.1-6.3 from U.S. Pat. No. 9,992,473, 10,033,990, and 10,178,247 and electrically communicated to left pixel 550L and right pixel 550R. Moreover, 2D image may be electrically communicated to center pixel 550C.

In this figure each lens peak 1541 has a corresponding left and right angled lens 1542, such as left angled lens 1542L and right angled lens 1542R on either side of lens peak 1541 and each assigned one pixel, center pixel 1550C, left pixel 1550L and right pixel 1550R, assigned respectively thereto.

In this figure the viewing angle A1 is a function of viewing distance VD, size S of display 628, wherein A1=2 arctan (S/2VD)

In one embodiment, each pixel may be configured from a set of sub-pixels. For example, to produce a multidimensional digital image on display 628 each pixel may be configured as one or two 3×3 sub-pixels of LCD panel stack components 1520 emitting one or two red R light, one or two green G light, and one or two blue B light therethrough segments or sections of lenticular lens 1540 to produce a multidimensional digital image on display 628. Red R light, green G light, and blue B may be configured as vertical stacks of three horizontal sub-pixels.

It is recognized herein that trapezoid shaped lens 1540 bends or refracts light uniformly through its center C, left L side, and right R side, such as left angled lens 1542L and right angled lens 1542R, and lens peak 1541.

Figure 15C:
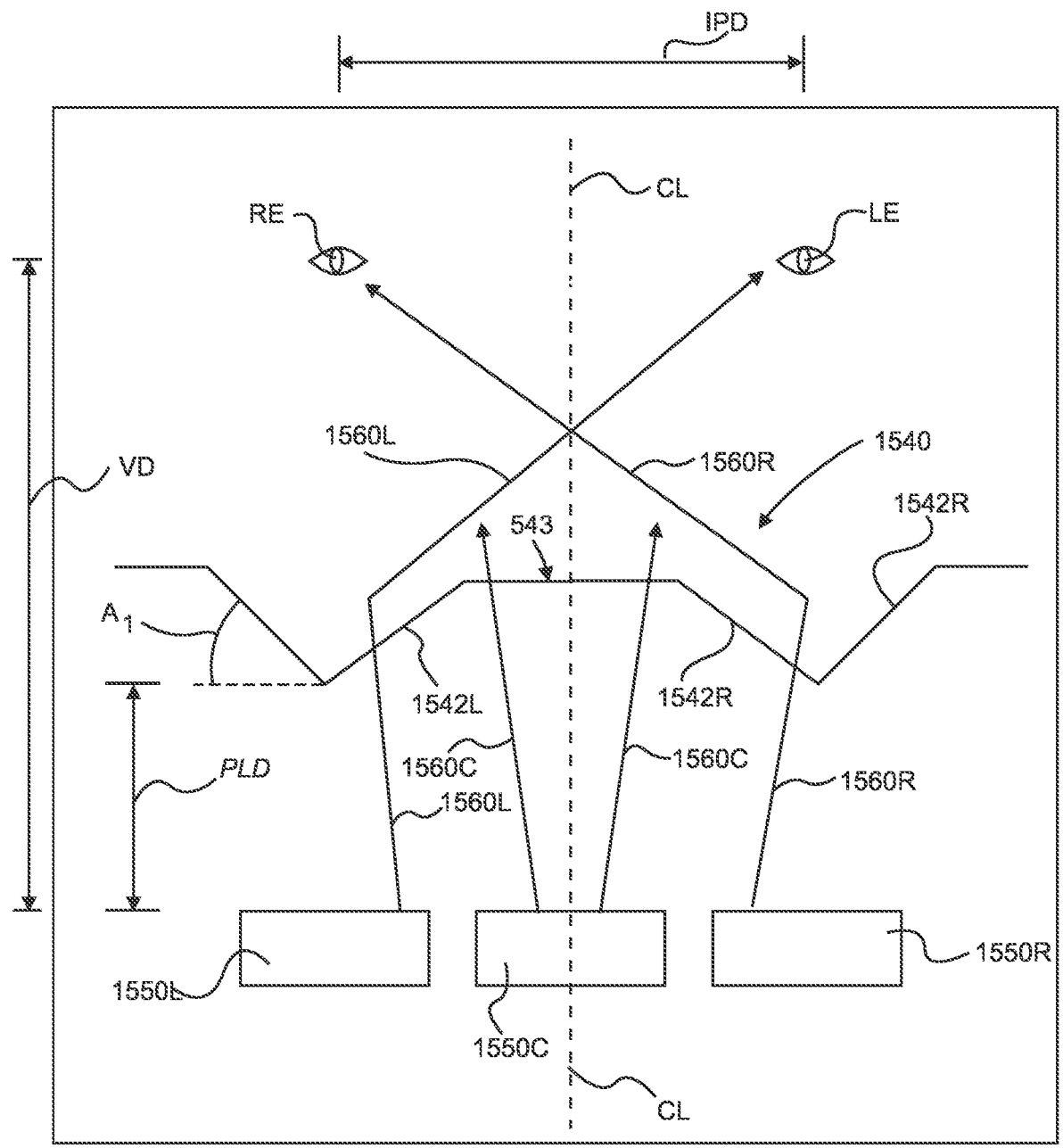

Referring now to FIG. 15C, there is illustrated by way of example, and not limitation a prototype segment or section of one embodiment of exemplary lenticular lens 1514 of display 628. Each segment or plurality of sub-elements or refractive elements being trapezoidal shaped segment or section 1540 of lenticular lens 1514 may be configured having a repeating series of trapezoidal lens segments. For example, each trapezoidal segment 1540 may be configured having lens peak 1541 of lenticular lens 1540 and dimensioned to be one or two pixel 1550 wide and flat or straight lens, such as lens valley 1543 and dimensioned to be one or two pixel 1550 wide (emitting red R, green G, and blue B light). For example, lens valley 1543 may be assigned center pixel 1550C. It is contemplated herein that center pixel 1550C light passes through lenticular lens 1540 as center light 1560C to provide 2D viewing of image on display 628 to left eye LE and right eye RE a viewing distance VD from pixel 1550 or trapezoidal segment or section 1540 of lenticular lens 1514. Moreover, each trapezoidal segment 1540 may be configured having angled sections, such as lens angle 1542 of lenticular lens 1540 and dimensioned to be one or two pixel wide, such as having left pixel 1550L and right pixel 1550R assigned thereto left lens angle 1542L and right lens angle 1542R, respectively. It is contemplated herein that pixel 1550L/R light passes through lenticular lens 1540 and bends to provide left and right images to enable 3D viewing of image on display 628; via left pixel 1550L light passes through left lens angle 1542L and bends or refracts, such as light entering left lens angle 1542L bends or refracts to cross center line CL to the right R side, left image light 1560L toward left eye LE; and right pixel 1550R light passes through right lens angle 1542R and bends or refracts, such as light entering right lens angle 1542R bends or refracts to cross center line CL to the left side L, right image light 1560R toward right eye RE to produce a multidimensional digital image on display 628.

It is contemplated herein that angle A1 of lens angle 1542 is a function of the pixel 1550 size, stack up of components of display 628, refractive properties of lenticular lens 514, and distance left eye LE and right eye RE are from pixel 1550, viewing distance VD.

In this FIG. 15C, the viewing angle A1 is a function of viewing distance VD, size S of display 628, wherein A1=2 arctan (S/2VD).

Figure 15D:
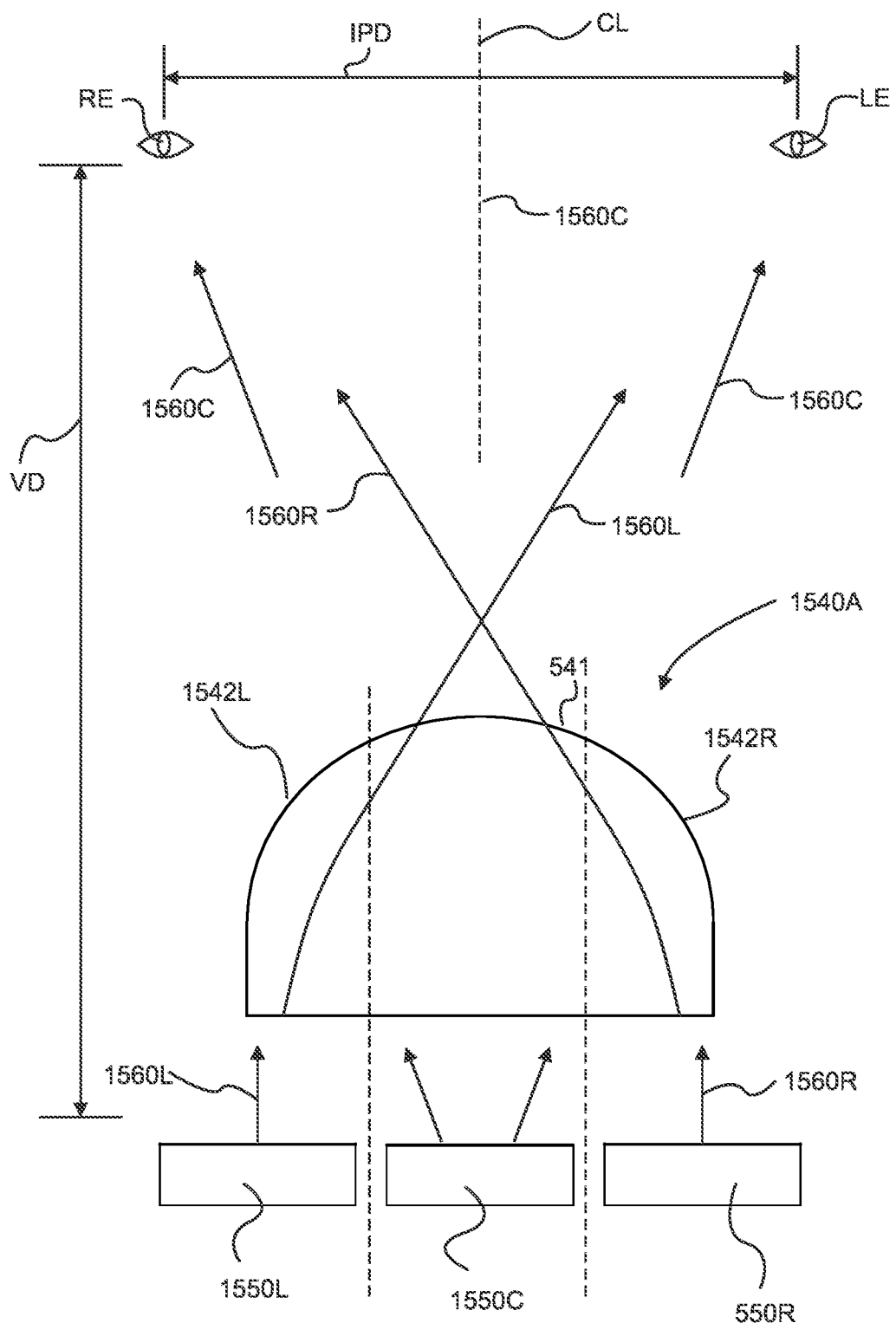

Referring now to FIG. 15D, there is illustrated by way of example, and not limitation a representative segment or section of one embodiment of exemplary lenticular lens 1514 of display 628. Each segment or plurality of sub-elements or refractive elements being parabolic or dome shaped segment or section 1540A (parabolic lens or dome lens, shaped a dome) of lenticular lens 1514 may be configured having a repeating series of dome shaped, curved, semi-circular lens segments. For example, each dome segment 1540A may be configured having lens peak 1541 of lenticular lens 1540 and dimensioned to be one or two pixel 1550 wide (emitting red R, green G, and blue B light) such as having assigned center pixel 1550C thereto lens peak 1541. It is contemplated herein that center pixel 1550C light passes through lenticular lens 540 as center light 560C to provide 2D viewing of image on display 628 to left eye LE and right eye RE a viewing distance VD from pixel 1550 or trapezoidal segment or section 1540 of lenticular lens 1514. Moreover, each trapezoidal segment 1540 may be configured having angled sections, such as lens angle 1542 of lenticular lens 1540 and dimensioned to be one pixel wide, such as having left pixel 1550L and right pixel 1550R assigned thereto left lens angle 1542L and right lens angle 1542R, respectively. It is contemplated herein that pixel 1550L/R light passes through lenticular lens 1540 and bends to provide left and right images to enable 3D viewing of image on display 628; via left pixel 1550L light passes through left lens angle 1542L and bends or refracts, such as light entering left lens angle 1542L bends or refracts to cross center line CL to the right R side, left image light 1560L toward left eye LE and right pixel 1550R light passes through right lens angle 1542R and bends or refracts, such as light entering right lens angle 1542R bends or refracts to cross center line CL to the left side L, right image light 1560R toward right eye RE to produce a multidimensional digital image on display 628.

It is recognized herein that dome shaped lens 1540B bends or refracts light almost uniformly through its center C, left L side, and right R side.

It is recognized herein that representative segment or section of one embodiment of exemplary lenticular lens 1514 may be configured in a variety of other shapes and dimensions.

Moreover, to achieve highest quality two dimensional (2D) image viewing and multidimensional digital image viewing on the same display 628 simultaneously, a digital form of alternating black line or parallax barrier (alternating) may be utilized during multidimensional digital image viewing on display 628 without the addition of lenticular lens 1514 to the stack of display 628 and then digital form of digital form of alternating black line or parallax barrier (alternating) may be disabled during two dimensional (2D) image viewing on display 628.

A parallax barrier is a device placed in front of an image source, such as a liquid crystal display, to allow it to show a stereoscopic or multiscopic image without the need for the viewer to wear 3D glasses. Placed in front of the normal LCD, it consists of an opaque layer with a series of precisely spaced slits, allowing each eye to see a different set of pixels, so creating a sense of depth through parallax. A digital parallax barrier is a series of alternating black lines in front of an image source, such as a liquid crystal display (pixels), to allow it to show a stereoscopic or multiscopic image. In addition, face-tracking software functionality may be utilized to adjust the relative positions of the pixels and barrier slits according to the location of the user's eyes, allowing the user to experience the 3D from a wide range of positions. The book Design and Implementation of Autostereoscopic Displays by Keehoon Hong, Soon-gi Park, Jisoo Hong, Byoungho Lee incorporated herein by reference.

It is contemplated herein that parallax and key subject KS reference point calculations may be formulated for distance between virtual camera positions, interphasing spacing, display 628 distance from user U, lenticular lens 1514 configuration (lens angle A1, 1542, lens per millimeter and millimeter depth of the array), lens angle 1542 as a function of the stack up of components of display 628, refractive properties of lenticular lens 1514, and distance left eye LE and right eye RE are from pixel 1550, viewing distance VD, distance between virtual camera positions (interpupillary distance IPD), and the like to produce digital multi-dimensional images as related to the viewing devices or other viewing functionality, such as barrier screen (black line), lenticular, parabolic, overlays, waveguides, black line and the like with an integrated LCD layer in an LED or OLED, LCD, OLED, and combinations thereof or other viewing devices.

Incorporated herein by reference is paper entitled Three-Dimensional Display Technology, pages 1-80, by Jason Geng of other display techniques or the like that may be utilized to produce display 628, incorporated herein by reference.

It is contemplated herein that number of lenses per mm or inch of lenticular lens 514 is determined by the pixels per inch of display 628.

It is contemplated herein that other angles A1 are contemplated herein, distance of pixels 1550C, 1550L, 1550R from of lens 1540 (approximately 0.5 mm), and user U viewing distance from smart device display 628 from user's eyes (approximately fifteen (15) inches), and average human interpupilary spacing between eyes (approximately 2.5 inches) may be factored or calculated to produce digital multi-dimensional images. Governing rules of angles and spacing assure the viewed images thereon display 628 is within the comfort zone of the viewing device to produce digital multi-dimensional images, see FIGS. 5, 6, 11 below.

It is recognized herein that angle A1 of lens 1541 may be calculated and set based on viewing distance VD between user U eyes, left eye LE and right eye RE, and pixels 550, such as pixels 1550C, 1550L, 1550R, a comfortable distance to hold display 628 from user's U eyes, such as ten (10) inches to arm/wrist length, or more preferably between approximately fifteen (15) inches to twenty-four (24) inches, and most preferably at approximately fifteen (15) inches.

In use, the user U moves the display 628 toward and away from user's eyes until the digital multi-dimensional images appear to user, this movement factor in user's U actual interpupilary distance IPD spacing and to match user's visual system (near sited and far sited discrepancies) as a function of width position of interlaced left and right images from distance between virtual camera positions (interpupilary distance IPD), key subject KS depth therein each of digital images(n) of scene S (key subject KS algorithm), horizontal image translation algorithm of two images (left and right image) about key subject KS, interphasing algorithm of two images (left and right image) about key subject KS, angles A1, distance of pixels 1550 from of lens 1540 (pixel-lens distance (PLD) approximately 0.5 mm)) and refractive properties of lens array, such as trapezoid shaped lens 1540 all factored in to produce digital multi-dimensional images for user U viewing display 628. First known elements are number of pixels 1550 and number of images, two image, distance between virtual camera positions, or (interpupilary distance IPD). Images captured at or near interpupilary distance IPD matches the human visual system, simplifies the math, minimizes cross talk between the two images, fuzziness, image movement to produce digital multi-dimensional image viewable on display 628.

It is further contemplated herein that trapezoid shaped lens 1540 may be formed from polystyrene, polycarbonate or other transparent materials or similar materials, as these material offers a variety of forms and shapes, may be manufactured into different shapes and sizes, and provide strength with reduced weight; however, other suitable materials or the like, can be utilized, provided such material has transparency and is machineable or formable as would meet the purpose described herein to produce a left and right stereo image and specified index of refraction. It is further contemplated herein that trapezoid shaped lens 1541 may be configured with 4.5 lenticular lens per millimeter and approximately 0.33 mm depth.

DIFY, in block or step 1250, computer system 10 via image display application 624 is configured to set of frames 1100 of terrain T of scene S to display, via sequential palindrome loop, multidimensional digital image sequence 1010 on display 628 for different dimensions of displays 628. Again, multidimensional digital image sequence 1010 of scene S, resultant 3D image sequence, may be output as a DIF sequence or .MPO file to display 628. It is contemplated herein that computer system 10, display 628, and application program(s) 624 may be responsive in that computer system 10 may execute an instruction to size each image (n) of scene S to fit the dimensions of a given display 628.

In block or step 1250, multidimensional image sequence 1010 on display 628, utilizes a difference in position of objects in each of images(n) of scene S from set of frames 1100 relative to key subject plane KSP, which introduces a parallax disparity between images in the sequence to display multidimensional image sequence 1010 on display 628 to enable user U, in block or step 1250 to view multidimensional image sequence 1010 on display 628.

Moreover, in block or step 1250, computer system 10 via output application 624 may be configured to display multi-dimensional image sequence 1010 on display 628 for one more user system 720, 722, 724 via communications link 740 and/or network 750, or 5G computer systems 10 and application program(s) 624.

3D Stereo, in block or step 1250, computer system 10 via output application 624 may be configured to display multi-dimensional image 1010 on display 628. Multidimensional image 1010 may be displayed via left and right pixel 1102L/1103R light passes through lenticular lens 1540 and bends or refracts to provide 3D viewing of multidimensional image 1010 on display 628 to left eye LE and right eye RE a viewing distance VD from pixel 1550.

In block or step 1250, utilizing computer system 10, display 628, and application program(s) 624 settings to configure each images(n) (L&R segments) of scene S from set of frames 1100 of terrain T of scene S simultaneously with Key Subject aligned between images for binocular disparity for display/view/save multi-dimensional digital image(s) 1010 on display 628, wherein a difference in position of each images(n) of scene S from virtual cameras relative to key subject KS plane introduces a (left and right) binocular disparity to display a multidimensional digital image 1010 on display 628 to enable user U , in block or step 1250 to view multidimensional digital image on display 628.

Moreover, user U may elect to return to block or step 1220 to choose a new key subject KS in each source image, set of frames 1100 of terrain T of scene S and progress through steps 1220-1250 to view on display 628, via creation of a new or second sequential loop, multidimensional digital image sequence 1010 of scene S for new key subject KS.

Display 628 may include display device (e.g., viewing screen whether implemented on a smart phone, PDA, monitor, TV, tablet or other viewing device, capable of projecting information in a pixel format) or printer (e.g., consumer printer, store kiosk, special printer or other hard copy device) to print multidimensional digital master image on, for example, lenticular or other physical viewing material.

It is recognized herein that steps 1220-1240, may be performed by computer system 10 via image manipulation application 626 utilizing distinct and separately located computer systems 10, such as one or more user systems 720, 722, 724 and application program(s) 626 performing steps herein. For example, using an image processing system remote from image capture system, and from image viewing system, steps 1220-1240 may be performed remote from scene S via computer system 10 or server 760 and application program(s) 624 and communicating between user systems 720, 722, 724 and application program(s) 626 via communications link 740 and/or network 750, or via wireless network, such as 5G, computer systems 10 and application program(s) 626 via more user systems 720, 722, 724. Here, computer system 10 via image manipulation application 624 may manipulate 24 settings to configure each images(n) (L&R segments) of scene S from of scene S from virtual camera to generate multidimensional digital image sequence 1010 aligned to the key subject KS point and transmit for display multidimensional digital image/sequence 1010 to one or more user systems 720, 722, 724 via communications link 740 and/or network 750, or via wireless network, such as 5G computer systems 10 or server 760 and application program(s) 624.

Moreover, it is recognized herein that steps 1220-1240, may be performed by computer system 10 via image manipulation application 624 utilizing distinct and separately located computer systems 10 positioned on the vehicle. For example, using an image processing system remote from image capture system, steps 1220-1240 via computer system 10 and application program(s) 624 computer systems 10 may manipulate 24 settings to configure each images(n) (L&R segments) of scene S from of scene S from capture device(s) 830 to generate a multidimensional digital image/sequence 1010 aligned to the key subject KS point. Here, computer system 10 via image manipulation application 626 may utilize multidimensional image/sequence 1010 to navigate the vehicle V through terrain T of scene S. Alternatively, computer system 10 via image manipulation application 626 may enable user U remote from vehicle V to utilize multidimensional image/sequence 1010 to navigate the vehicle V through terrain T of scene S.

It is contemplated herein that computer system 10 via output application 624 may be configured to enable display of multidimensional image sequence 1010 on display 628 to enable a plurality of user U, in block or step 1250 to view multidimensional image sequence 1010 on display 628 live or as a replay/rebroadcast.

It is recognized herein that step 1250, may be performed by computer system 10 via output application 624 utilizing distinct and separately located computer systems 10, such as one or more user systems 720, 722, 724 and application program(s) 624 performing steps herein. For example, using an output or image viewing system, remote from scene S via computer system 10 and application program(s) 624 and communicating between user systems 720, 722, 724 and application program(s) 626 via communications link 740 and/or network 750, or via wireless network, such as 5G, computer systems 10 and application program(s) 624 via more user systems 720, 722, 724. Here, computer system 10 output application 624 may receive manipulated plurality of two digital images of scene S and display multidimensional image/sequence 1010 to one more user systems 720, 722, 724 via communications link 740 and/or network 750, or via wireless network, such as 5G computer systems 10 and application program(s) 624.

Moreover, via communications link 740 and/or network 750, wireless, such as 5G second computer system 10 and application program(s) 624 may transmit sets of images(n) of scene S configured relative to key subject plane KSP as multidimensional image sequence 1010 on display 628 to enable a plurality of user U, in block or step 1250 to view multidimensional image/sequence 1010 on display 628 live or as a replay/rebroadcast.

Referring now to FIG. 13, there is illustrated by way of example, and not limitation, touch screen display 628 enabling user U to select photography options of computer system 10. A first exemplary option may be DIFY capture wherein user U may specify or select digital image(s) speed setting 1302 where user U may increase or decrease play back speed or frames (images) per second of the sequential display of digital image(s) on display 628 multidimensional image/sequence 1010. Furthermore, user U may specify or select digital image(s) number of loops or repeats 1304 to set the number of loops of images(n) of the plurality of 2D image(s) 1000 of scene S where images(n) of the plurality of 2D image(s) 1000 of scene S are displayed in a sequential order on display 628, similar to FIG. 11. Still furthermore, user U may specify or select order of playback of digital image(s) sequences for playback or palindrome sequence 1306 to set the order of display of images(n) of the multidimensional image/sequence 1010 of scene S. The timed sequence showing of the images produces the appropriate binocular disparity through the motion pursuit ratio effect. It is contemplated herein that computer system 10 and application program(s) 624 may utilize default or automatic setting herein.

DIFY, referring to FIGS. 14A and 14B, there is illustrated by way of example, and not limitation, frames captured in a set sequence which are played back to the eye in a set sequence and a representation of what the human eyes perceives viewing the DIFY on display 628. Explanation of DIFY and its geometry to produce motion parallax. Motion parallax is the change in angle of a point relative to a stationary point. (Motion Pursuit). Note because we have set the key subject KS point all points in foreground will move to the right, while all points in the background will move to the left. The motion is reversed in a paledrone where the images reverse direction. The angular change of any point in different views relative to the key subject creates motion parallax.

A DIFY is a series of frames captured in a set sequence which are played back to the eye in the set sequence as a loop. For example, the play back of two frames (assume first and last frame, such as frame 1101 and 1104) is depicted in FIG. 14A. FIG. 14A represents the position of an object, such as a near plane NP object in FIG. 4 on the near plane NP and its relation to key subject KS point in frame 1101 and 1104 wherein key subject KS point is constant due to the image translation imposed on the frames, frame 1101, 1102, 1103 and 1104. Frames, frame 1101, 1102, 1103 and 1104 in FIG. 11A and 11B may be overlapping and offset from the principal axis 1112 by a calculated parallax value, (horizontal image translation (HIT) and preset by the spacing of virtual camera. FIG. 14B there is illustrated by way of example, and not limitation what the human eye perceives from the viewing of the two frames (assume first and last frame, such as frame 1101 and 1104 having frame in near plane NP as point 1401 and frame 2 in near plane NP as point 1402) depicted in FIG. 14A on display 628 where image plane or screen plane is the same as key subject KS point and key subject plane KSP and user U viewing display 628 views virtual depth near plane NP 1410 in front of display 628 or between display 628 and user U eyes, left eye LE and right eye RE. Virtual depth near plane NP 1410 is near plane NP as it represents frame 1 in near plane NP as object in near plane point 1401 and frame 2 in near plane NP as object in near plane point 1402, the closest points user U eyes, left eye LE and right eye RE see when viewing multidimensional image sequence 1010 on display 628.

Virtual depth near plane NP 1410 simulates a visual depth between key subject KS and object in near plane point 1401 and object in near plane point 1402 as virtual depth 1420, depth between the near plane NP and key subject plane KSP. This depth is due to binocular disparity between the two views for the same point, object in near plane point 1401 and object in near plane point 1402. Object in near plane point 1401 and object in near plane point 1402 are preferably same point in scene S, at different views sequenced in time due to binocular disparity. Moreover, outer rays 1430 and more specifically user U eyes, left eye LE and right eye RE viewing angle 1440 is preferably approximately twenty-seven (27) degrees from the retinal or eye axis. (Similar to the depth of field for a cell phone or tablet utilizing display 628.) This depiction helps define the limits of the composition of scene S. Near plane point 1401 and near plane point 1402 preferably lie within the depth of field, outer rays 1430, and near plane NP has to be outside the inner cross over position 1450 of outer rays 1430.

The motion from X1 to X2 is the motion user U eyes, left eye LE and right eye RE will track. Xn is distance from eye lens, left eye LE or right eye RE to image point 1411, 1412 on virtual near image plane 1410. X'n is distance of leg formed from right triangle of Xn to from eye lens, left eye LE or right eye RE to image point 1411, 1412 on virtual near image plane 1410 to the image plane, 628, KS, KSP. The smooth motion is the binocular disparity caused by the offset relative to key subject KS at each of the points user U eyes, left eye LE and right eye RE observe.

For each eye, left eye LE or right eye RE, a coordinate system may be developed relative to the center of the eye CL and to the center of the intraocular spacing, half of interpupillary distance width IPD, 1440. Two angles β and α are the angles utilized to explain the DIFY motion pursuit. β is the angle formed when a line is passed from the eye lens, left eye LE and right eye RE, through the virtual near plane 1410 to the image on the image plane, 628, KS, KSP. Θ is β2−β1. While α is the angle from the fixed key subject KS of the two frames 1101, 1104 on the image plane 628, KS, KSP to the point 1411, 1412 on virtual near image plane 1410. The change in α represents the eye pursuit. Motion of the eyeball rotating, following the change in position of a point on the virtual near plane. While β is the angle responsible for smooth motion or binocular disparity when compared in the left and right eye. The outer ray 1430 emanating from the eye lens, left eye LE and right eye RE connecting to point 1440 represents the depth of field or edge of the image, half of the image. This line will change as the depth of field of the virtual camera changes.

$$di/f = Xi$$

If we define the pursuit motion as the difference in position of a point along the virtual near plane, then by utilizing the tangents we derive:

$$X2-X1 = di/(\tan[\alpha 1 - \tan\alpha 2)]$$

These equations show us that the pursuit motion, X2−X1 is not a direct function of the viewing distance. As the viewing distance increases the perceived depth di will be smaller but because of the small angular difference the motion will remain approximately the same relative to the full width of the image.

Mathematically that the ratio of retinal motion over the rate of smooth eye pursuit determines depth relative to the fixation point in central human vision. The creation of the KSP provides the fixation point necessary to create the depth. Mathematically, then all points will move differently from any other point as the reference point is the same in all cases.

Figure 17:
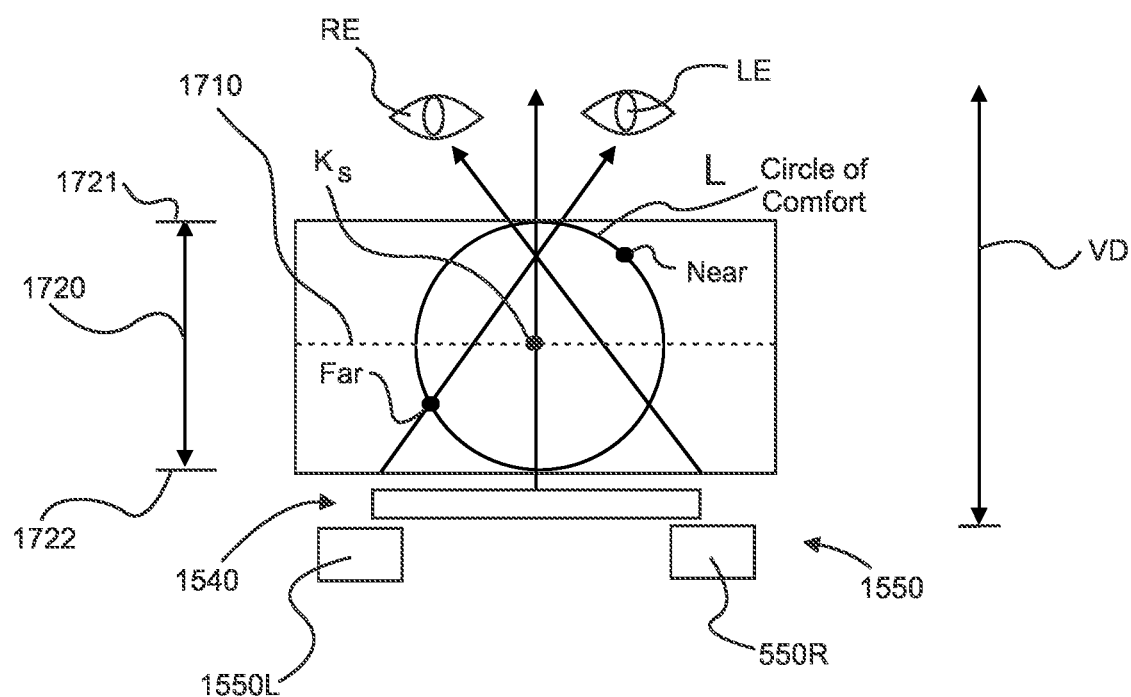
FIG. 17 is a top view illustration of an exemplary embodiment of viewing a multidimensional digital image on display with the image within the Circle of Comfort, proximate Horopter arc or points, within Panum area, and viewed from viewing distance.

Referring now to FIG. 17, there is illustrated by way of example, and not limitation a representative illustration of Circle of Comfort CoC fused with Horopter arc or points and Panum area. Horopter is the locus of points in space that have the same disparity as fixation, Horopter arc or points. Objects in the scene that fall proximate Horopter arc or points are sharp images and those outside (in front of or behind) Horopter arc or points are fuzzy or blurry. Panum is an area of space, Panum area 1720, surrounding the Horopter for a given degree of ocular convergence with inner limit 1721 and an outer limit 1722, within which different points projected on to the left and right eyes LE/RE result in binocular fusion, producing a sensation of visual depth, and points lying outside the area result in diplopia—double images. Moreover, fuse the images from the left and right eyes for objects that fall inside Panum's area, including proximate the Horopter, and user U will we see single clear images. Outside Panum's area, either in front or behind, user U will see double images.

It is recognized herein that computer system 10 via image capture application 624, image manipulation application 624, image display application 624 may be performed utilizing distinct and separately located computer systems 10, such as one or more user systems 220, 222, 224 and application program(s) 206. Next, via communications link 240 and/or network 250, wireless, such as 5G second computer system 10 and application program(s) 206 may transmit sets of images(n) of scene S relative to key subject plane introduces a (left and right) binocular disparity to display a multidimensional digital image on display 628 to enable a plurality of user U, in block or step 1250 to view multidimensional digital image on display 628 live or as a replay/rebroadcast.

Moreover, FIG. 17 illustrates display and viewing of multidimensional image 1010 on display 628 via left and right pixel 1550L/R light of multidimensional image 1010 passes through lenticular lens 1540 and bends or refracts to provide 3D viewing of multidimensional image 1010 on display 628 to left eye LE and right eye RE a viewing distance VD from pixel 1550 with near object, key subject KS, and far object within the Circle of Comfort CoC and Circle of Comfort CoC is proximate Horopter arc or points and within Panum area 1720 to enable sharp single image 3D viewing of multidimensional image 1010 on display 628 comfortable and compatible with human visual system of user U.

Blockchain is a shared, ledger that facilitates the process of recording transactions and tracking assets in a network. An asset can be tangible (title to a house, car, cash, land, artwork or DIGY, 3D Stereo, Datasets thereof) or intangible (intellectual property, patents, copyrights, branding). A blockchain is a decentralized, distributed, and oftentimes public, digital ledger consisting of records called blocks that are used to record transactions across many computers using cryptography so that any involved block cannot be altered retroactively, without the alteration of all subsequent blocks. This allows the participants to verify and audit transactions independently. Each block contains data or Dataset, a cryptographic hash of the previous block (chain), a timestamp, and cryptographic hash (identifies block and all its content). The timestamp proves that the transaction data existed when the block was published to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. If change a block then all following blocks invalid and have a different hash. Secure through Proof of Work mechanism slows down transaction rate to create a new block plus distributed. Blockchains are typically managed by a peer-to-peer network, an open and decentralized database, for use as a publicly distributed ledger, where nodes collectively adhere to a protocol to communicate and validate new blocks. Each new block is sent to everyone on the network to verify the new block creating a consensus. Although blockchain records are not unalterable as forks are possible, blockchains may be considered secure by design via a distributed computing system.

Ethereum is a popular block chain standard as well as other private and open source blockchain algorithms.

DIGY, 3D Stereo, Datasets, and other datasets and any authentication documents verify creator or author, authenticity statements, history, date of origin, chain of title, chain of owners, or like (authentication) may be included in the dataset (Dataset). Dataset may be stored as a block on the blockchain network and each subsequent transaction thereafter related to Dataset may be set forth in subsequent blocks each contains a cryptographic hash of the previous block, a timestamp of the Dataset transaction data decentralized source of trust.

Utilize Non-fungible tokens—For select DIGY, DIGY sequences, or Stereo 3D image files, Datasets or other datasets—non-fungible tokens (NFT)s are unique collectible crypto assets stored on blockchain with unique identification codes and metadata that distinguish DIGY, DIGY sequences, or Stereo 3D image file, Dataset, or dataset from any other digital content making it unique one of a kind or limited edition digital content. Enabling the creation of unique digital content and/or set numbers of copies—a certificate of authenticity for a one-of-a-kind or limited number of digital memorabilia that can't be duplicated. The memorabilia is stored on a blockchain network. It's 'non-fungible" because it can't be readily exchanged as similar reproducible content freely moving through the internet. Moreover, authenticating precious art work utilizing DIGY, DIGY sequences, or Stereo 3D image file, Dataset of artwork along with appraisal, and any authentication documents verify creator or author, authenticity statements, history, date of origin, chain of title, chain of owners, or like (authentication) may be included in the dataset (Dataset) and making an smart contract or NFT of Dataset.

An NFT is simply a record of who owns a unique piece of digital content. That content can be anything from art, music, photograph, 3D graphics, tweets, memes, games, videos, GIFs—you name it. If it's digital and it was created, it can be an NFT.

Current NFT digital content can be captured by a third party device and mass distributed via Internet by piracy and devalue the NFT digital content of standard NFT content.

Digital content herein are DIGYs and 3D Stereo images generated by artist users and creating their own NFT artwork based on DIGYs and 3D Stereo images using our DIGY and 3D Stereo platforms above.

Figure 18:
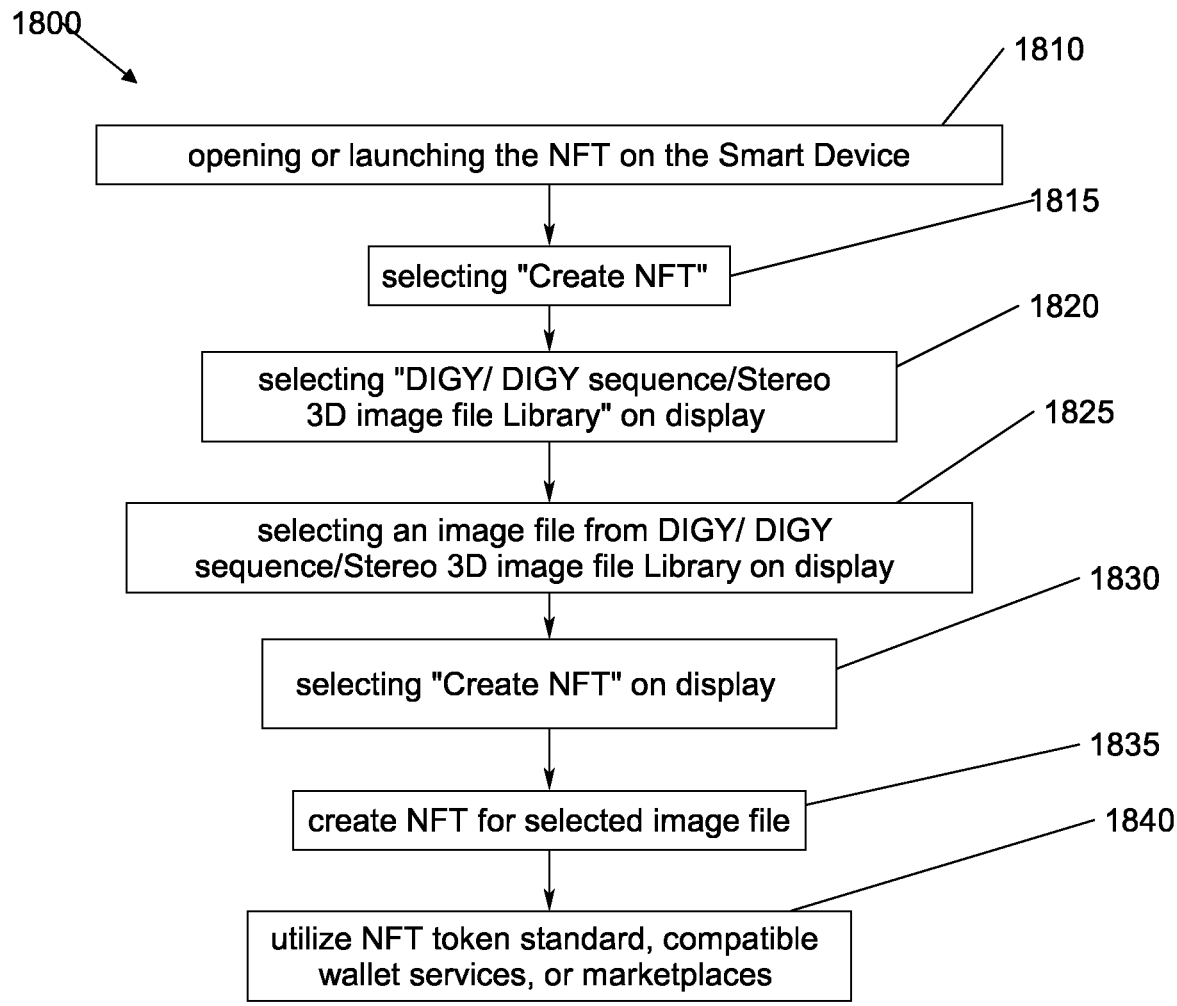
FIG. 18 is an exemplary embodiment of a flow diagram of a method of generating a non-fungible token (NFT) utilizing a computing device with image capture devices capture devices shown in FIGS. 8A-8H.

Referring now to FIG. 18, there is illustrated a flow diagram 1800 of a method of creating an NFT for DIGY, DIGY sequence, Stereo 3D image file, or other data file(s) (Dataset).

In block or step 1810, opening, tapping, or launching app NFT (application program(s) 206) on Smart Device (computer system 10) represented by FIGS. 13 and 16B.

In block or step 1815, tapping/touching/selecting "Create NFT" on Smart Device.

In block or step 1820, tapping/touching/selecting/accessing "DIGY/ DIGY sequence/Stereo 3D image file Library" icon on display 628 to access image files or the like on Smart Device.

In block or step 1825, tapping/touching/selecting a DIGY, DIGY sequence, Stereo 3D image file, or other data file(s) (Dataset) file from Library main storage device 214 of Smart Device 10.

In block or step 1830, tapping/touching/selecting "Create NFT" on display 628 of Smart Device 10.

In block or step 1835, create NFT for selected image file—DIGY, DIGY sequence, Stereo 3D image file, or other data file(s) (Dataset). User of Smart Device 10 via a system or App will utilize one of the blockchain providers to issue an NFTs for their DIGY, DIGY sequence, Stereo 3D image file, or other data file(s) (Dataset). Ethereum is currently the leading blockchain service for NFT issuance. However, there is a range of other blockchains that are becoming increasingly popular. One may be offered by Smart Device manufacture or other service provider.

In block or step 1840, utilize NFT token standard, compatible wallet services and marketplaces to offer for sale or exchange NFT of DIGY, DIGY sequence, Stereo 3D image file, or other data file(s) (Dataset). Once created user can offer their NFT, such as NFT-DIGY, DIGY sequences, or Stereo 3D image file for sale or verification on NFT compatible wallet services and marketplace, such as OpenSea which is an Ethereum-based NFT marketplace. Similar marketplace may be offered by Smart Device manufacture or other service provider.

DIGY, DIGY sequence, Stereo 3D image file, or other data file(s) (Dataset) are unique in that they can't be captured by a third party device such as another smart device viewing the DIGY, DIGY sequences, or Stereo 3D since such devices do not have access to the original digital files and may not have a license to the DIGY and 3D Stereo platforms. Current NFT digital content can be captured by a third party device and mass distributed via Internet by piracy and devalue the NFT digital content of standard NFT content.

DIGY herein may include 2D video, 2D image collage, 3D DIGY.

A sequence is a plurality of DIGYS put together in series or a loop in sequence to create a story.

Figure 19:
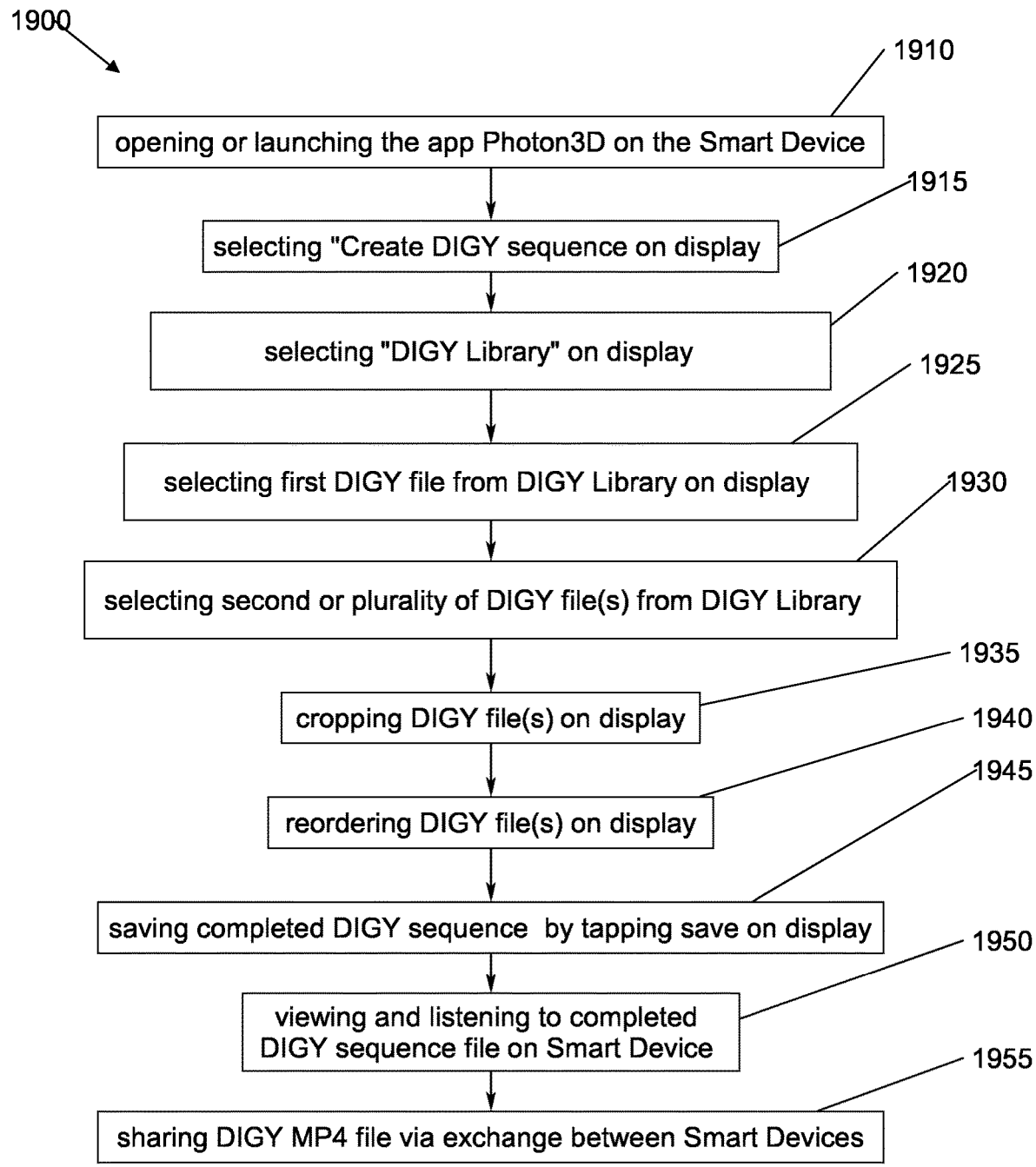
FIG. 19 is an exemplary embodiment of a flow diagram of a method of selecting a sequence of DIGYs and adding an audio file thereto utilizing a computing device with image capture devices capture devices shown in FIGS. 8A-8H.

Referring now to FIG. 19, there is illustrated a flow diagram 1900 of a method of linking or looping multiple DIGY—MP4 files in sequence or as a loop with or without audio files such as AAC (m4a) format, AIFF, Apple Lossless, MP3, and WAV or other like audio formats stored there with.

In block or step 1910, opening, tapping, or launching app Photon3D (application program(s) 206) on display 628 of Smart Device (computer system 10) represented by FIGS. 13 and 16B.

In block or step 1915, tapping/touching/selecting "Create DIGY sequence" on display of Smart Device 10.

In block or step 1920, tapping/touching/selecting "DIGY Library" icon on display 628 to access, for example, DIGY MP4 files or the like on Smart Device 10.

In block or step 1925, tapping/touching/dragging/selecting first DIGY file from DIGY Library main storage device 214 of Smart Device 10 to time line.

In block or step 1930, tapping/touching/dragging/selecting second or plurality of DIGY file(s) from DIGY Library on display of Smart Device 10 and placing them in sequence or desired order.

In block or step 1935, trimming/editing/cropping DIGY file(s) or set duration (start/stop/speed). Arrange DIGY(s) by setting transitions/cuts. Add optional audio files/sound FX as a second audio track and mix sound amplitude.

In block or step 1940, reordering DIGY file(s) by tapping/touching/selecting/dragging by dragging DIGY file(s) to a different order or position is sequence.

In block or step 1945, saving completed DIGY sequence—MP4 by tapping/touching/selecting Save to save completed image and audio MP4 file in main storage device 214 of Smart Device 10.

In block or step 1950, viewing and listening to completed DIGY sequence—MP4 file on Smart Device (computer system 10).

In block or step 1955, sharing DIGY sequence—MP4 file may be attached to an email or text, air dropped, or uploaded to social media to share.

It is contemplated herein that a user of may match the transitions between two different DIGYs whether manually or programmatically implemented using audio peak detection or even a time signature/tempo matching algorithm BPM: 120 beats per minute; Time signature: 4/4. 4 bars=4 sections (DIGYs) with 3 transitions. [DIGY1-DIGY 2-DIGY3-DIGY4]. 4 bars×4 beats per bar=16 beats; 16 beats @ 120 bpm=8 seconds; 4 sections (DIGY) @ 2 seconds per section=8 seconds. 1 DIGY per section=4 DIGYs.

It is contemplated herein that a user of may use transient detection to find the downbeat at the beginning of the measure and then synchronized this up with the start of the first DIGY. Each DIGY is trimmed to 2 seconds then sequenced together to match the music transitions of the sequenced DIGYs.

Figure 20:
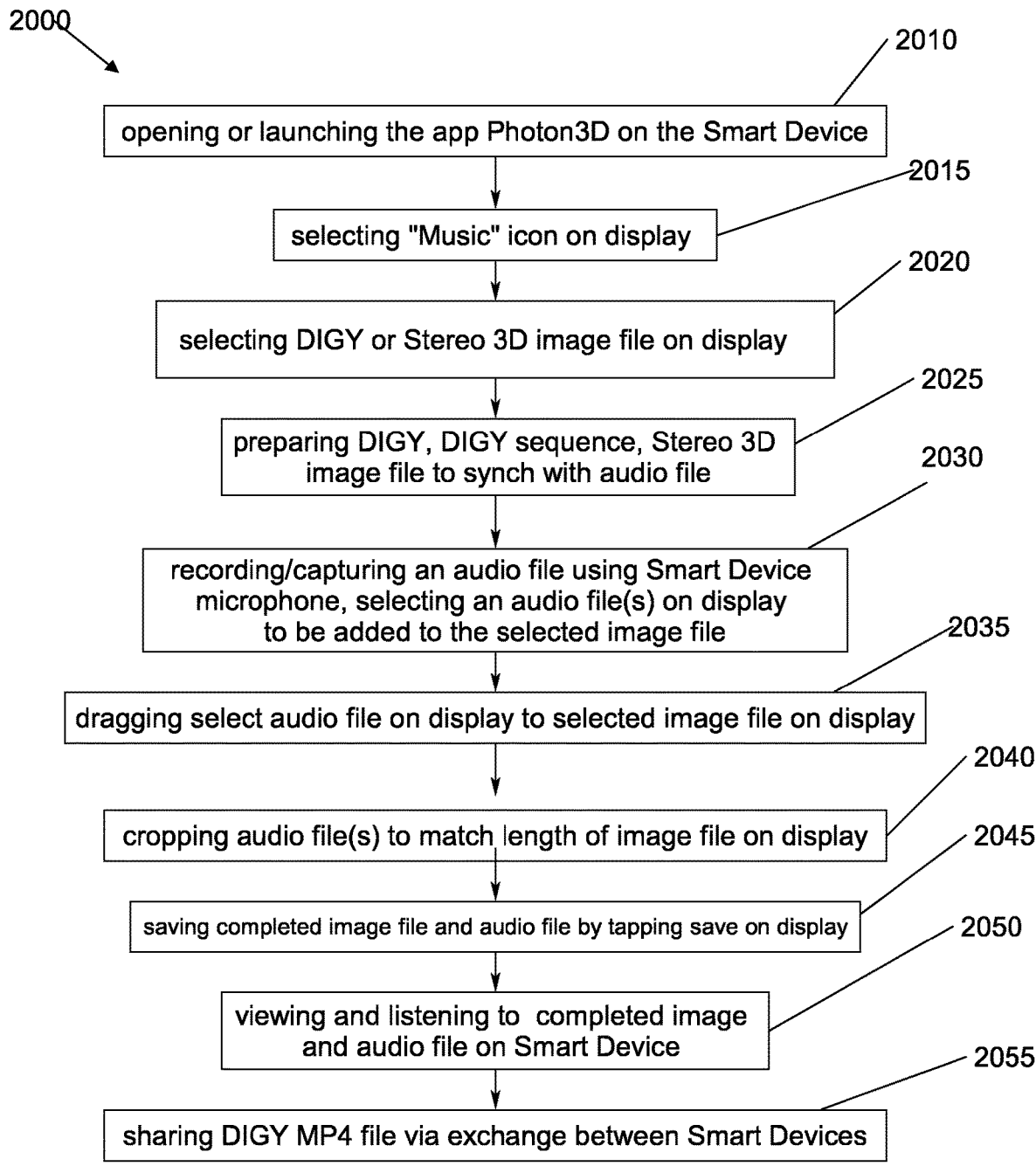
FIG. 20 is an exemplary embodiment of a flow diagram of a method of generating a DIGYs and adding an audio file thereto utilizing a computing device with image capture devices capture devices shown in FIGS. 8A-8H.

Referring now to FIG. 20, there is illustrated a flow diagram 2000 of a method of manipulating a DIGY or DIGY sequence image file to synchronize with an audio file.

In block or step 2010, opening, tapping, or launching the app Photon3D (application program(s) 206) on display 628 of Smart Device (computer system 10) represented by FIGS. 13 and 16B.

In block or step 2015, tapping/touching/selecting "Music App" via input to display 628 of Smart Device 10.

In block or step 2020, tapping/touching/selecting DIGY, DIGY sequence, Stereo 3D image file (Dataset) via input to display 628 of Smart Device 10 to select a Dataset file from memory device 604, 606 via an input from said display 628.

In block or step 2025, executing an instruction 206 via processor 102 to prepare, convert DIGY.gif file to DIGY.mps file via an input from said display 628; to create a DIGY frame time line via an input from display 628; to import image frames (3D DIGY, 2D Images, 2D video) into said frame time line via an input from said display 206; to adjust sequence/frame dwell time, via an input from said display 206.

In block or step 2030, executing an instruction 206 via processor 102 to record an audio files via microphone in Smart Device 10, select an audio file from memory device 604, 606 or online service, such as ITUNES via an input from said display 628 and import or download audio file to time line via an input from said display 628. It is contemplated herein that DIGY sequence and audio file may be converted to .mp4 file for sharing with other Smart Devices 222 via network 250.

In block or step 2035, executing an instruction 206 via processor 102 to drag, overlay, or place audio file from memory device 604, 606 to DIGY frame time line via an input from display 628.

In block or step 2040, executing an instruction 206 via processor 102 to adjust, crop, link, or arrange audio file relative to DIGY image file via an input from display 628.

In block or step 2045, saving completed image and audio file—MP4 by tapping/touching/selecting Save to save completed image and audio MP4 file in main storage device 214 via an input from display 628.

In block or step 2050, play, viewing and listening to completed image and audio file on Smart Device (computer system 10) via an input from display 628.

In block or step 2055, sharing DIGY and audio (file) may be attached to an email or text, air dropped, or uploaded to social media to share.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A system to capture a plurality of two dimensional digital images of a scene by a user, process the images, and display a multidimensional digital image sequence, the system comprising:
 a first smart device having:
 a memory device for storing an instruction;
 a processor in communication with said memory device configured to execute said instruction;
 a plurality of digital image capture devices in communication with said processor and each digital image capture device configured to capture the two dimensional digital images of the scene, said plurality of digital image capture devices positioned linearly in series within approximately an interpupillary distance width, wherein a first digital image capture devices is positioned proximate a first end of said interpupillary distance width, a second digital image capture devices is positioned proximate a second end of said interpupillary distance width, and any remaining said plurality of digital image capture devices are evenly spaced therebetween to capture the two dimensional digital images of the scene;
 said processor executes an instruction to save said plurality of the two dimensional digital images of the scene in a sequence;
 said processor executes an instruction to align said sequence of said plurality of the two dimensional digital images of the scene horizontally and vertically;
 said processor executes an instruction to select a key subject convergence point in said sequence of said plurality of the two dimensional digital images of the scene and align said sequence of said plurality of the two dimensional digital images about said key subject convergence point;
 said sequence of said plurality of the two dimensional digital images of the scene are configured to shift based on a spacing of said plurality of digital image capture devices to generate a modified sequence of said plurality of the two dimensional digital images of the scene;
 said processor executes an instruction to save said modified sequence of said plurality of the two dimensional images of the scene with a time interval therebetween each of the two dimensional digital images of said modified sequence of said plurality of the two dimensional images sequentially in a palindrome loop to generate the multidimensional image sequence of the scene; and
 a display in communication with said processor, said display configured to display the multidimensional digital image sequence.

2. The system of claim 1, wherein said processor executes an instruction to save the multidimensional digital image sequence to said memory.

3. The system of claim 2, wherein said processor executes an instruction to record an audio file via a microphone in communication with said processor.

4. The system of claim 3, wherein said processor executes an instruction to save said audio file to said memory.

5. The system of claim 4, wherein said processor executes an instruction to select the multidimensional digital image sequence from said memory via an input from said display and to display said multidimensional digital image sequence on said display.

6. The system of claim 5, wherein said processor executes an instruction to select said audio file from said memory via an input from said display and to overlay said audio file on said multidimensional digital image sequence.

7. The system of claim 6, wherein said processor executes an instruction to crop said audio file to align with said multidimensional digital image sequence via an input from said display.

8. The system of claim 7, wherein said processor executes an instruction to save said audio file and said multidimensional digital image sequence via an input from said display.

9. The system of claim 8, wherein said processor executes an instruction to play said audio file and display said multidimensional digital image sequence via an input from said display.

10. The system of claim 9, wherein said processor executes an instruction to share said-audio file and said multidimensional digital image sequence with a second smart device via an input from said display.

11. The system of claim 9, wherein said processor executes an instruction to generate a non-fungible token of said audio file and said multidimensional digital image sequence via an input from said display.

12. The system of claim 11, wherein said processor executes an instruction to utilize a wallet service and a marketplace to exchange said non-fungible token of said audio file and said multidimensional digital image sequence via an input from said display.

* * * * *